(12) United States Patent
Miller et al.

(10) Patent No.: US 12,465,605 B2
(45) Date of Patent: Nov. 11, 2025

(54) METHODS AND MATERIALS FOR GENDER-DEPENDENT TREATMENT OF CARDIOVASCULAR DYSFUNCTION

(71) Applicant: Mayo Foundation for Medical Education and Research, Rochester, MN (US)

(72) Inventors: Jordan D. Miller, Rochester, MN (US); Maurice E. Enriquez-Sarano, Rochester, MN (US); Bin Zhang, Rochester, MN (US); Carolyn Marie Roos, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 1045 days.

(21) Appl. No.: 17/602,412

(22) PCT Filed: Apr. 10, 2020

(86) PCT No.: PCT/US2020/027777
§ 371 (c)(1),
(2) Date: Oct. 8, 2021

(87) PCT Pub. No.: WO2020/210707
PCT Pub. Date: Oct. 15, 2020

(65) Prior Publication Data
US 2022/0211702 A1 Jul. 7, 2022

Related U.S. Application Data

(60) Provisional application No. 62/832,139, filed on Apr. 10, 2019.

(51) Int. Cl.
| | | |
|---|---|---|
| A61K 31/506 | (2006.01) | |
| A61K 31/5377 | (2006.01) | |
| A61K 31/635 | (2006.01) | |
| A61K 45/06 | (2006.01) | |
| A61P 9/04 | (2006.01) | |
| A61P 9/10 | (2006.01) | |
| A61P 9/12 | (2006.01) | |

(52) U.S. Cl.
CPC ........ *A61K 31/506* (2013.01); *A61K 31/5377* (2013.01); *A61K 31/635* (2013.01); *A61K 45/06* (2013.01); *A61P 9/04* (2018.01); *A61P 9/10* (2018.01); *A61P 9/12* (2018.01)

(58) Field of Classification Search
None
See application file for complete search history.

(56) References Cited

U.S. PATENT DOCUMENTS

| | | |
|---|---|---|
| 5,250,534 A | 10/1993 | Bell et al. |
| 5,859,006 A | 1/1999 | Daugan |
| 6,335,334 B1 | 1/2002 | Schindler et al. |
| 6,670,366 B1 | 12/2003 | Bunnage et al. |
| 6,699,870 B2 | 3/2004 | Wantanabe et al. |
| 6,723,719 B1 | 4/2004 | Bunnage et al. |
| 6,774,128 B2 | 8/2004 | Watkins et al. |
| 6,825,197 B2 | 11/2004 | Orme et al. |
| 6,858,620 B2 | 2/2005 | Orme et al. |
| 6,872,721 B2 | 3/2005 | Orme et al. |
| 6,878,711 B2 | 4/2005 | Orme et al. |
| 6,903,099 B2 | 6/2005 | Orme et al. |
| 6,911,542 B2 | 6/2005 | Orme et al. |
| 6,916,927 B2 | 7/2005 | Bunnage et al. |
| 7,014,866 B2 | 3/2006 | Infeld et al. |
| 9,789,126 B2 | 10/2017 | Miller et al. |
| 10,238,669 B2 | 3/2019 | Miller et al. |
| 10,568,895 B2 | 2/2020 | Miller et al. |
| 11,197,871 B2 | 12/2021 | Miller et al. |
| 2006/0079502 A1 | 4/2006 | Lang |
| 2006/0094744 A1 | 5/2006 | Maryanoff et al. |
| 2008/0057590 A1 | 3/2008 | Urdea et al. |
| 2011/0028493 A1 | 2/2011 | Matsunaga et al. |
| 2015/0328235 A1 | 11/2015 | Miller et al. |
| 2018/0071320 A1 | 3/2018 | Miller et al. |
| 2019/0183909 A1 | 6/2019 | Miller et al. |
| 2020/0230158 A1 | 7/2020 | Miller et al. |
| 2022/0062307 A1 | 3/2022 | Miller et al. |

FOREIGN PATENT DOCUMENTS

| | | |
|---|---|---|
| CN | 102056907 | 5/2011 |
| CN | 107580495 | 1/2018 |
| EP | 2264017 | 12/2010 |
| EP | 2594270 | 5/2013 |
| EP | 2938343 | 9/2018 |

(Continued)

OTHER PUBLICATIONS

Jordan et al., Diagnosis and Treatment of Supine Hypertension in Autonomic Failure Patients With Orthostatic Hypotension. The Journal of Clinical Hypertension, 2002, 4, 139-145.*
Abedin et al., "Vascular calcification: mechanisms and clinical ramifications," Arterioscler. Thromb. Vasc. Biol., Jul. 2004, 24(7):1161-1170.
Baylis et al., "Nitric oxide synthase derangements and hypertension in kidney disease," Curr. Opin. Nephrol. Hypertens., Jan. 2012, 21(1):1-6.
Bilbault et al., "Experimental models of renal calcium stones in rodents," World J. Nephrol., Mar. 2016, 5(2):189-194.
Bostrom et al., "Bone morphogenetic protein expression in human atherosclerotic lesions," J. Clin. Invest., Apr. 1993, 91(4):1800-1809.

(Continued)

*Primary Examiner* — Po-Chih Chen
(74) *Attorney, Agent, or Firm* — Fish & Richardson P.C.

(57) ABSTRACT

This document provides methods and materials involved in treating cardiovascular conditions such as calcific aortic valve stenosis. For example, methods and materials for using sGC agonists or a combination of sGC agonists and PDE5A inhibitors to reduce calcification of heart valves and/or vessels or to slow progression of aortic sclerosis to calcific aortic valve stenosis are provided.

19 Claims, 39 Drawing Sheets

(56) References Cited

FOREIGN PATENT DOCUMENTS

| | | |
|---|---|---|
| JP | 2016-532697 | 10/2016 |
| WO | WO 199838168 | 9/1998 |
| WO | WO 2000002851 | 1/2000 |
| WO | WO 2003063875 | 8/2003 |
| WO | WO 2003101276 | 12/2003 |
| WO | WO 2004037183 | 5/2004 |
| WO | WO 2005011727 | 2/2005 |
| WO | WO 2007050585 | 5/2007 |
| WO | WO 2013030564 | 3/2013 |
| WO | WO 2014100733 | 6/2014 |
| WO | WO 2015021358 | 2/2015 |
| WO | WO 2018064490 | 4/2018 |
| WO | WO 2018112258 | 6/2018 |

OTHER PUBLICATIONS

Casaclang-Verzosa et al., "Echocardiographic Approaches and Protocols for Comprehensive Phenotypic Characterization of Valvular Heart Disease in Mice," J. Vis. Exp., Feb. 2017, (120):e54110.

Chen et al., "Arterial calcification in diabetes," Curr. Diab. Rep., Feb. 2003, 3(1):28-32.

Cheng et al., "Vascular smooth muscle LRP6 limits arteriosclerotic calcification in diabetic LDLR-/- mice by restraining noncanonical Wnt signals," Circ. Res., Jul. 2015, 117(2):142-156.

Demer et al., "Mechanism of calcification in atherosclerosis," Trends Cardiovasc. Med., Jan.-Feb. 1994, 4(1):45-49.

El Accaoui et al., "Aortic valve sclerosis in mice deficient in endothelial nitric oxide synthase," Am. J. Physiol. Heart Circ. Physiol., May 2014, 306(9):H1302-H1313.

El-Hamamsy et al., "Endothelium-dependent regulation of the mechanical properties of aortic valve cusps," J. Am. Coll. Cardiol., Apr. 2009, 53(16):1448-1455.

Extended European Search Report in European Appln. No. 13864299.6, dated Sep. 12, 2016, 5 pages.

Ge et al., "Osteopontin regulates macrophage activation and osteoclast formation in hypertensive patients with vascular calcification," Sci. Rep., Jan. 2017, 7:40253.

Giachelli, "Ectopic calcification: gathering hard facts about soft tissue mineralization," Am. J. Pathol., Mar. 1999, 154(3):671-675.

Giachelli, "Vascular calcification: in vitro evidence for the role of inorganic phosphate," J. Am. Soc. Nephrol., Sep. 2003, 14(9 Suppl. 4):S300-S304.

Hagler et al., "TGF-β signalling and reactive oxygen species drive fibrosis and matrix remodelling in myxomatous mitral valves," Cardiovasc. Res., Jul. 2013, 99(1):175-184.

Hayden et al., "Vascular ossification-calcification in metabolic syndrome, type 2 diabetes mellitus, chronic kidney disease, and calciphylaxis-calcific uremic arteriolopathy: the emerging role of sodium thiosulfate," Cardiovasc. Diabetol., Mar. 2005, 4:4.

Hu et al., "Vascular endothelial-specific dimethylarginine dimethylaminohydrolase-1-deficient mice reveal that vascular endothelium plays an important role in removing asymmetric dimethylarginine," Circulation, Dec. 2009, 120(22):2222-2229.

Jacobi et al., "Dimethylarginine dimethylaminohydrolase overexpression ameliorates atherosclerosis in apolipoprotein E-deficient mice by lowering asymmetric dimethylarginine," Am. J. Pathol., May 2010, 176(5):2559-2570.

Jacobi et al., "Effect of lowering asymmetric dimethylarginine (ADMA) on vascular pathology in atherosclerotic ApoE-deficient mice with reduced renal mass," Int. J. Mol. Sci., Mar. 2014, 15(4):5522-5535.

Jono et al., "Phosphorylation of osteopontin is required for inhibition of vascular smooth muscle cell calcification," J. Biol. Chem., Jun. 2000, 275(26):20197-20203.

Kawahara et al., "Co-induction of argininosuccinate synthetase, cationic amino acid transporter-2, and nitric oxide synthase in activated murine microglial cells," Brain Res. Mol. Brain Res., Jun. 2001, 90(2):165-173.

Khan et al., "Modeling of hyperoxaluric calcium oxalate nephrolithiasis: experimental induction of hyperoxaluria by hydroxy-L-proline," Kidney Int., Sep. 2006, 70(5):914-923.

Khan et al., "Experimental induction of calcium oxalate nephrolithiasis in mice," J. Urol., Sep. 2010, 184(3):1189-1196.

Lee-Kirsch et al., "Type I interferonopathies—an expanding disease spectrum of immunodysregulation," Semin. Immunopathol., Jul. 2015, 37(4):349-357.

Linder et al., "Bone Alkaline Phosphatase and Tartrate-Resistant Acid Phosphatase: Potential Co-regulators of Bone Mineralization," Calcif. Tissue Int., Jul. 2017, 101(1):92-101.

Miller et al., "Calcific aortic valve stenosis: methods, models, and mechanisms," Circ. Res., May 2011, 108(11):1392-1412.

Miller et al., "Dysregulation of antioxidant mechanisms contributes to increased oxidative stress in calcific aortic valvular stenosis in humans," J. Am. Coll. Cardiol., Sep. 2008, 52(10):843-850.

Miller et al., "Vascular function during prolonged progression and regression of atherosclerosis in mice," Arterioscler. Thromb. Vasc. Biol., Mar. 2013, 33(3):459-465.

Miyaoka et al., "BAY 41-2272, a soluble guanylate cyclase stimulator, relaxes isolated human ureter in a standardized in vitro model," Urology, Jan. 2014, 83(1):256.e1-7.

Mo et al., "Renal calcinosis and stone formation in mice lacking osteopontin, Tamm-Horsfall protein, or both," Am. J. Physiol. Renal Physiol., Dec. 2007, 293(6):F1935-F1943.

Morales et al., "Redox Control of Protein Arginine Methyltransferase 1 (PRMT1) Activity," J. Biol. Chem., Jun. 2015, 290(24):14915-14926.

New et al., "Molecular imaging insights into early inflammatory stages of arterial and aortic valve calcification," Circ. Res., May 2011, 108(11):1381-1391.

Palm et al., "Dimethylarginine dimethylaminohydrolase (DDAH): expression, regulation, and function in the cardiovascular and renal systems," Am. J. Physiol. Heart Circ. Physiol., Dec. 2007, 293(6):H3227-H3245.

PCT International Preliminary Report on Patentability in International Appln. No. PCT/US2013/077254, mailed Jul. 2, 2015, 6 pages.

PCT International Search Report and Written Opinion in International Appln. No. PCT/US2013/077254, mailed Apr. 24, 2014, 8 pages.

Pope et al., "Role of the PRMT-DDAH-ADMA axis in the regulation of endothelial nitric oxide production," Pharmacol. Res., Dec. 2009, 60(6):461-465.

Rajamannan et al., "Calcific aortic valve disease: not simply a degenerative process: A review and agenda for research from the National Heart and Lung and Blood Institute Aortic Stenosis Working Group. Executive summary: Calcific aortic valve disease—2011 update," Circulation, Oct. 2011, 124(16):1783-1791.

Roos et al., "Transcriptional and phenotypic changes in aorta and aortic valve with aging and MnSOD deficiency in mice," Am. J. Physiol. Heart Circ. Physiol., Nov. 2013, 305(10):H1428-H1439.

Sandner et al., "Effects of PDE5 Inhibitors and sGC Stimulators in a Rat Model of Artificial Ureteral Calculosis," PLoS One, Oct. 2015, 10(10):e0141477.

Seya et al., "Contribution of bone morphogenetic protein-2 to aortic valve calcification in aged rat," J. Pharmacol. Sci., 2011, 115(1):8-14.

Shimizu et al., "[Bone metabolism and cardiovascular function update. Cross link of hypertension, bone loss and vascular calcification—common back grounds in renin angiotensin system with anti-aging aspect-]," Clin. Calcium, Jul. 2014, 24(7):53-62 (with English Abstract), (Eng. abstract only).

Strobel et al., "Transport of asymmetric dimethylarginine (ADMA) by cationic amino acid transporter 2 (CAT2), organic cation transporter 2 (OCT2) and multidrug and toxin extrusion protein 1 (MATE1)," Amino Acids, Oct. 2013, 45(4):989-1002.

Sverdlov et al., "Pathogenesis of aortic stenosis: not just a matter of wear and tear," Am. J. Cardiovasc. Dis., 2011, 1(2):185-199.

Virchow, "Cellular pathology. As based upon physiological and pathological histology. Lecture XVI—Atheromatous affection of arteries. 1858," Nutr. Rev., Jan. 1989, 47(1):23-25.

(56) References Cited

OTHER PUBLICATIONS

Walsh et al., "Impaired endothelial nitric oxide bioavailability: a common link between aging, hypertension, and atherogenesis?" J. Am. Geriatr. Soc., Jan. 2009, 57(1):140-145.
Wang et al., "Distinguishing characteristics of idiopathic calcium oxalate kidney stone formers with low amounts of Randall's plaque," Clin. J. Am. Soc. Nephrol., Oct. 2014, 9(10):1757-1763.
Weiss et al., "Calcific aortic valve stenosis in old hypercholesterolemic mice," Circulation, Nov. 2006, 114(19):2065-2069.
Wesson et al., "Osteopontin is a critical inhibitor of calcium oxalate crystal formation and retention in renal tubules," J. Am. Soc. Nephrol., Jan. 2003, 14(1):139-147.
Wolak, "Osteopontin—a multi-modal marker and mediator in atherosclerotic vascular disease," Atherosclerosis, Oct. 2014, 236(2):327-337.
Yanagawa et al., "miRNA-141 is a novel regulator of BMP-2-mediated calcification in aortic stenosis," J. Thorac. Cardiovasc. Surg., Jul. 2012, 144(1):256-262.
Yeramian et al., "Arginine transport via cationic amino acid transporter 2 plays a critical regulatory role in classical or alternative activation of macrophages," J. Immunol., May 2006, 176(10):5918-5924.
Zilberberg et al., "A rapid and sensitive bioassay to measure bone morphogenetic protein activity," BMC Cell Biol., Sep. 2007, 8:41.
ClinicalTrials.gov [online], "A Study Evaluating the Effects of Ataciguat (HMR1766) on Aortic Valve Calcification (CAVS)," NCT02481258, Jun. 2015, last updated Jan. 2021, retrieved from URL<https://www.clinicaltrials.gov/study/NCT02481258>, 11 pages.
Abel et al., "Potential role for P-glycoprotein in the non-proportional pharmacokinetics of UK-343,664 in man," Xenobiotica, 31(8-9):665-676, Aug.-Sep. 2001.
Buys et al., "Discovery and development of next generation sGC stimulators with diverse multidimensional pharmacology and broad therapeutic potential," Nitric Oxide, 78:72-80, May 31, 2018.
Cowell et al., "A Randomized Trial of Intensive Lipid-Lowering Therapy in Calcific Aortic Stenosis," N. Engl. J. Medicine, Jun. 9, 2005, 352(23):2389-2397.
Deguchi et al., "Vasodilator-stimulated phosphoprotein (VASP) phosphorylation provides a biomarker for the action of exisulind and related agents that activate protein kinase G," Mol Cancer Ther., 1(10):803-809, Aug. 2002.
Dukarm et al., "The cGMP-specific phosphodiesterase inhibitor E4021 dilates the pulmonary circulation," Am J Respir Crit Care Med., 160(3):858-865, Sep. 1999.
Evgenov et al., "NO-independent stimulators and activators of soluble guanylate cyclase: discovery and therapeutic potential," Nat Rev Drug Discov., 5(9):755-768, Sep. 2006.
Freeman et al., "Spectrum of calcific aortic valve disease: pathogenesis, disease progression, and treatment strategies," Circulation, 111(24):3316-3326, Jun. 21, 2005.
Friebe et al., "Meeting report of the 8th International Conference on cGMP "cGMP: generators, effectors, and therapeutic implications" at Bamberg, Germany, from Jun. 23 to 25, 2017," Naunyn-Schmiedeberg's Arch. Pharmacology, 390(12):1177-1188, Oct. 10, 2017.
Gardiner et al., "Hemodynamic effects of phosphodiesterase 5 and angiotensin-converting enzyme inhibition alone or in combination in conscious SHR," J Pharmacol Exp Ther., 312(1):265-271, Epub Sep. 27, 2004.
Lindman et al., "Effects of phosphodiesterase type 5 inhibition on systemic and pulmonary hemodynamics and ventricular function in patients with severe symptomatic aortic stenosis," Circulation., 125(19):2353-2362, Epub Mar. 25, 2012.
Mittendorf et al., "Discovery of riociguat (BAY 63-2521): a potent, oral stimulator of soluble guanylate cyclase for the treatment of pulmonary hypertension," BMC Pharmacology, 9(Suppl 1):P52, Aug. 11, 2009.
Mohler, "Mechanisms of aortic valve calcification," Am J Cardiol., 94(11):1396-1402, A6, Dec. 1, 2004.

Mourino-Alvarez et al., "Patients with calcific aortic stenosis exhibit systemic molecular evidence of ischemia, enhanced coagulation, oxidative stress and impaired cholesterol transport," Int. J. Cardiol., Dec. 2016, 225:99-106.
Mullershausen et al., "Inhibition of phosphodiesterase type 5 by the activator of nitric oxide-sensitive guanylyl cyclase BAY 41-2272," Circulation, 109(14):1711-1713, Epub Apr. 5, 2004.
Nagayama et al., "Sustained soluble guanylate cyclase stimulation offsets nitric-oxide synthase inhibition to restore acute cardiac modulation by sildenafil," J Pharmacol Exp Ther., 326(2):380-387, Epub May 2, 2008.
Nossaman et al., "Stimulators and activators of soluble guanylate cyclase: review and potential therapeutic indications," Crit Care Res Pract., 2012:290805, Epub Feb. 28, 2012.
PCT International Preliminary Report on Patentability in International Appln. No. PCT/US2020/027777, dated Sep. 28, 2021, 7 pages.
PCT International Search Report and Written Opinion in International Appln. No. PCT/US2020/027777, dated Jun. 16, 2020, 9 pages.
Raslan and Mookadam, "The Progression of Aortic Sclerosis to Aortic Stenosis," Aortic Valve, Ch. 6, pp. 121-132, Dec. 9, 2011.
Rossebø et al., "Intensive Lipid Lowering with Simvastatin and Ezetimibe in Aortic Stenosis," N. Engl. J. Medicine, Sep. 25, 2008, 359(13):1343-1356.
Sandner et al., "Soluble Guanylate Cyclase Stimulators and Activators," Handb. Exp. Pharmacology, 264:355-394, Jan. 29, 2019.
Scutt et al., "EMD273316 & EMD95833, type 4 phosphodiesterase inhibitors, stimulate fibroblastic-colony formation by bone marrow cells via direct inhibition of PDE4 and the induction of endogenous prostaglandin synthesis," BMC Pharmacol., 4:10, Jun. 25, 2004.
Senzaki et al., "Cardiac phosphodiesterase 5 (cGMP-specific) modulates beta-adrenergic signaling in vivo and is down-regulated in heart failure," Faseb J., 15(10):1718-1726, Aug. 2001.
Stasch et al., "Soluble guanylate cyclase as an emerging therapeutic target in cardiopulmonary disease," Circulation., 123(20):2263-2273, May 24, 2011.
Van Eickels et al., "Role of the sGC activator ataciguat sodium (HMR1766) in cardiovascular disease," BMC Pharmacology, 7(Suppl I):S4, 2 pages, 2007.
Walker et al., "Pharmacokinetics and metabolism of a selective PDE5 inhibitor (UK-343,664) in rat and dog," Xenobiotica, 31(8-9):651-664, Aug.-Sep. 2001.
Wang et al., "Phosphodiesterase 5 restricts NOS3/Soluble guanylate cyclase signaling to L-type Ca2+ current in cardiac myocytes," J Mol Cell Cardiol., 47(2):304-314, Epub Apr. 1, 2009.
Zhou et al., "Soluble guanylyl cyclase activation by HMR-1766 (ataciguat) in cells exposed to oxidative stress," Am J Physiol Heart Circ Physiol., 295(4):H1763-71. Epub Aug. 29, 2008.
U.S. Appl. No. 14/652,903, filed Jun. 17, 2015, Jordan D. Miller, Issued as U.S. Pat. No. 9,789,126.
U.S. Appl. No. 15/702,461, filed Sep. 12, 2017, Jordan D. Miller, Issued as U.S. Pat. No. 10,238,669.
U.S. Appl. No. 16/296,628, filed Feb. 7, 2019, Jordan D. Miller, Issued as U.S. Pat. No. 10,568,895.
U.S. Appl. No. 16/717,302, filed Dec. 17, 2019, Jordan D. Miller, Issued as U.S. Pat. No. 11,197,871.
U.S. Appl. No. 17/521,453, filed Nov. 8, 2021, Jordan D. Miller, Published as U.S. Publication No. 2022/0062307.
Partial Supplementary Search Report in European Appln. No. 20788569.0, dated Dec. 16, 2022, 12 pages.
Ghofrani et al., "Nitric oxide pathway and phosphodiesterase inhibitors in pulmonary arterial hypertension," J. Am. Coll. Cardiol., Jun. 2004, 43(12_Supplement):S68-S72.
Kanno et al., "Nitric oxide regulates vascular calcification by interfering with TGF-β signalling," Cardiovasc. Res., Jan. 2008, 77(1):221-230.
Watson, "6 Tips for Reducing Your Cholesterol Without Medication," Healthline.com [online], Mar. 2021, retrieved on Feb. 25, 2024, retrieved from URL<https://www.healthline.com/health/high-cholesterol/how-to-reduce-cholesterol-without-medication>, 10 pages.

(56) References Cited

OTHER PUBLICATIONS

Zhang et al., "Abstract 123: Activation of Oxidized Soluble Guanylate Cyclase Slows Progression of Aortic Valve Calcification," Arterioscler. Thromb. Vasc. Biol., Jul. 2019, 39(Suppl_1):A123.

* cited by examiner

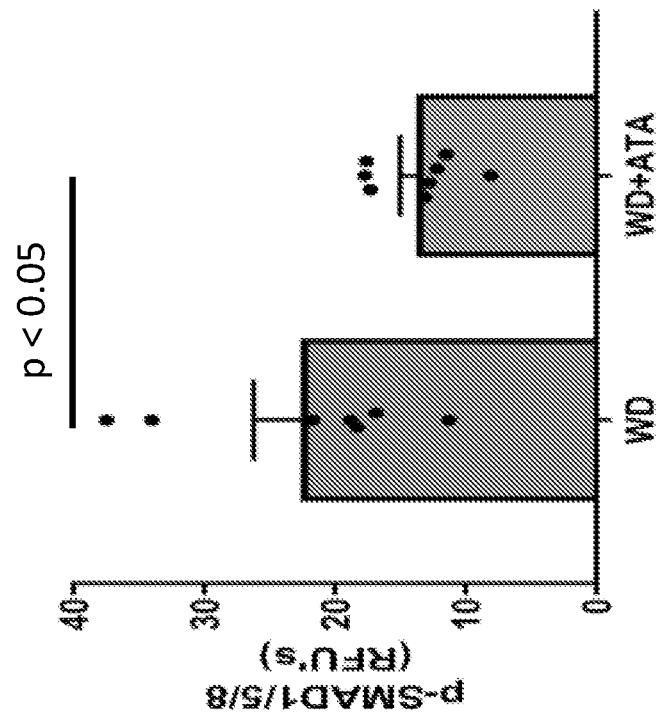
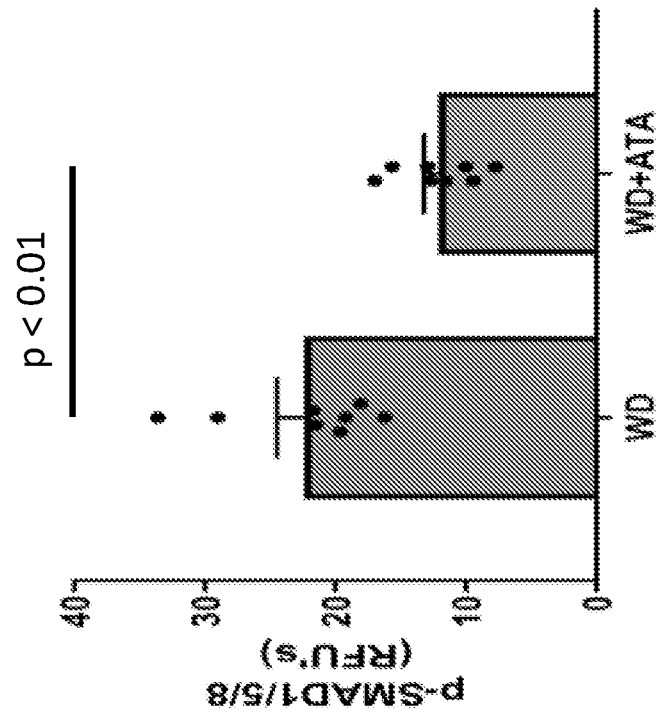
FIG. 2A Male mice
FIG. 2B Female mice

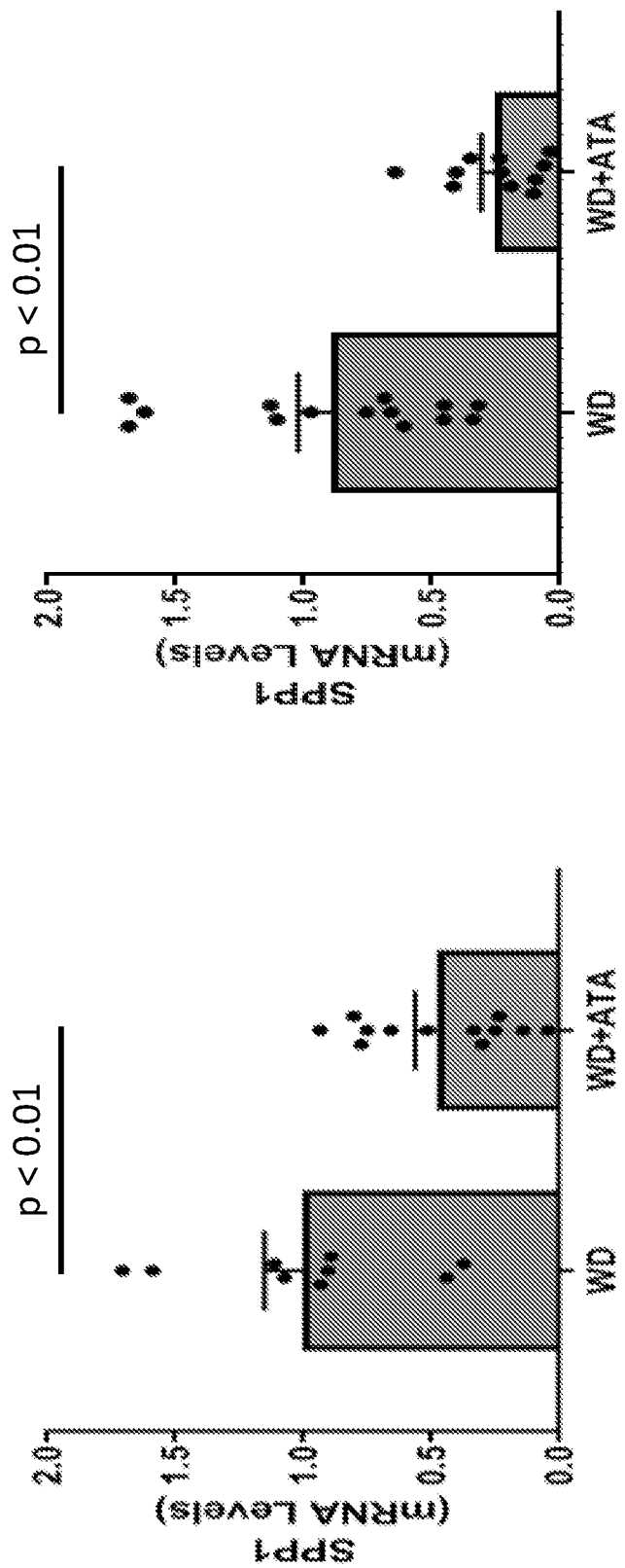

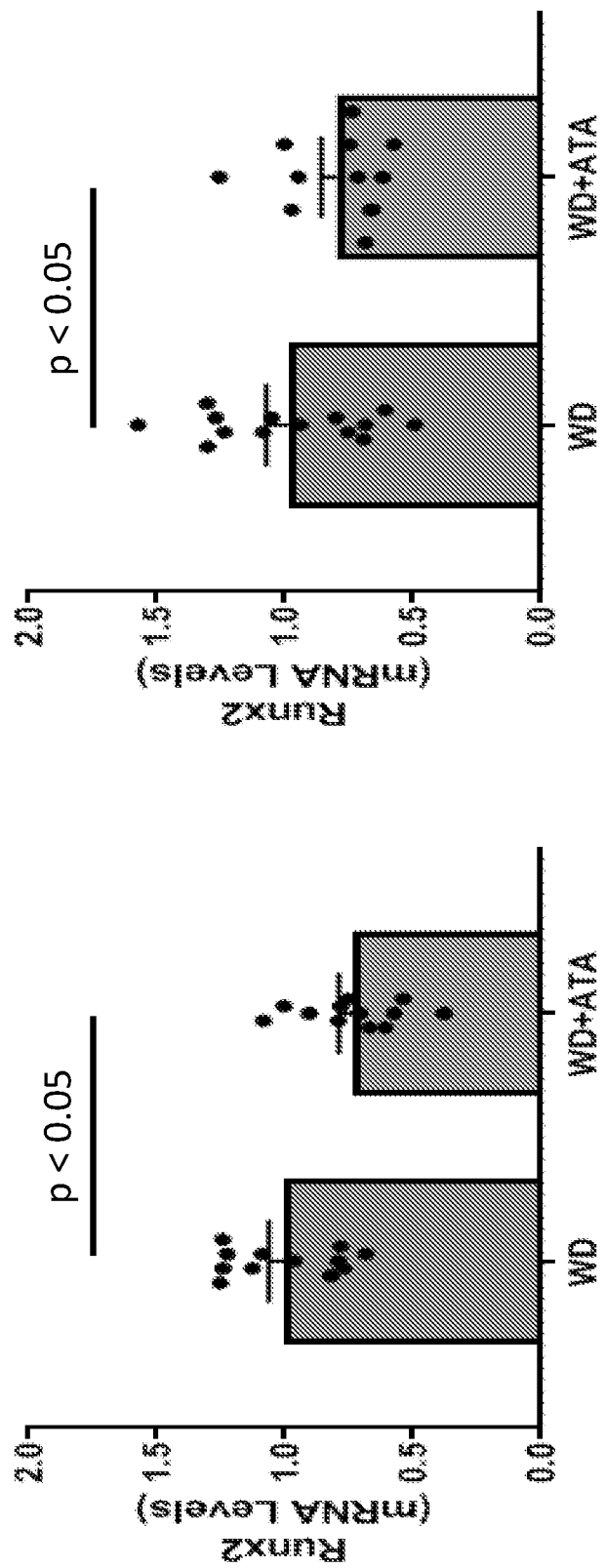

Female mice

Male mice

Female mice

Male mice

Female mice

Male mice

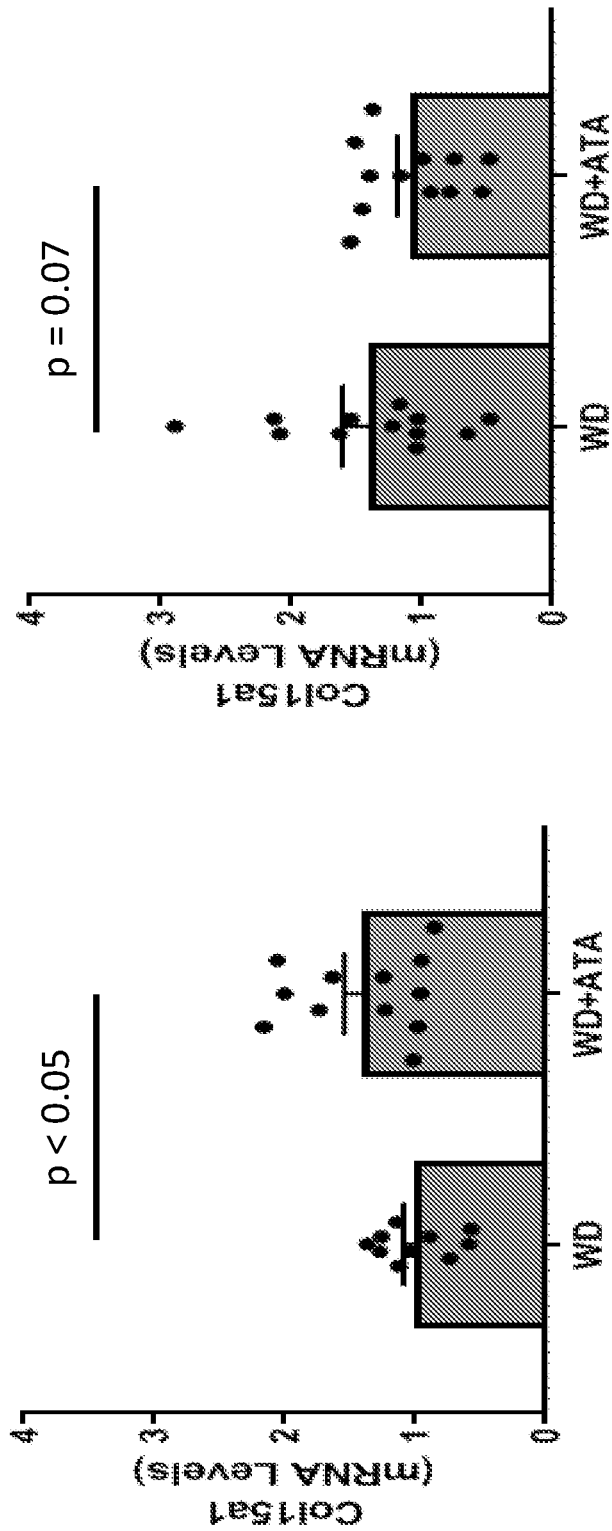

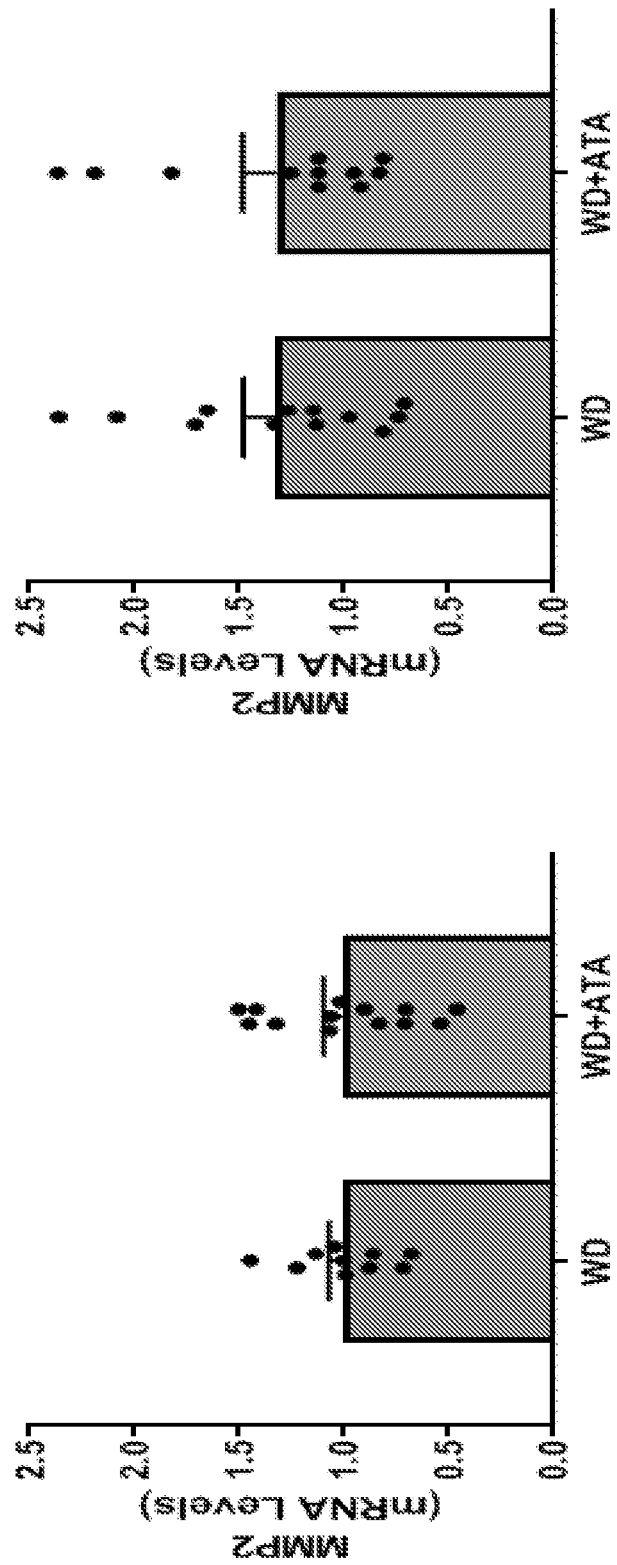

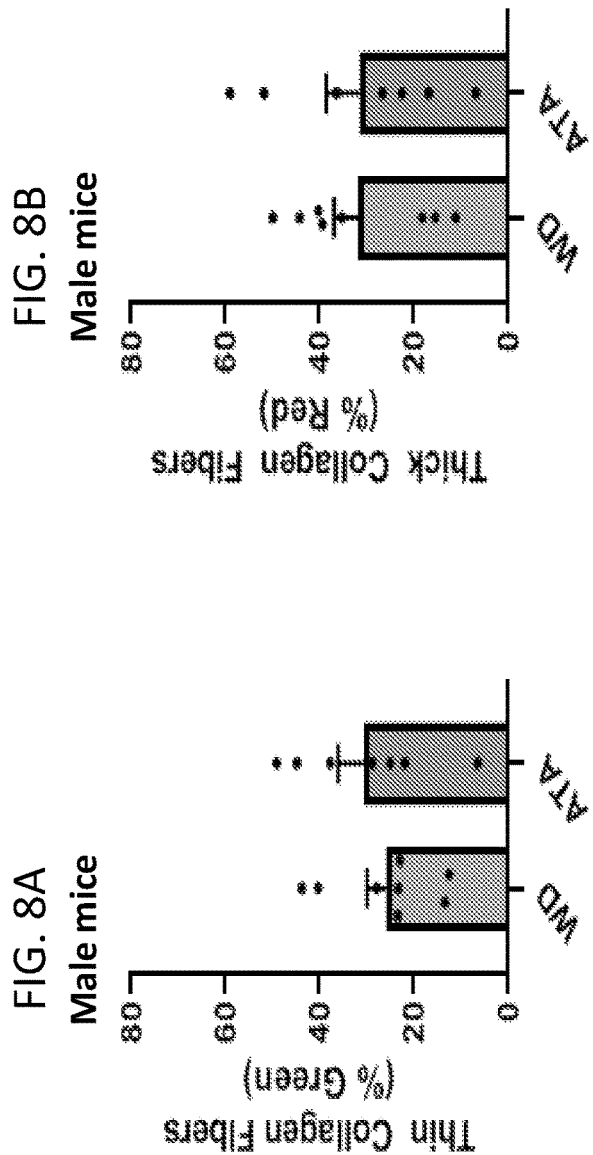
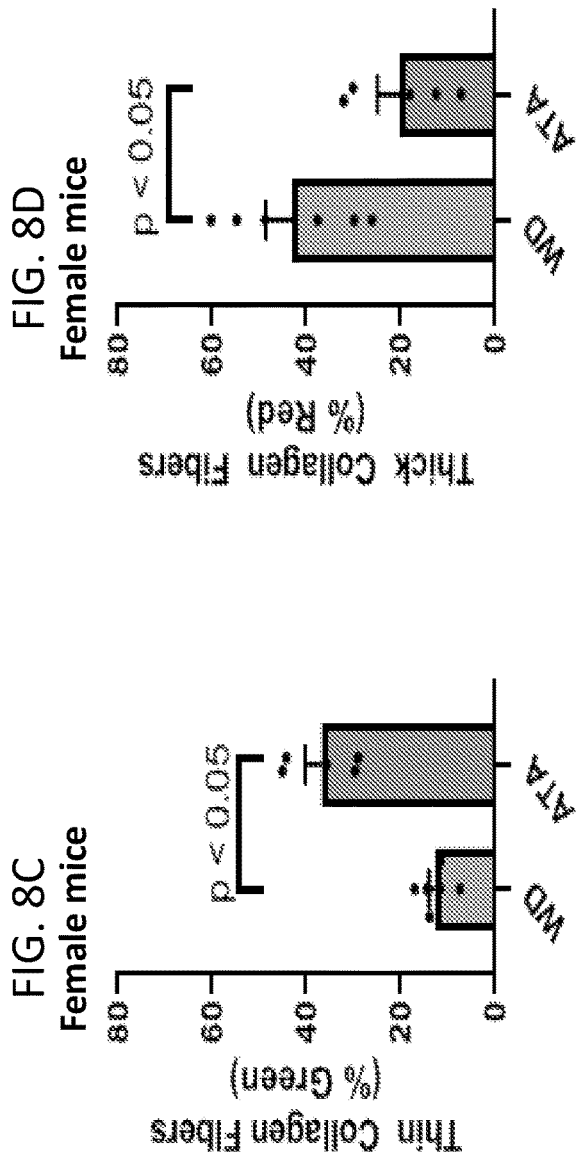
FIG. 8A Male mice
FIG. 8B Male mice
FIG. 8C Female mice
FIG. 8D Female mice

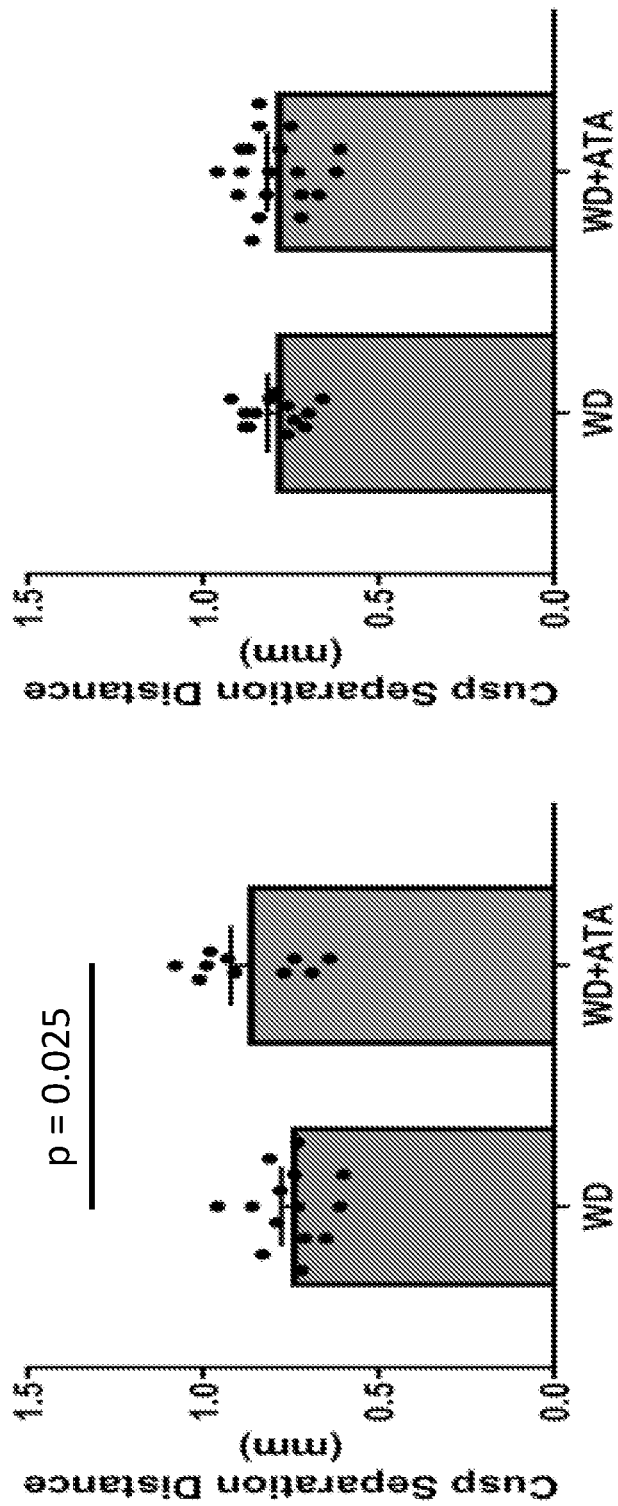

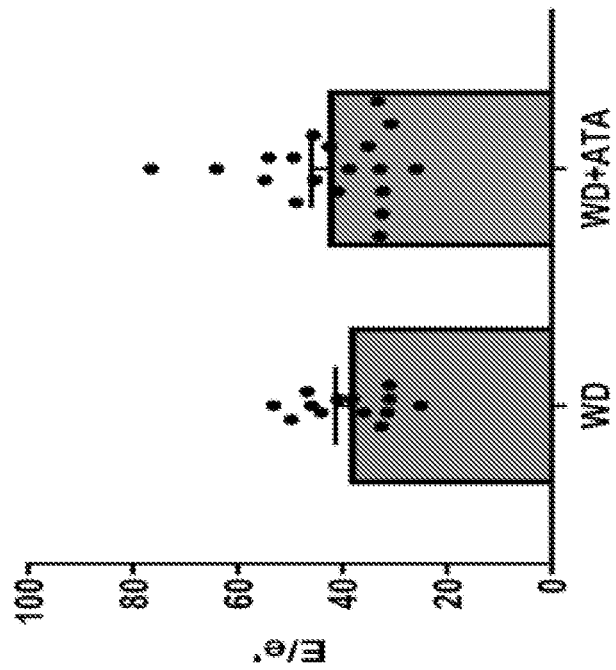
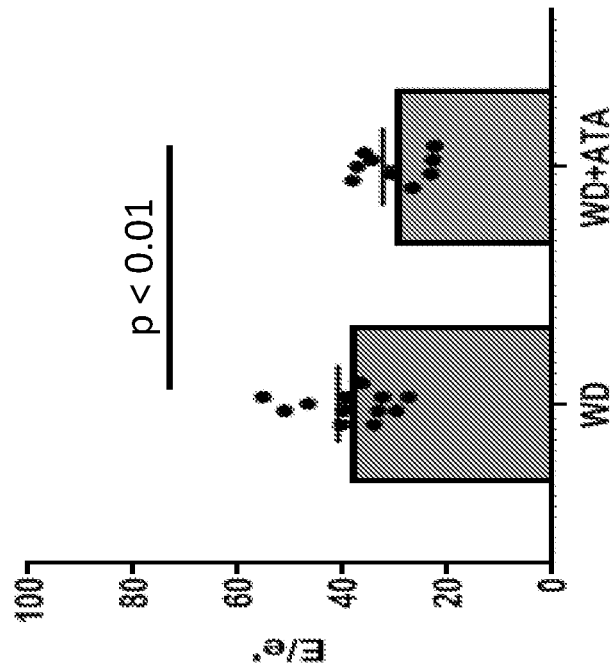

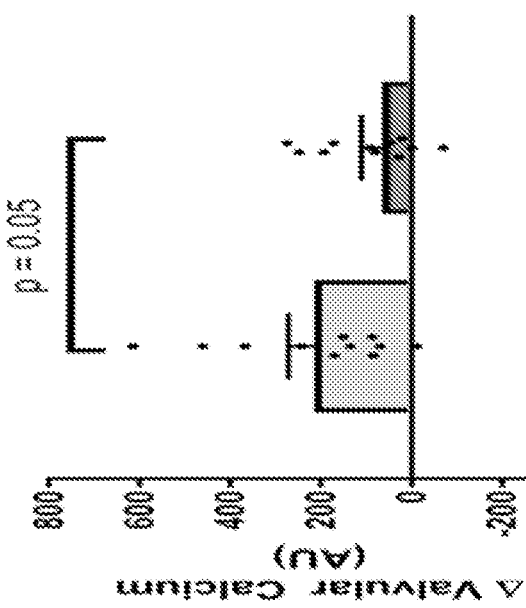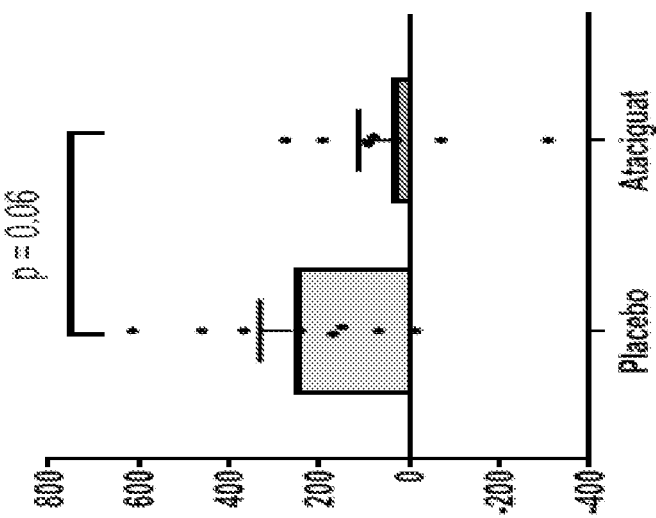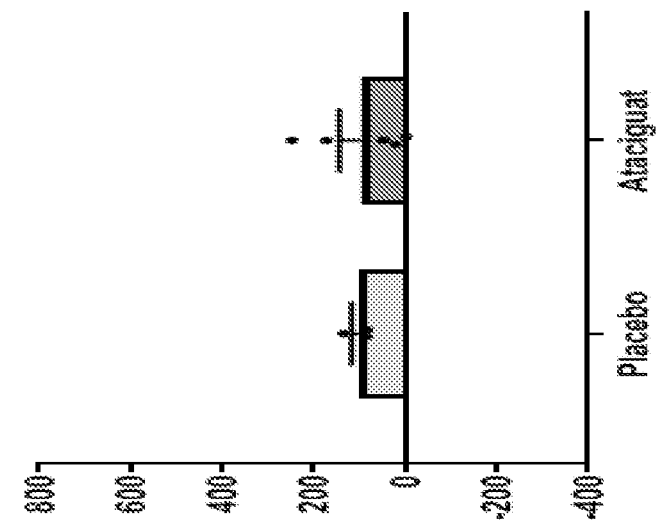

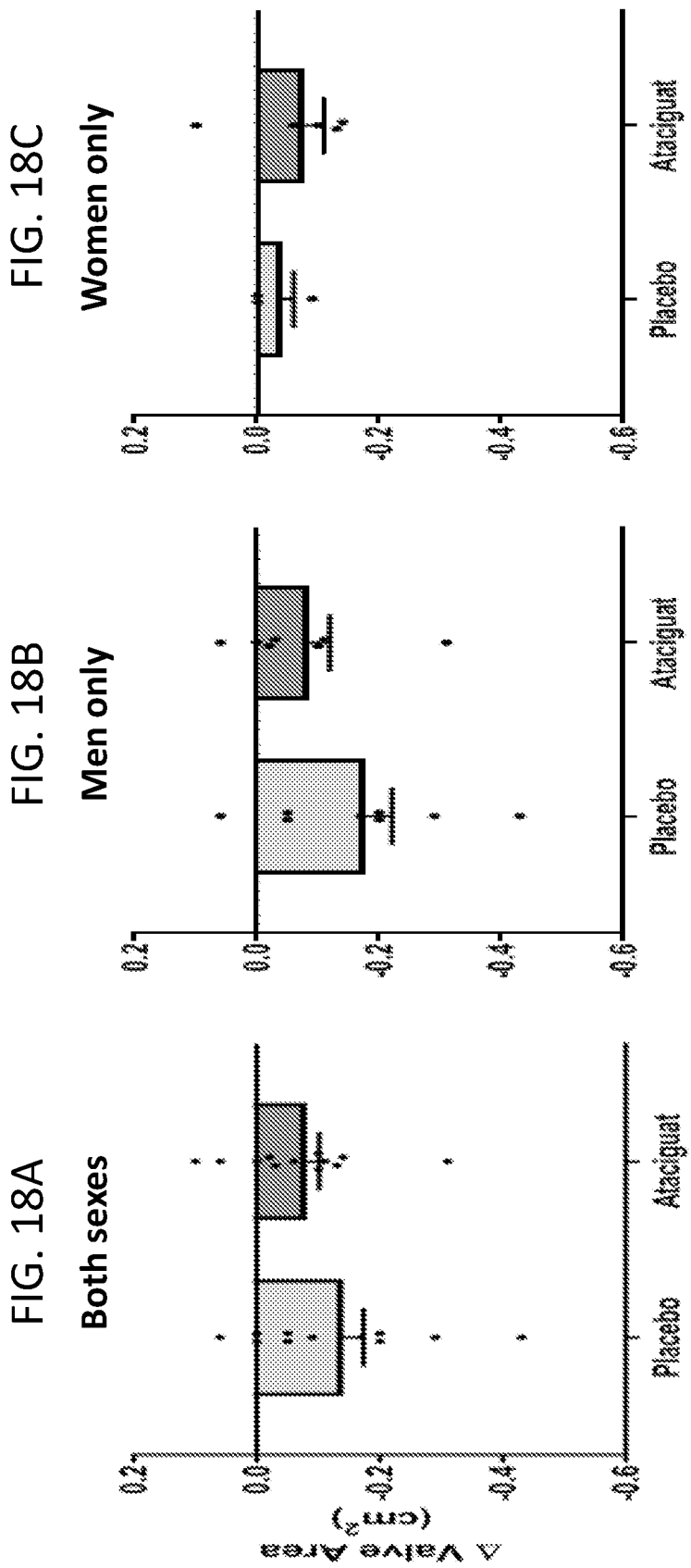

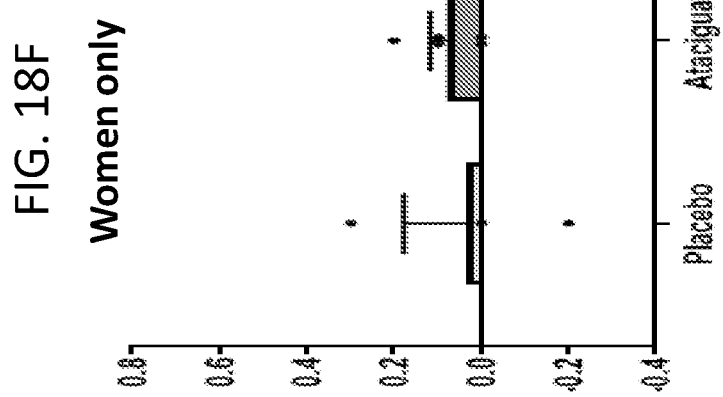
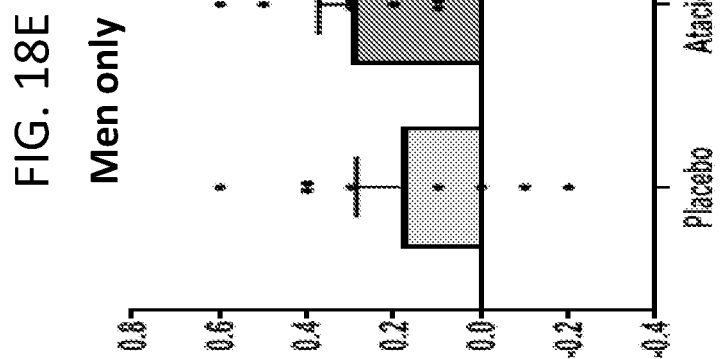
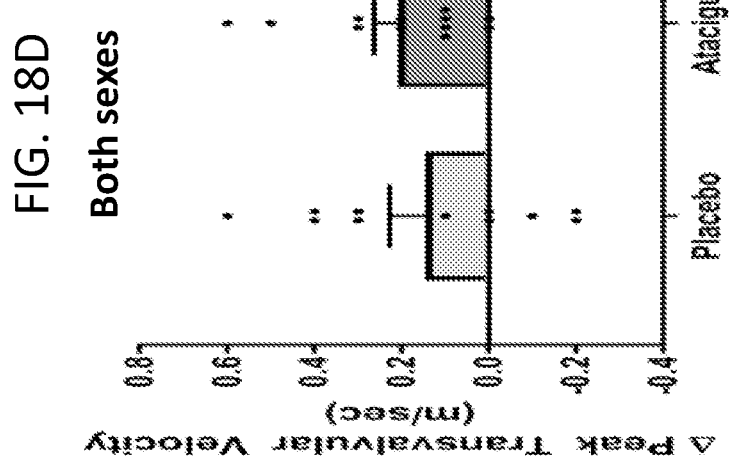

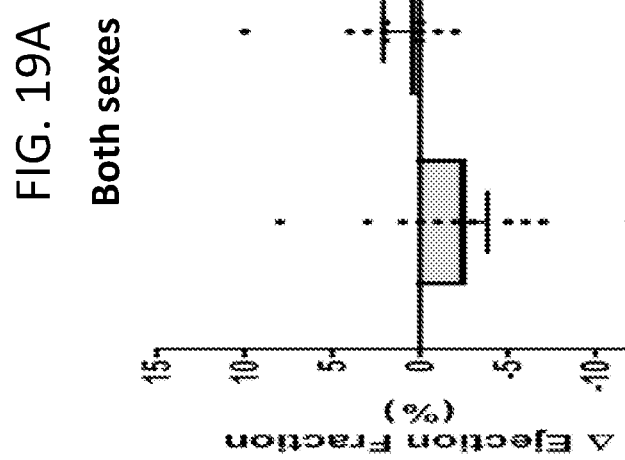
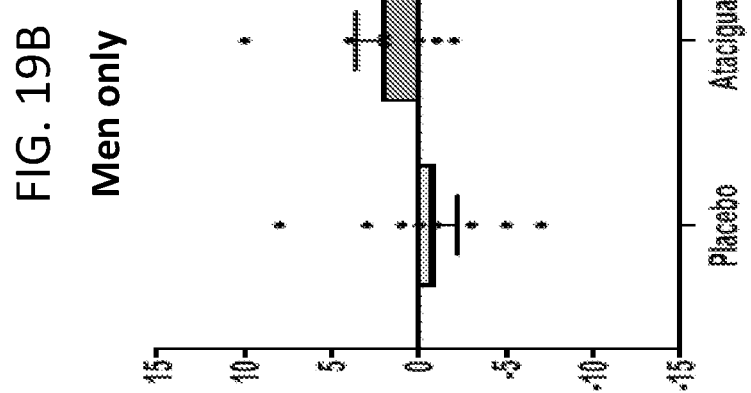
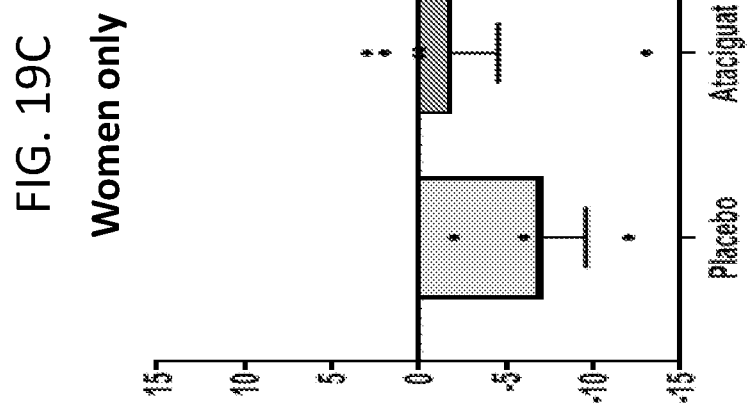
FIG. 19A Both sexes  FIG. 19B Men only  FIG. 19C Women only

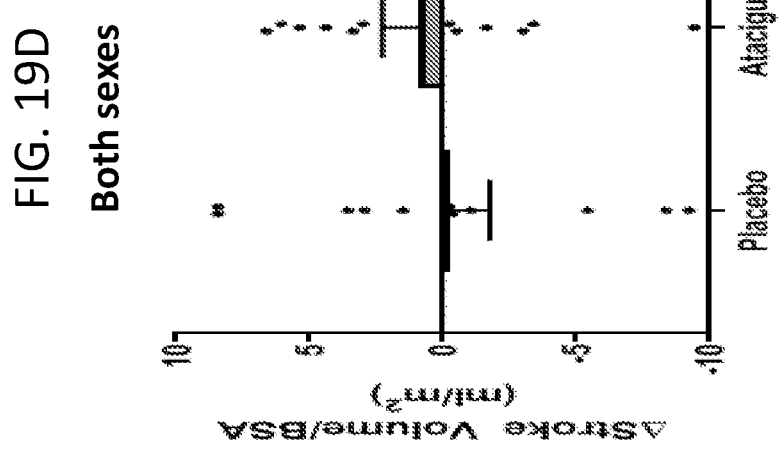
FIG. 19F Women only
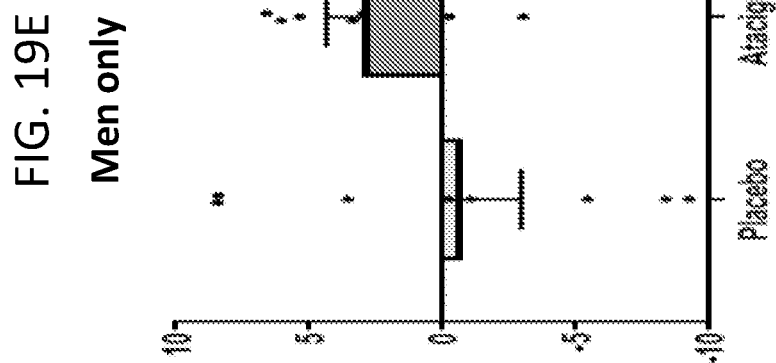
FIG. 19E Men only
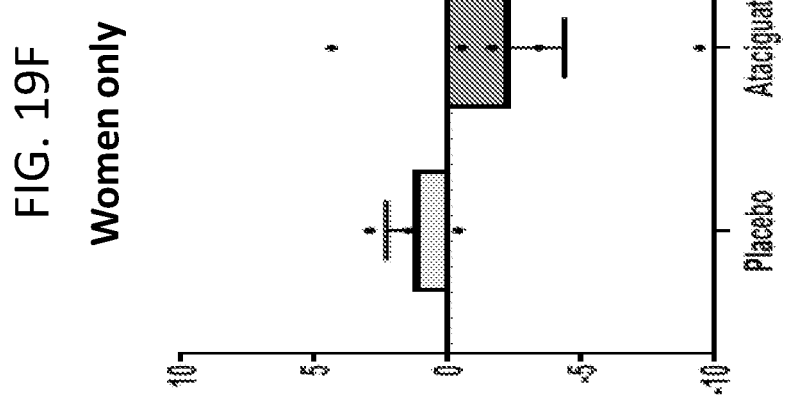
FIG. 19D Both sexes

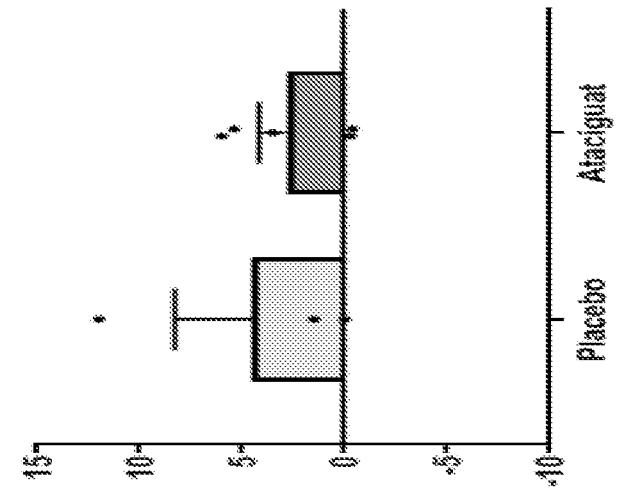
FIG. 20C Women only
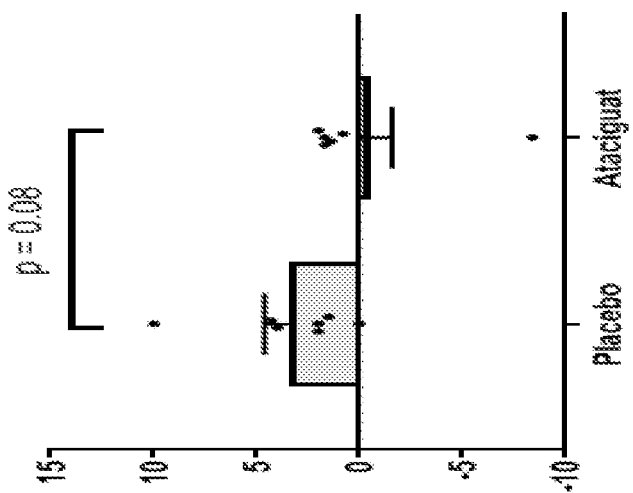
FIG. 20B Men only
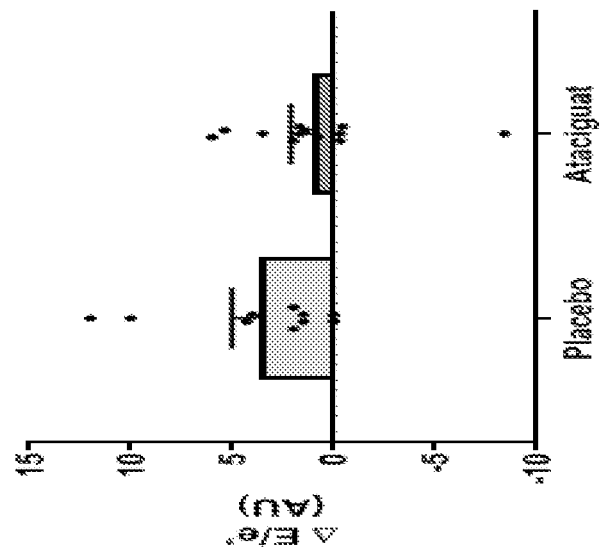
FIG. 20A Both sexes

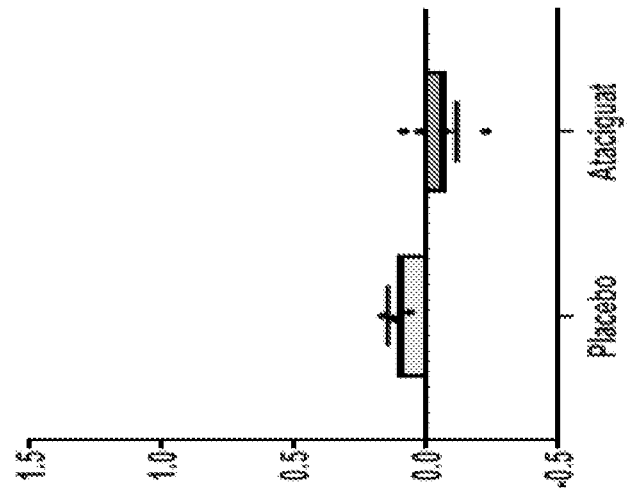
FIG. 20D Both sexes
FIG. 20E Men only
FIG. 20F Women only

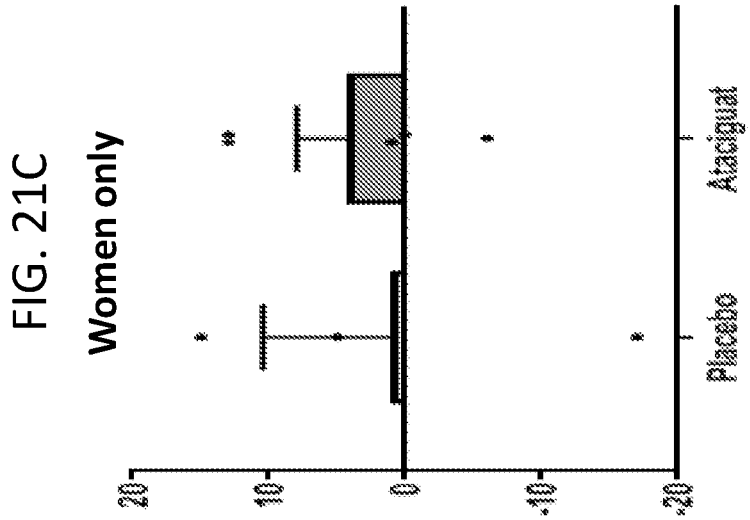
FIG. 21C Women only
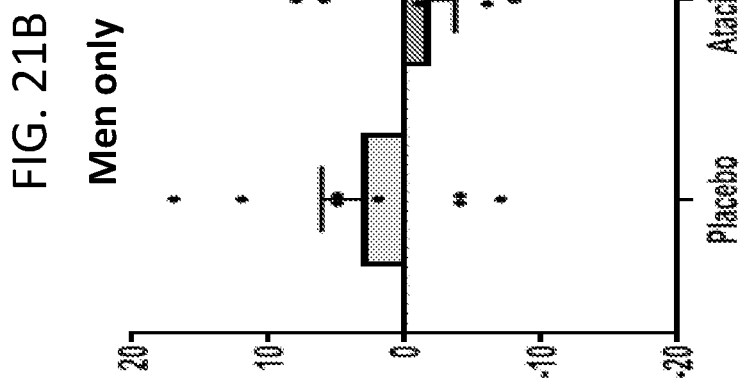
FIG. 21B Men only
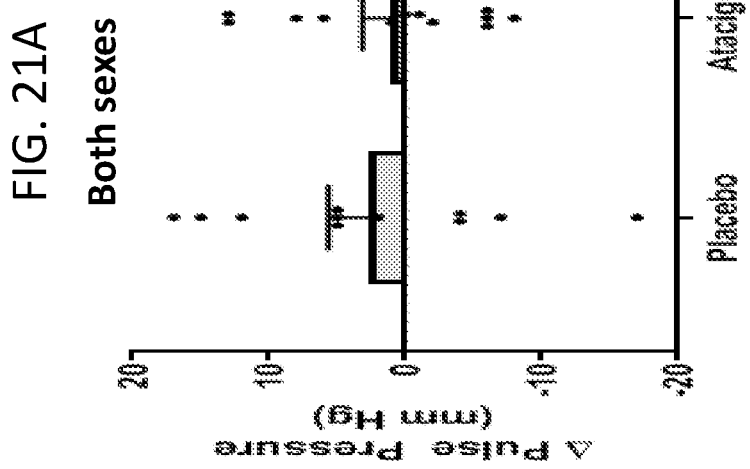
FIG. 21A Both sexes

METHODS AND MATERIALS FOR GENDER-DEPENDENT TREATMENT OF CARDIOVASCULAR DYSFUNCTION

CROSS-REFERENCE TO RELATED APPLICATIONS

This application is a National Stage application under 35 U.S.C. § 371 of International Application No. PCT/US2020/027777, having an International Filing Date of Apr. 10, 2020, which claims benefit of priority from U.S. Provisional Application Ser. No. 62/832,139, filed Apr. 10, 2019.

STATEMENT AS TO FEDERALLY SPONSORED RESEARCH

The invention was made with government support under TR000954 and HL092235 awarded by the National Institutes of Health. The government has certain rights in the invention.

BACKGROUND

1. Technical Field

This document relates to methods and materials involved in treating cardiovascular conditions such as calcific aortic valve stenosis. For example, this document provides methods and materials for using soluble guanylate cyclase (sGC) agonists of the oxidized or non-oxidized form of sGC, or a combination of sGC agonists and cGMP-specific phosphodiesterase 5A (PDE5A) inhibitors, to reduce calcification of heart valves and/or vessels or to slow progression of aortic sclerosis to calcific aortic valve stenosis in male patients.

2. Background Information

Calcific aortic valve stenosis is a disease in which the opening of the aortic valve is narrowed. The symptoms of calcific aortic valve stenosis can vary depending on the degree of valve stenosis. Patients with mild to moderate calcific aortic valve stenosis may lack symptoms, which typically appear in patients with severe calcific aortic valve stenosis. Symptoms can include progressive shortness of breath on exertion, syncope, chest pain, and sudden death.

SUMMARY

This document provides methods and materials involved in treating cardiovascular conditions such as calcific aortic valve stenosis in mammals based on their gender. For example, this document provides methods and materials for using sGC agonists or a combination of sGC agonists and PDE5A inhibitors in male patients to reduce calcification of heart valves and/or vessels or to slow progression of aortic sclerosis to calcific aortic valve stenosis. As described herein, sGC agonists such as ataciguat can be used to slow progression of aortic sclerosis to calcific aortic valve stenosis, but such treatment is more effective in males than in females. Having the ability to effectively slow progression of aortic sclerosis to calcific aortic valve stenosis can allow male patients to live longer and happier lives. In some cases, selectively slowing progression of aortic sclerosis to calcific aortic valve stenosis in male patients can allow female patients to avoid unnecessary treatment with sGC agonists. This document also provides methods and materials for using anti-fibrotic agents to treat females identified as having aortic sclerosis. In some cases, such as when calcification is observed after treatment with an anti-fibrotic agent, females can be treated with one or more sGC agonists. The methods disclosed herein also can be used to reduce blood pressure in mammals who have, or who are at risk of having, hypertension, particularly in a supine position. In addition, the methods disclosed herein can include treatment of diastolic dysfunction, mitigation of elevated pulse pressure, and reduction of blood pressure, particularly in a supine position; in some cases, these methods can be carried out on a gender-dependent basis in which males are treated and females are excluded from treatment.

In one aspect, this document features a method for treating a mammal on the basis of the mammal's gender, where the method includes (a) identifying a mammal as having, or as being at risk of developing, heart valve calcification or vessel calcification, (b) identifying the mammal as a male mammal or a female mammal, and (c) when the mammal is a male mammal, administering a sGC agonist to the male mammal, thereby slowing progression of calcification of a heart valve or vessel within the male mammal, and when the mammal is a female mammal, not administering a sGC agonist to the female mammal and, optionally, administering a treatment that is not a sGC agonist to the female mammal to slow progression of calcification of a heart valve or vessel within the female mammal. The mammal can be a human. The sGC agonist can be ataciguat (5-chloro-2-[[(5-chloro-2-thienyl)sulfonyl]amino]-N-[4-(4-morpholinylsulfonyl)phenyl]-benzamide; HMR1766), YC-I (5-[1-(phenylmethyl)-1H-indazol-3-yl]-2-furanmethanol), BAY 58-2667 (4-[((4-carboxybutyl)(2-[(4-phenethylbenzyl)oxy] phenethyl)amino) methyl[benzoic]acid hydrochloride), BAY 41-2272 (3-(4-amino-5-cyclopropylpyrimidin-2-yl)-1-(2-fluorobenzyl)-1H-pyrazolo[3,4-b]pyridine), BAY-41-8543 (2-[1-[(2-fluorophenyl)methyl]-1H-pyrazolo[3,4-b]pyridin-3-yl]-5-(4-morpholinyl)-4,6-pyrimidinediamine), BAY 63-2521 (methyl (4,6-diamino-2-(1-(2-fluorobenzyl)-1H-pyrazolo[3,4-b]pyridin-3-yl)pyrimidin-5-yl)(methyl)carbamate), CFM-1571 (3-[3-(dimethylamino)propoxy]-N-(4-methoxyphenyl)-1-(phenylmethyl)-1H-pyrazole-5-carboxamide hydrochloride), A-350619 (3-[2-(4-chlorophenylthio)phenyl]-N-(4-dimethylaminobutyl) acrylamide), vericiguat (methyl (4,6-diamino-2-(5-fluoro-1-(2-fluorobenzyl)-1H-pyrazolo[3,4-b]pyridin-3-yl) pyrimidin-5-yl)carbamate), praliciguat (1,1,1,3,3,3-hexafluoro-2-[({5-fluoro-2-[1-(2-fluorobenzyl)-5-(1,2-oxazol-3-yl)-1H-pyrazol-3-yl]pyrimidin-4-yl}amino) methyl]propan-2-ol), olinciguat ((2R)-3,3,3-trifluoro-2-{[(5-fluoro-2-{1-[(2-fluorophenyl)methyl]-5-(1,2-oxazol-3-yl)-1H-pyrazol-3-yl}pyrimidin-4-yl)amino]methyl}-2-hydroxypropanamide), bis-heteroaryl pyrazole IWP-051 (5-fluoro-2-(1-(2-fluorobenzyl)-5-(isoxazol-3-yl)-1H-pyrazol-3-yl)pyrimidin-4(3H)-one), IW-6463, GSK2181236A (1-(6-{2-[({3-methyl-4'-[(trifluoromethyl)oxy]-4-biphenylyl}methyl)oxy]phenyl}-2-pyridinyl)-5-(trifluoromethyl)-1H-pyrazole-4-carboxylic acid), IWP-550, IWP-854 (4-(5-fluoro-2-(1-(2-fluorobenzyl)-5-(isoxazol-3-yl)-1H-pyrazol-3-yl)pyrimidin-4-yl)-1-(3-methyl-3H-diazirin-3-yl)-N-(37-oxo-41-((3aS,4S,6aR)-2-oxohexahydro-1H-thieno[3,4-d]imidazol-4-yl)-3,6,9,12,15,18,21,24,27,30,33-undecaoxa-36-azahentetracontyl)-7,10,13,16-tetraoxa-4-azanonadecan-19-amide), IWP-953, nelociguat (methyl (4,6-diamino-2-(1-(2-fluorobenzyl)-1H-pyrazolo[3,4-b] pyridin-3-yl)pyrimidin-5-yl)carbamate), MGV354 ((S)-1-(6-(3-((4-(1-(cyclopropanecarbonyl)piperidin-4-yl)-2-methylphenyl)amino)-2,3-dihydro-1H-inden-4-yl)pyridin-2-yl)-

5-methyl-1H-pyrazole-4-carboxylic acid), BI 703704 ((1R, 5S,8s)-3-(4-(5-methyl-2-((2-methyl-4-(piperidine-1-carbonyl)benzyl)oxy)phenyl)thiazol-2-yl)-3-azabicyclo [3.2.1]octane-8-carboxylic acid), S3448 (2-[[(4-chlorophenyl)sulfonyl]amino]-4,5-dimethoxy-N-[4-(4-thiomorpholinylsulfonyl)phenyl]benzamide), or BAY 60-2770 (4-[[(4-carboxybutyl)[2-[5-fluoro-2-[[4'-(trifluoromethyl))[1,1'-biphenyl]-4-yl]methoxy]phenyl]ethyl] amino]methyl]benzoic acid). The method can further include administering a PDE5A inhibitor to the male mammal. The method can further include identifying the male mammal as having an elevated plasma level of lysophosphatidic acid (LPA). The method can include administering an anti-fibrotic agent to the female mammal to slow progression of calcification of a heart valve or vessel within the female mammal.

In another aspect, this document features a method for treating a population of mammals identified as having, or as being at risk for developing, heart valve calcification or vessel calcification, wherein the population includes at least one male mammal and at least one female mammal, and where the method includes administering a sGC agonist to the at least one male mammal, thereby slowing progression of calcification of a heart valve or vessel within the at least one male mammal, and not administering the sGC agonist to the at least one female mammal. The mammals can be human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the at least one male mammal. The at least one male mammal also can be identified as having an elevated plasma level of LPA.

In another aspect, this document features a method for treating a population of mammals based on gender, where the method includes (a) identifying the gender of mammals in a population determined to have, or to be at risk for developing, heart valve calcification or vessel calcification, and (b) administering a sGC agonist to mammals identified as being male mammals and not administering a sGC agonist to mammals identified as being female mammals and, optionally, administering a treatment that is not a sGC agonist to the female mammals. The mammals can be human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the mammals identified as being male mammals. The mammals identified as being male mammals also can be determined to have an elevated plasma level of LPA. The method can include administering an anti-fibrotic agent to the mammals identified as being female mammals.

In still another aspect, this document features a method for avoiding the unnecessary use of a sGC agonist to treat a mammal having, or at risk of developing, heart valve calcification or vessel calcification, where the method includes identifying the mammal as being a female mammal and as having, or at risk of developing, the heart valve calcification or vessel calcification, and excluding the female mammal from treatment with the sGC agonist based, at least in part, on the female gender of the female mammal. The mammal can be a human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770.

This document also features a method for treating a mammal on the basis of the mammal's gender, where the method includes (a) identifying a mammal as having, or as being at risk of developing, aortic sclerosis, (b) identifying the mammal as a male mammal or a female mammal, and (c) when the mammal is a male mammal, administering a sGC agonist to the male mammal, thereby slowing progression of aortic sclerosis to calcific aortic valve stenosis within the male mammal, and when the mammal is a female mammal, not administering a sGC agonist to the female mammal and, optionally, administering a treatment that is not a sGC agonist to the female mammal to slow progression of aortic sclerosis to calcific aortic valve stenosis within the female mammal. The mammal can be a human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the male mammal. The method can further include identifying the male mammal as having an elevated plasma level of LPA. The method can include administering an anti-fibrotic agent to the female mammal.

In another aspect, this document features a method for treating a population of mammals identified as having, or as being at risk for developing, aortic sclerosis, wherein the population includes at least one male mammal and at least one female mammal, where the method includes administering a sGC agonist to the at least one male mammal, thereby slowing progression of aortic sclerosis to calcific aortic valve stenosis within the at least one male mammal, and not administering the sGC agonist to the at least one female mammal. The mammals can be human. The sGC agonist can be vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the at least one male mammal. The method can further include identifying the at least one male mammal as having an elevated plasma level of LPA.

In another aspect, this document features a method for treating a population of mammals based on gender, where the method includes (a) identifying the gender of mammals in a population determined to have, or to be at risk for developing, aortic sclerosis, and (b) administering a sGC agonist to mammals identified as being male mammals and not administering a sGC agonist to mammals identified as being female mammals and, optionally, administering a treatment that is not a sGC agonist to the female mammals. The mammals can be human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the mammals identified as being male mammals. The mammals identified as being male mammals can further have been determined to have an elevated plasma level of LPA. The method can include administering an anti-fibrotic agent to the mammals identified as being female mammals.

In yet another aspect, this document features a method for avoiding the unnecessary use of a sGC agonist to treat a mammal having, or at risk of developing, aortic sclerosis, where the method includes identifying the mammal as being a female mammal and as having, or at risk of developing, the aortic sclerosis, and excluding the female mammal from treatment with the sGC agonist based, at least in part, on the female gender of the female mammal. The method mammal can be a human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770.

In another aspect, this document features a method for treating a mammal, where the method includes (a) identifying the mammal as having, or as being at risk for, hypertension when in a supine position, and (b) administering to a sGC agonist to the mammal, thereby reducing blood pressure in the supine position. The mammal can be a human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the mammal. The method can further include identifying the mammal as being a male mammal prior to the administering. The administering may not reduce blood pressure when the mammal is in an upright position.

In still another aspect, this document features a method for treating a population of mammals identified as having, or as being at risk for developing hypertension in a supine position, wherein the population includes at least one male mammal and at least one female mammal, and where the method includes administering a sGC agonist to the at least one male mammal, thereby reducing blood pressure and preventing deleterious side effects of hypertension while in the supine position in the at least one male mammal, and not administering the sGC agonist to the at least one female mammal. The mammals can be human. The sGC agonist can be ataciguat, YC-I, BAY 58-2667, BAY 41-2272, BAY-41-8543, BAY 63-2521, CFM-1571, A-350619, vericiguat, praliciguat, olinciguat, bis-heteroaryl pyrazole IWP-051, IW-6463, GSK2181236A, IWP-550, IWP-854, IWP-953, nelociguat, MGV354, BI 703704, S3448, or BAY 60-2770. The method can further include administering a PDE5A inhibitor to the at least one male mammal. The method can include administering an anti-fibrotic agent to the at least one female mammal. The administering may not reduce blood pressure when the mammal is in an upright position.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIGS. 2A and 2B are graphs plotting levels of phospho-SMAD1/5/8, a key mediator of bone morphogenetic protein (BMP) signaling, in male (FIG. 2A) and female (FIG. 2B) mice with established aortic valve disease after treatment with ataciguat/HMR1766 (WD+ATA) or control (WD). These studies showed that ataciguat effectively reduced canonical bone morphogenetic signaling in both treated mice. Phospho-SMAD1/5/8 levels were assessed using immunohistochemical techniques and confocal microscopy.

FIGS. 3A-3D are a series of graphs plotting levels of molecular markers of tissue calcification in both male and female mice with established aortic valve disease after treatment with ataciguat/HMR1766 (WD+ATA) or control (WD). Ataciguat effectively reduced both osteopontin (SPP1; FIGS. 3A and 3B) and Runx2 (a master regulator of osteogenesis; FIGS. 3C and 3D) in male (FIGS. 3A and 3C) and female (FIGS. 3B and 3D) mice, consistent with reduced tissue calcification observed in vivo (see, FIGS. 4A and 4B). mRNA levels were assessed using quantitative real-time RT-PCR.

FIGS. 6A-6D are graphs plotting levels of collagen isoform expression (a major determinant of tissue fibrosis) in male (FIGS. 6A and 6C) and female (FIGS. 6B and 6D) mice with established aortic valve disease, after treatment with ataciguat/HMR1766 (WD+ATA) or control (WD). HMR1766 did not significantly affect expression of collagen 1a1 (a major structural collagen isoform) in male mice (FIG. 6A), but significantly reduced Col1a1 expression in female mice (FIG. 6B). Further, expression of Col15a1 (a significant basement membrane structural isoform) was increased in male mice (FIG. 6C) but tended to be reduced in female mice (FIG. 6D). Collectively, these studies showed that ataciguat did not alter or increased collagen isoform expression in males, but reduced collagen isoform expression in females. mRNA levels were assessed using quantitative real-time RT-PCR.

FIGS. 7A and 7B are graphs plotting the level of matrix metalloproteinase 2 (MMP2, a major determinant of collagen fiber degradation/remodeling) expression in male (FIG. 7A) and female (FIG. 7B) mice with established aortic valve disease, after treatment with ataciguat/HMR1766 (WD+ATA) or control (WD). HMR1766 did not significantly affect MMP2 mRNA levels in either male or female mice; it was noted that the female mice tended to have higher levels of MMP2 mRNA than littermate-matched males. Collectively, these data suggested that although HMR1766 did not appear to impact matrix remodeling enzyme expression, female mice might be more prone to excess matrix remodeling over time. mRNA levels were assessed using quantitative real-time RT-PCR.

FIGS. 8A-8D are graphs plotting collagen fiber architecture in male (FIGS. 8A and 8B) and female (FIGS. 8C and 8D) mice with established aortic valve disease, after treatment with ataciguat/HMR1766 (WD+ATA) or control (WD). Ataciguat did not impact relative collagen fiber thicknesses in male mice, but ataciguat did increase the fraction of thinner fibers (and reduced the fraction of thicker fibers) in female mice. Importantly, these changes are consistent with the molecular changes in collagen isoform and MMP2 expression in each gender. Collagen fiber thickness was assessed histologically using picrosirius red staining followed by microscopic imaging under circularly polarized light (which leverages the birefringent properties of collagen).

FIGS. 9A and 9B are graphs plotting aortic valve function in male (FIG. 9A) and female (FIG. 9B) mice with established aortic valve disease, after treatment with ataciguat/HMR1766 (WD+ATA) or control (WD). Data were obtained using a previously validated approach of measuring cusp separation distance by high resolution echocardiography, where a larger separation distance indicates better function. The data suggested that only male mice received a therapeutic benefit from long-term treatment with ataciguat.

FIGS. 10A-10D are graphs plotting measures of ventricular function in male (FIGS. 10A and 10C) and female (FIGS. 10B and 10D) mice with established aortic valve disease, after treatment with ataciguat/HMR1766 (WD+ATA) or control (WD). Consistent with prior reports showing resistance to systolic dysfunction in the face of moderate pressure overload in mice, ejection fraction was well-preserved in WD-fed mice and was not improved further by ataciguat (FIGS. 10A and 10B). Diastolic function (measured using E/e', which is clinically known to also predict poor outcomes in numerous patient populations) was impaired in WD-fed mice of both genders (the normal value approximately 20-25 in mice), and was significantly improved in male mice after ataciguat treatment (FIG. 10C) but not in female mice (FIG. 10D). Ventricular function was assessed using high resolution echocardiography.

FIGS. 17A-17C are graphs plotting changes in aortic valve calcification in humans with mild-to-moderate aortic valve stenosis, before and after treatment with placebo or ataciguat/HMR1766 (200 mg/day, once daily) for six months (randomized, double-blind study design). Treatment with ataciguat significantly attenuated progression of valve calcification when data from subjects of both sexes are combined (FIG. 17A). When data were split by gender, however, it became evident that male patients (FIG. 17B)

Figure 1A:
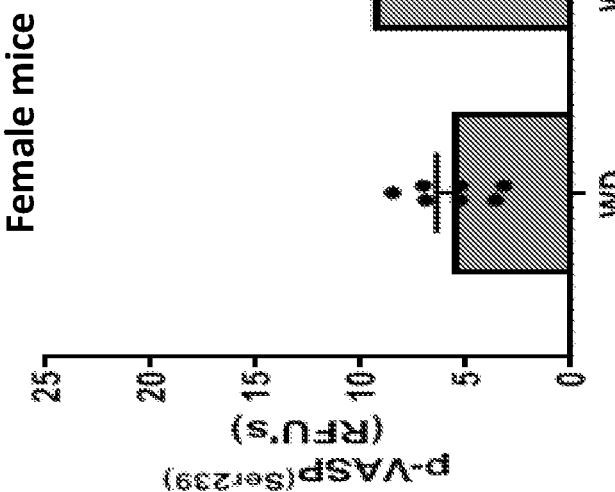
FIGS. 1A and 1B are graphs plotting levels of phospho-$VASP^{239}$ in aortic valve tissue of male (FIG. 1A) and female (FIG. 1B) mice with established aortic valve disease after treatment with ataciguat/HMR1766 (WD+ATA) vs. control (WD). These studies demonstrated that ataciguat effectively activated soluble guanylyl cyclase in treated mice. Phospho-$VASP^{239}$ levels were assessed using immunohistochemical techniques and confocal microscopy.

received a much greater therapeutic benefit from treatment with ataciguat, compared to females (FIG. 17C).

FIGS. 18A-18F are graphs plotting changes in aortic valve function in humans with mild-to-moderate aortic valve stenosis, before and after treatment with placebo or ataciguat/HMR1766 (200 mg/day, once daily) for six months (randomized, double-blind study design). Using changes in aortic valve area (FIGS. 18A-18C) as a measure of valve function, it was concluded that treatment with ataciguat can attenuate progression of aortic valve dysfunction when subjects of both sexes are combined (FIG. 18A). Similar to changes in valve calcium, a therapeutic benefit was predominantly conferred to male patients (FIG. 18B) as compared to female patients (FIG. 18C). While the changes in peak transvalvular velocity (FIGS. 18D-18F) as a measure of valve dysfunction could be considered to indicate a negligible impact of ataciguat on progression of valve dysfunction, this measure is critically influenced by changes in left ventricular systolic function. As depicted in FIGS. 19A-19F, improvements in left ventricular systolic function did explain the artifactual "masking" of therapeutic benefit when velocimetric measures were used.

FIGS. 19A-19F are graphs plotting changes in left ventricular systolic function in humans with mild-to-moderate aortic valve stenosis, before and after treatment with placebo or ataciguat/HMR1766 (200 mg/day, once daily) for six months (randomized, double-blind study design). Using either left ventricular ejection fraction (FIGS. 19A-19C) or left ventricular stroke volume (FIGS. 19D-19F) as a measure of valve function, it was concluded that treatment with ataciguat could prevent the decline in left ventricular function that was observed in the placebo group when all subjects were combined (FIGS. 19A and 19D). When only male subjects were evaluated, however, the data suggested that ataciguat not only prevented declines in left ventricular function, but also improved left ventricular systolic function (FIGS. 19B and 19E), which would serve to drive "artifactual" elevations in peak transvalvular velocity as observed in FIG. 18 and mask preserved valvular function. Female subjects appeared to receive no consistent benefit from ataciguat on left ventricular systolic function (FIG. 19C), and even demonstrated a potential worsening of stroke volume (FIG. 19F).

FIGS. 20A-20F are graphs plotting changes in left ventricular diastolic function in humans with mild-to-moderate aortic valve stenosis before and after treatment with placebo or ataciguat/HMR1766 (200 mg/day, once daily) for six months (randomized, double-blind study design). Using either changes in E/e' (FIGS. 20A-20C) or the E/A ratio (FIGS. 20D-20F), the data suggested that ataciguat can attenuate further progression of diastolic dysfunction associated with aortic valve stenosis when all subjects were combined (FIGS. 20A and 20D). When only male subjects were examined, however, it was evident that males are the predominant recipients of any therapeutic benefit conferred by long-term treatment with ataciguat (FIGS. 20B and 20E). In contrast, females received negligible therapeutic benefit with regard to left ventricular diastolic function from long-term treatment with ataciguat compared to placebo-treated subjects (FIGS. 20C and 20F).

FIGS. 21A-21C are graphs plotting changes in aortic pulse pressure in seated humans with mild-to-moderate aortic valve stenosis, before and after treatment with placebo or ataciguat/HMR1766 (200 mg/day, once daily) for six months (randomized, double-blind study design). The data suggested that ataciguat attenuated pulse pressure (an index of arterial stiffness) when all subjects were combined (FIG. 21A). When data from only male subjects were examined, however, it was evident that males are the predominant recipients of any therapeutic benefit with regard to pulse pressure or arterial stiffness conferred by long-term treatment with ataciguat (FIG. 21B). In contrast, females received no apparent therapeutic benefit from long-term treatment with ataciguat with regard to changes in pulse pressure function, as compared to placebo-treated female subjects (FIG. 21C).

Figure 22:
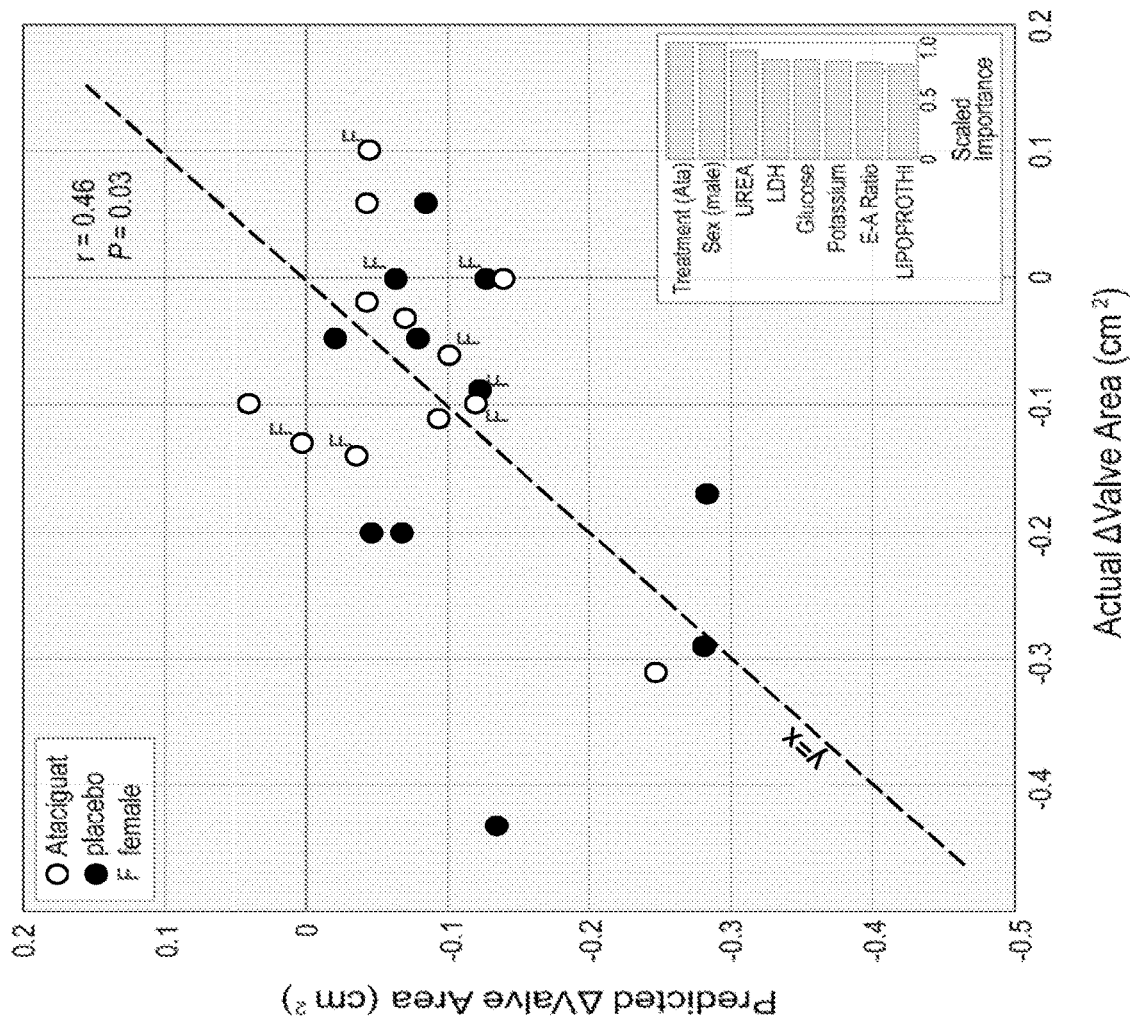

FIG. 22 is a graph resulting from the use of a non-biased, machine-learning/neural network algorithm to determine if baseline phenotypic variables can predict progression of aortic valve dysfunction and response to treatment in patients. Patient gender, age, treatment group (ataciguat or placebo), and measurements from blood tests and echocardiograms, were used as features to train a neural network regression model for predicting change in aortic valve area. Model performance was evaluated through 10-fold cross-validation. The bottom right inset indicates the top eight variables that were the most informative to the model's decision-making process. Critically, treatment group (placebo vs. ataciguat) and gender (male vs. female) were the two strongest predictive components identified from this non-biased approach.

Figure 23:
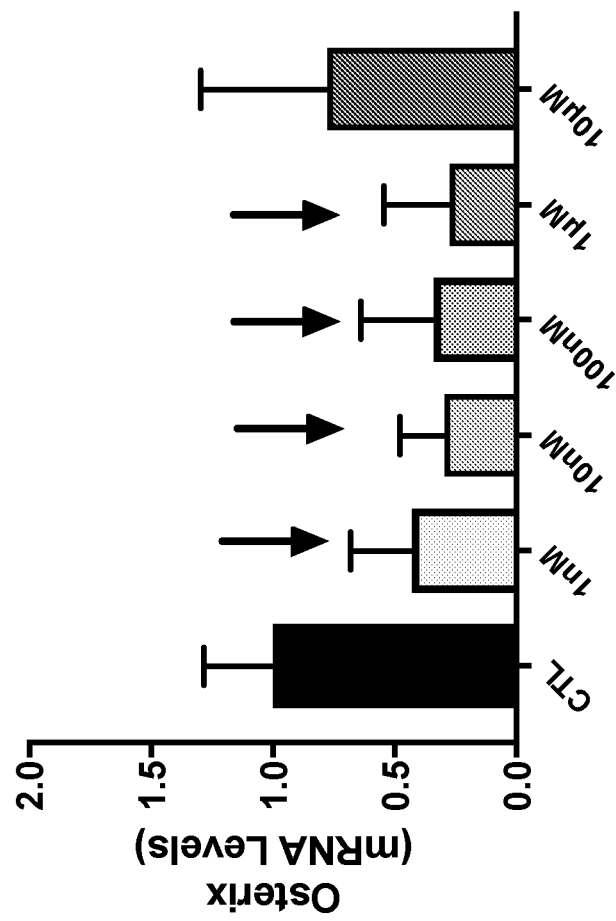

FIG. 23 is a graph plotting expression of the bone morphogenetic protein (BMP) target gene, Osterix (also known as transcription factor Sp7), in aortic valve interstitial cells treated with nelociguat. Nelociguat concentrations of 1 nM to 1 µM reduced BMP signaling (arrows denote the efficacious range).

Figure 24:
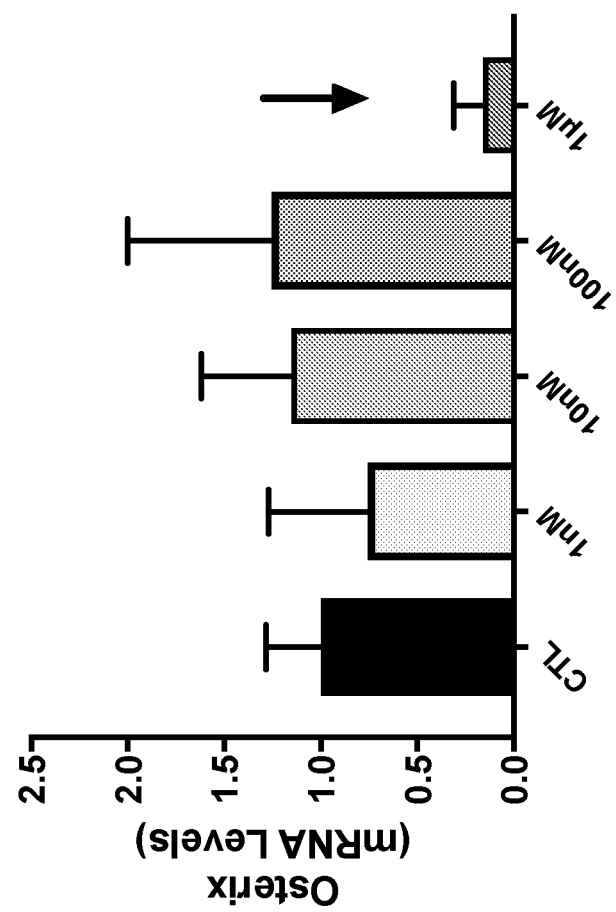

FIG. 24 is a graph plotting expression of Osterix in aortic valve interstitial cells treated with vericiguat. Only relatively high doses of vericiguat were effective to reduce BMP target gene expression (denoted by the arrow).

Figure 25:
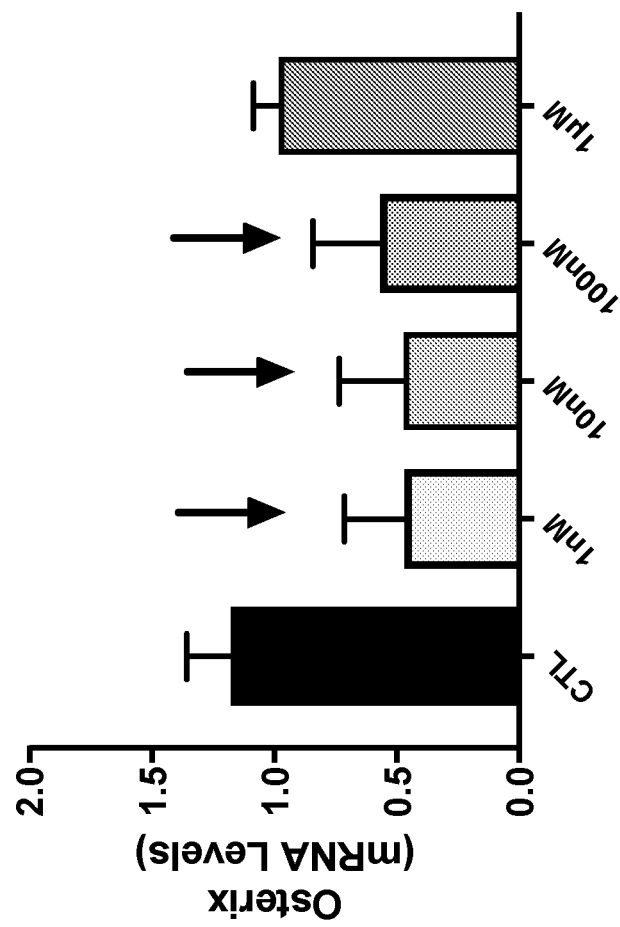

FIG. 25 is a graph plotting expression of Osterix in aortic valve interstitial cells treated with lificiguat. Similar to nelociguat, lificiguat appeared to lose its efficacy at higher concentrations in vitro.

Figure 26:
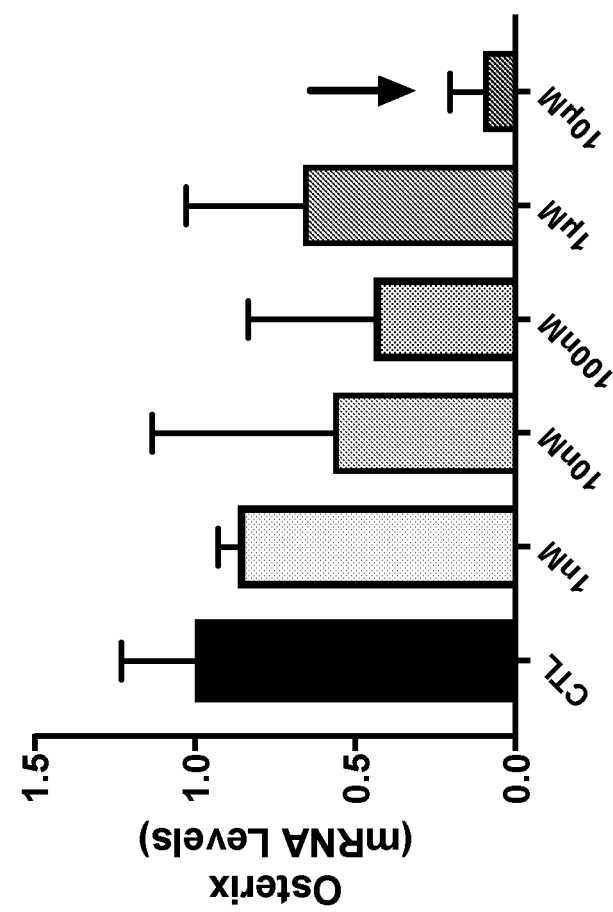

FIG. 26 is a graph plotting expression of Osterix in aortic valve interstitial cells treated with BAY41-8543. BAY41-8543 tended to drive dose-dependent reductions in BMP target gene expression, and was highly efficacious at 10 µM.

Figure 27:
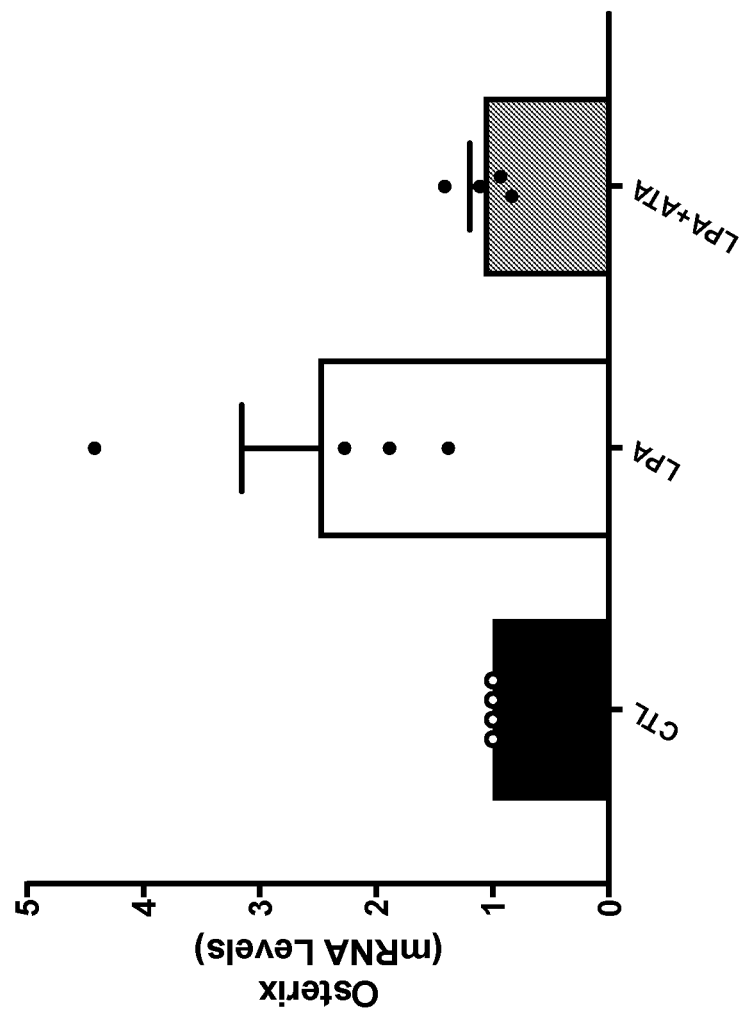

FIG. 27 is a graph plotting expression of Osterix in aortic valve interstitial cells treated with lysophosphatidic acid (LPA; specifically, 18:0 lyso-PA), with or without ataciguat (ATA), to assess LPA-induced BMP signaling and BMP target gene expression. Treatment with 18:0 LPA increased expression of the BMP target gene (center bar), while ataciguat dramatically suppressed this effect (right bar).

Figure 28:
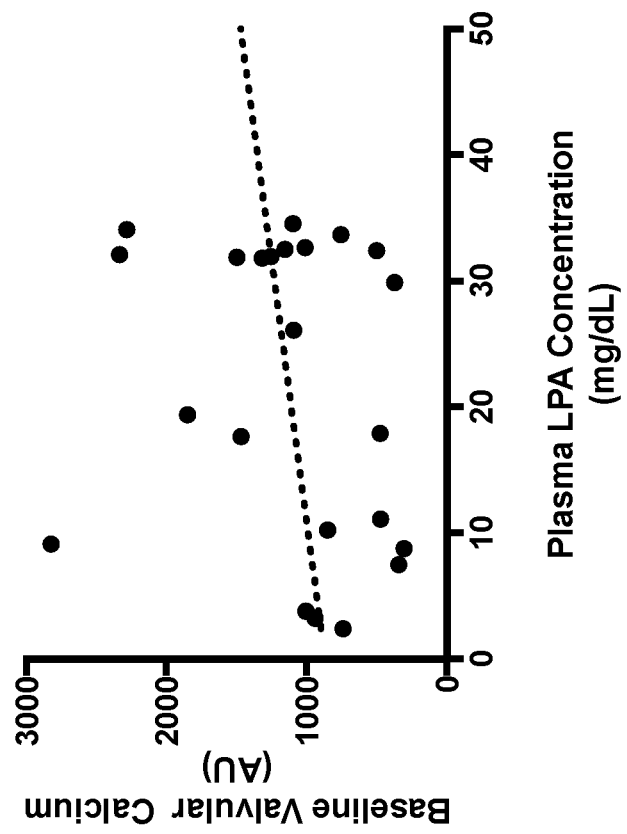

FIG. 28 is a graph plotting the relationship between plasma LPA levels and baseline levels of valvular calcium (measured using CT scanning) in patients with mild to moderate aortic valve stenosis. Higher plasma LPA levels were associated with greater calcium levels in this patient cohort.

Figure 29:
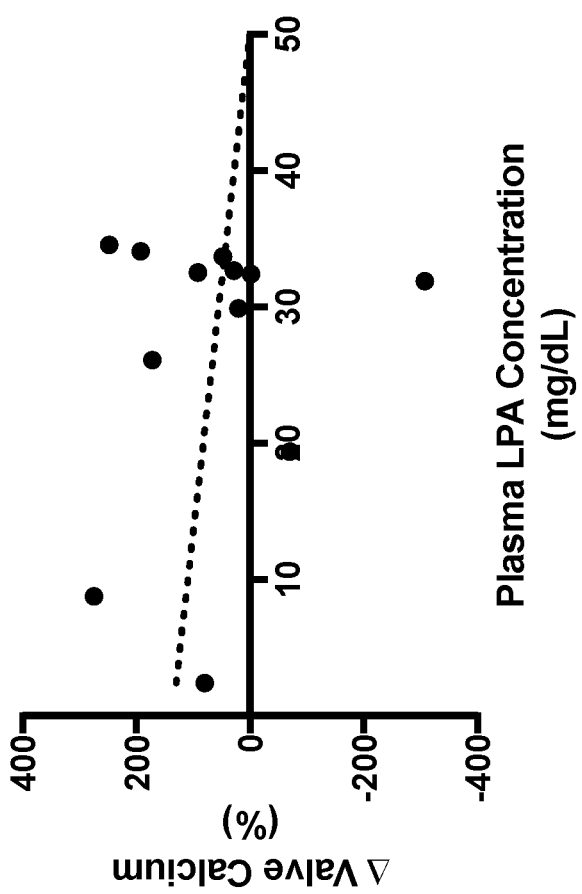

FIG. 29 is a graph plotting the relationship between baseline plasma LPA levels and changes in valvular calcium (measured using CT scanning) in patients with mild to moderate aortic valve stenosis who were treated with ataciguat for 6 months. Patients with higher levels of LPA tended to show a greater attenuation of excess BMP signaling when treated with ataciguat.

DETAILED DESCRIPTION

This document provides methods and materials involved in treating cardiovascular conditions such as calcific aortic valve stenosis based, at least in part, on gender. For example, this document provides methods and materials for using one or more sGC agonists or a combination of one or more sGC agonists and one or more PDE5A inhibitors to reduce calcification of heart valves and/or vessels or to slow progression of aortic sclerosis to calcific aortic valve stenosis in male patients. As described herein, sGC agonists appear to be less effective in females than in males. Methods and materials for excluding females from such treatment also are provided herein, as are alternative methods for treating females.

In some cases, this document provides methods for treating mammals on the basis of gender, where the methods include identifying a mammal as having, or as being at risk of developing, a cardiovascular condition (e.g., heart valve calcification, vessel calcification, aortic sclerosis, arterial stiffness, or left ventricular systolic or diastolic dysfunction), and identifying the gender of the mammal. If the mammal is a male, the method can include administering a sGC agonist in order to slow progression of the cardiovascular condition (e.g., calcification of a heart valve or vessel, or progression of aortic sclerosis to calcific aortic valve stenosis) in the male mammal. If the mammal is a female, the method can exclude administering a sGC agonist to the mammal. In some cases, if the mammal is a female, the method can include administering a treatment that is not a sGC agonist, in order to slow progression of the cardiovascular condition. In some cases, if the mammal is a female, the method can include administering an anti-fibrotic agent, in order to slow progression of the cardiovascular condition. In some cases, if calcification develops in the female mammal after administration of the anti-fibrotic agent, a sGC agonist can subsequently be administered to the female mammal.

In some cases, the methods provided herein can include treating a population of mammals that includes at least one male and at least one female that have been identified as having, or as being at risk for developing, a cardiovascular condition (e.g., heart valve calcification, vessel calcification, aortic sclerosis, or left ventricular systolic or diastolic dysfunction). Such methods can include administering a sGC agonist to the at least one male mammal, thereby slowing progression of the cardiovascular condition within the at least one male mammal, and not administering the sGC agonist to the at least one female mammal. The methods provided herein therefore can avoid the unnecessary use of sGC agonists to treat female mammals identified as having, or at risk of developing, a cardiovascular condition such as heart valve calcification, vessel calcification, aortic sclerosis, or left ventricular systolic or diastolic dysfunction. In some cases, the methods can include administering an anti-fibrotic agent to the at least one female mammal. If calcification develops in the at least one female mammal after treatment with the anti-fibrotic agent, the mammal can be treated with a sGC agonist.

The methods disclosed herein also can be used to reduce blood pressure in mammals who have, or who are at risk of having, hypertension (e.g., hypertension while in a supine position). The methods also can be used to treat diastolic dysfunction and mitigate elevated pulse pressure. In some cases, these methods also can be carried out on a gender-dependent basis, such that male mammals are treated with a sGC agonist (with or without a PDE5A inhibitor), while females are excluded from treatment. In some cases, the methods can be carried out on a gender-dependent basis, such that female mammals are treated with an anti-fibrotic agent.

Any type of mammal having a cardiovascular condition such as calcific aortic valve stenosis can be treated as described herein. For example, male humans and other primates such as monkeys having a cardiovascular condition such as calcific aortic valve stenosis can be treated with one or more sGC agonists, or with one or more sGC agonists and one or more PDE5A inhibitors. In some cases, male dogs, cats, horses, cows, pigs, sheep, mice, and rats can be treated with one or more sGC agonists or a combination of one or more sGC agonists and one or more PDE5A inhibitors as described herein. In some cases, female humans or other female mammals (e.g., non-human primates, dogs, cats, horses, cows, pigs, sheep, mice, and rats) having a cardiovascular condition such as calcific aortic valve stenosis can be treated with one or more anti-fibrotic agents as described herein.

Any appropriate method can be used to identify a mammal having a cardiovascular condition such as calcific aortic valve stenosis or aortic sclerosis. For example, echocardiography or computed tomography scanning can be used to identify a human having aortic sclerosis that is at risk of progressing into calcific aortic valve stenosis.

In some cases, a mammal can be identified for treatment based on an elevated level of LPA, a phospholipid derivative that can act as a signaling molecule and a mitogen. Increased LPA levels can indicate an increased risk of aortic valve calcification and stenosis. Moreover, as described in the Examples herein, elevated LPA levels may also be a primary indicator of response to sGC agonists. The term "elevated level" as used herein with respect to blood levels of LPA refers to any level that is above a threshold level (e.g., a threshold plasma level) for a control population of healthy mammals (e.g., an age-matched random population of 10, 20, 30, 40, 50, 100, or 500 healthy mammals) that do not have a cardiovascular condition as described herein. In some cases, a threshold LPA level can be, without limitation, 5 mg/dL or greater (e.g., 10 mg/dL, 20 mg/dL, 25 mg/dL, 30 mg/dL, 40 mg/dL, or 50 mg/dL). Any appropriate method can be used to determine a blood level of LPA. For example, polypeptide detection methods such as immunoassays (e.g., ELISAs or radioimmunoassays) and mass spectrometry (e.g., LC-MS/MS) can be used to determine the level of LPA or specific LPA species (e.g., 18:0 LPA) in a plasma or whole blood sample. In some cases, radioimmunoassays can be used to determine the blood or plasma level of LPA.

Once identified as having a cardiovascular condition such as calcific aortic valve stenosis or aortic sclerosis with the potential to progress into calcific aortic valve stenosis and identified as being a male mammal, the male mammal can be administered or instructed to self-administer one or more sGC agonists or a combination of one or more sGC agonists and one or more PDE5A inhibitors.

Examples of sGC agonists include, without limitation, ataciguat (5-chloro-2-[[(5-chloro-2-thienyl)sulfonyl]amino]-N-[4-(4-morpholinylsulfonyl)phenyl]-benzamide; HMR1766), YC-I (5-[1-(phenylmethyl)-1H-indazol-3-yl]-2-furanmethanol), BAY 58-2667 (4-[((4-carboxybutyl)(2-[(4-phenethylbenzyl)oxy]phenethyl)amino)methyl[benzoic] acid hydrochloride; cinaciguat), BAY 41-2272 (3-(4-amino-5-cyclopropylpyrimidin-2-yl)-1-(2-fluorobenzyl)-1H-pyrazolo[3,4-b]pyridine), BAY-41-8543 (2-[1-[(2-fluorophenyl)methyl]-1H-pyrazolo[3,4-b]pyridin-3-yl]-5-(4-morpholinyl)-4,6-pyrimidinediamine), BAY 63-2521 (methyl (4,6-diamino-2-(1-(2-fluorobenzyl)-1H-pyrazolo[3,4-b]pyridin-3-yl)pyrimidin-5-yl)(methyl)carbamate; riociguat), CFM-1571 (3-[3-(dimethylamino)propoxy]-N-(4-methoxyphenyl)-1-(phenylmethyl)-1H-pyrazole-5- carboxamide hydrochloride), A-350619 (3-[2-(4-chlorophenylthio)phenyl]-N-(4-dimethylaminobutyl) acrylamide), vericiguat (BAY 1021189, also referred to as MK-1242; methyl (4,6-diamino-2-(5-fluoro-1-(2-fluorobenzyl)-1H-pyrazolo[3,4-b]pyridin-3-yl)pyrimidin-5-yl)carbamate), praliciguat (IW-1973, IWP-121; 1,1,1,3,3,3-hexafluoro-2-[({5-fluoro-2-[1-(2-fluorobenzyl)-5-(1,2-oxazol-3-yl)-1H-pyrazol-3-yl]pyrimidin-4-yl}amino)methyl]propan-2-ol), olinciguat (IW-1701; (2R)-3,3,3-trifluoro-2-{[(5-fluoro-2-{1-[(2-fluorophenyl)methyl]-5-(1, 2-oxazol-3-yl)-1H-pyrazol-3-yl}pyrimidin-4-yl)amino]methyl}-2-hydroxypropanamide), bis-heteroaryl pyrazole IWP-051 (5-fluoro-2-(1-(2-fluorobenzyl)-5-(isoxazol-3-yl)-1H-pyrazol-3-yl)pyrimidin-4(3H)-one), IW-6463, GSK2181236A (1-(6-{2-[({3-methyl-4'-[(trifluoromethyl)oxy]-4-biphenylyl}methyl)oxy]phenyl}-2-pyridinyl)-5-(trifluoromethyl)-1H-pyrazole-4-carboxylic acid), IWP-550, IWP-854 (4-(5-fluoro-2-(1-(2-fluorobenzyl)-5-(isoxazol-3-yl)-1H-pyrazol-3-yl)pyrimidin-4-yl)-1-(3-methyl-3H-diazirin-3-yl)-N-(37-oxo-41-((3aS,4S,6aR)-2-oxohexahydro-1H-thieno[3,4-d]imidazol-4-yl)-3,6,9,12,15,18,21,24,27,30, 33-undecaoxa-36-azahentetracontyl)-7,10,13,16-tetraoxa-4-azanonadecan-19-amide), IWP-953, nelociguat (methyl (4,6-diamino-2-(1-(2-fluorobenzyl)-1H-pyrazolo[3,4-b]pyridin-3-yl)pyrimidin-5-yl)carbamate; BAY 60-4552), MGV354 ((S)-1-(6-(3-((4-(1-(cyclopropanecarbonyl)piperidin-4-yl)-2-methylphenyl)amino)-2,3-dihydro-1H-inden-4-yl)pyridin-2-yl)-5-methyl-1H-pyrazole-4-carboxylic acid), BI 703704 ((1R,5S,8s)-3-(4-(5-methyl-2-((2-methyl-4-(piperidine-1-carbonyl)benzyl)oxy)phenyl)thiazol-2-yl)-3-azabicyclo[3.2.1]octane-8-carboxylic acid), S3448 (2-[[(4-chlorophenyl)sulfonyl]amino]-4,5-dimethoxy-N-[4-(4-thiomorpholinylsulfonyl)phenyl]benzamide), and BAY 60-2770 (4-[[(4-carboxybutyl)[2-[5-fluoro-2-[[4'-(trifluoromethyl)[1,1'-biphenyl]-4-yl]methoxy]phenyl]ethyl]amino]methyl]benzoic acid). See, Buys et al., *Nitric Oxide* 78:72-78, 2018; Sandner et al., "Soluble Guanylate Cyclase Stimulators and Activators," In: *Handbook of Experimental Pharmacology*, Springer, Berlin, Heidelberg, pp. 1-40, 2018; and Friebe et al., *Naunyn-Schmiedeberg's Arch Pharmacol* 390, 1177-1188, 2017).

A sGC agonist can be a sGC "stimulator" or a sGC "activator." sGC stimulators bind to sGC and potentiate nitric oxide- (NO-) mediated cGMP signaling. sGC stimulators can increase sGC activity in the absence of NO, but in the presence of NO, sGC stimulators can act synergistically with the NO to amplify NO signaling (Buys et al., supra). In contrast, sGC activators bind to the heme pocket of the sGC enzyme, and therefore can only activate heme-free sGC, independent of NO (Buys et al., supra).

Thus, in some cases, a sGC agonist can be a stimulator that synergistically increases sGC enzyme activity with NO. Examples of sGC stimulators that can be used as described herein include, without limitation, riociguat (BAY 63-2521), vericiguat (BAY 1021189), praliciguat (IW-1973, IWP-121), olinciguat (IW-1701), nelociguat (BAY 60-4552), IW-6463, A-350619, BAY 41-2272, BAY 41-8543, CFM-1571, GSK2181236 A, IWP-051, IWP-550, IWP-854, IWP-953, and YC-1. In some cases, a sGC agonist can be a sGC activator. Examples of sGC activators that can be used as described herein include, without limitation, cinaciguat (BAY 58-2667), ataciguat (HMR1766), MGV354, BI 703704, S3448, BAY 60-2770.

Examples of PDE5A inhibitors include, without limitation, sildenafil, vardenafil, tadalafil, EMD 360527, DA 8159, UK-343-664 (Walker et al., *Xenobiotica*, 31:651-664 (2001)), UK-427-387, UK-357903 ([1-ethyl-4-{3-[3-ethyl-6,7-dihydro-7-oxo-2-(2-pyridylmethyl)-2H-pyrazolo[4,3-d]pyrimidin-5-yl]-2-(2-methoxyethoxy)-5-pyridylsulphonyl}piperazine]) (Gardiner et al., *J. Pharmacol. Exp. Ther.*, 312:265-271 (2005)), UK-371800 (Pfizer), UK-313794 (Pfizer), UK-343664 (Abel et al., *Xenobiotica*, 31:665-76 (2001)), TA-1790 (Tanabe Seiyaku), CP-248 (Osi Pharmaceuticals), CP-461 (Osi Pharmaceuticals), exisulind (Deguchi et al., *Molecular Cancer Therapeutics*, 803-809 (2002); (Osi Pharmaceuticals)), pyrazolinone, EMD82639 (Merck KgaA, Darmstadt, DE; (4-(4-[2-ethyl-phenylamino)-methylene]-3-methyl-5-oxo-4, 5-di-hydro-pyrazol-1-yl)-benzoic acid; Senzaki et al., *FASEB J.*, 15:1718-1726 (2001), and Scutt et al., *BMC Pharmacol.*, 4:10 (2004)), EMD360527 (Merck KgaA, Darmstadt, DE; [7-(3-Chloro-4-methoxy-benzylamino)-1-methyl-3-propyl-1H-pyrazolo[4,3-d]pyrimidin-5-yl-methoxy]-acetic acid; Scutt et al., *BMC Pharmacol.*, 4:10 (2004)), EMD221829 (Merck KgaA, Darmstadt, DE; 4-[4-(3-Chloro-4-methoxy-benzylamino)-benzo[4,5]thieno[2,3-d]-pyrimidin-2-yl]-cyclohexanecarboxylic acid, ethanolamin salt; Scutt et al., *BMC Pharmacol.*, 4:10 (2004)), EMD1 71827 (Merck KgaA, Darmstadt, DE; 5-[4-(3-Chloro-4-methoxy-benzylamino)-5,6,7,8-tetrahydro-benzo [4,5]thieno[2,3-d]pyrimidin-2-yl]-pentanoic acid; Scutt et al., *BMC Pharmacol.*, 4:10 (2004)), DA-8259 (3-(1-Methyl-7-oxo-3-propyl-6,7-dihydro-1H-pyrazolo-[4,3-d]pyrimidin-5-yl)-N-[2-(1-methylpyrrolidin-2-yl)ethyl]-4-propoxybenzenesulfonamide), E-4021 (Dukarm et al., *Am. J. Respir. Crit. Care Med.*, 160:858-865 (1999)), pentoxifylline, and FR22934 (Fujisawa). Additional examples of PDE5A inhibitors can be set forth in U.S. Pat. Nos. 6,916,927, 6,911,542, 6,903,099, 6,878,711, 6,872,721, 6,858,620, 6,825,197, 6,774,128, 6,723,719, 6,699,870, 6,670,366, 5,859,006, and 5,250,534 and International Patent Application Publication No. WO 03/063875, WO 03/1012761, WO 2004/037183, and WO 98/38168. In some cases, a sGC agonist used as described herein can be an activator of an oxidized or non-oxidized form of sGC.

In some cases, one or more sGC agonists (e.g., one, two, three, four, five, or more sGC agonists) or a combination of one or more sGC agonists (e.g., one, two, three, four, five, or more sGC agonists) and one or more PDE5A inhibitors (e.g., one, two, three, four, five, or more PDE5A inhibitors) can be administered to a male mammal to reduce calcification of heart valves and/or vessels or to slow progression of aortic sclerosis to calcific aortic valve stenosis, and/or to slow progression of established mild-to-moderate valvular stenosis to more severe stenosis. Administration of such agents at early or moderate disease stages also can be used to prevent or reduce organ dysfunction stemming from long term increases in cardiovascular/valvular stiffness (e.g., left ventricular maladaptation or renal dysfunction from aortic stiffness). The one or more sGC agonists and the one or more PDE5A inhibitors can be administered simultaneously (e.g., in separate compositions administered at substantially the same time, or in the same composition), or can be administered at separate times (e.g., 10 to 30 minutes apart, 30 to 60 minutes apart, one to two hours apart, two to four hours apart, four to six hours apart, six to 12 hours part, 12 to 24 hours apart, or more than 24 hours apart). In some cases, one or more sGC agonists or a combination of one or more sGC agonists and one or more PDE5A inhibitors can be formulated into a pharmaceutically acceptable composition. For example, a therapeutically effective amount of ataciguat can be formulated together with one or more pharmaceutically acceptable carriers (additives) and/or diluents. A pharmaceutical composition can be formulated for administration in solid or liquid form including, without limitation, sterile solutions, suspensions, sustained-release formulations, tablets, capsules, pills, powders, and granules.

After being identified as having a cardiovascular condition such as calcific aortic valve stenosis or aortic sclerosis with the potential to progress into calcific aortic valve stenosis and identified as being a female mammal, the female mammal can be administered or instructed to self-administer one or more anti-fibrotic agents. In some cases, if the female mammal develops calcification after administration of the anti-fibrotic agent(s), the female mammal can be administered or instructed to self-administer one or more sGC agonists as described above.

Examples of anti-fibrotic agents include, without limitation, TGF-beta neutralizing antibodies, angiotension II inhibitors, inhibitors of fibrogenic cytokine signaling (e.g., TNF-alpha neutralizing antibodies, and inhibitors or neutralizing antibodies against IL6 signaling), integrin inhibitors, and other small molecules or inhibitors or neutralizing antibodies that may directly target fibrogenic signaling, indirectly target fibrogenic signaling (e.g., upstream or downstream modulators), or suppress fibrogenic signaling. Specific examples of anti-fibrotic agents include, without limitation, SHP-627, hydronidone PXS-25, disitertide, fresolimumab, LY2382770, STX-100, CWHM-12, SB-431542, THR-184, PF-06473871, RXI-109, FG-3019, imatinib, BOT-191, nilotinib, dasatinib, nintedanib, sorafenib, thalidomide, pomalidomide, etanercept, belimumab, refanalin (BB-3), dectrekumab (QAX-576), tralokinumab, anakinra, rilonacept, SAR156597, carlumab, bindarit, maraviroc, RS-504393, actimmune, IFN-α, batimastat (BB-49), marimastat, macitentan, bosentan, ambrisentan, sparsentan (RE-021), atrasentan, losartan, BMS-986020, SAR-100842, PARI antagonists, curcumin, silymarin, β-caryophyllene, beraprost, iloprost, treprostinil, aviptadil, sivelestat, UK-396082, serelaxin, PRM-151, dioscin, NTU281, rapamycin, palomid-529 (RES-529), ruxolitinib, baricitinib, omipalisib (GSK2126458), PF-562271, tanzisertib (CC-930), MMI-0100, IMD-1041, bardoxolone methyl (CDDO-Me), antisense NF-κB, baicalein, sulfasalazine, Y-27632, bortezomib, emricasan, VX-166, Z-VAD-fmk, CTP-499, VBY-376, CA-074Me, paquinimod, HOE-077, rosiglitazone, elafibranor (GFT-505), saroglitazar, pioglitazone, docosahexaenoic acid, INT-767, PX-102, obeticholic acid, turofexorate isopropyl (WAY-362450), GW4064, triamcinolone, genistein, pirfenidone, pentoxifylline, SIS-3, glycyrrhizin, anti-miR-21, ademetionine (SAM), β-aminopropionitrile (BAPN), simtuzumab (GS-6624), GM-CT-01, GR-MD-02, GCS-100, GKT137831, N-acetylcysteine, mitoquinone, salvianolic acid B, resveratrol, pyridoxamine, α-tocopherol, and IW001.

Pharmaceutically acceptable carriers, adjuvants and vehicles that may be used in the pharmaceutical compositions described herein include, without limitation, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat. If required, the solubility and bioavailability of a sGC agonist and/or a PDE5A inhibitor in a pharmaceutical composition can be enhanced using lipid excipients and/or block copolymers of ethylene oxide and propylene oxide. See, e.g., U.S. Pat. No. 7,014,866 and U.S. Patent Publication Nos. 20060094744 and 20060079502.

A pharmaceutical composition described herein can be designed for oral or parenteral (including subcutaneous, intramuscular, intravenous, and intradermal) administration. Compositions suitable for parenteral administration include aqueous and non-aqueous sterile injection solutions that can contain anti-oxidants, buffers, bacteriostats, and solutes which render the formulation isotonic with the blood of the intended recipient; and aqueous and non-aqueous sterile suspensions which may include suspending agents and thickening agents. The formulations can be presented in unit-dose or multi-dose containers, for example, sealed ampules and vials, and may be stored in a freeze dried (lyophilized) condition requiring only the addition of the sterile liquid carrier, for example water for injections, immediately prior to use. Extemporaneous injection solutions and suspensions may be prepared from sterile powders, granules, and tablets.

Such injection solutions can be in the form, for example, of a sterile injectable aqueous or oleaginous suspension. This suspension may be formulated according to techniques known in the art using suitable dispersing or wetting agents (such as, for example, Tween 80) and suspending agents. The sterile injectable preparation can be a sterile injectable solution or suspension in a non-toxic parenterally-acceptable diluent or solvent, for example, as a solution in 1,3-butanediol. Among the acceptable vehicles and solvents that can be used are mannitol, water, Ringer's solution, and isotonic sodium chloride solution. In addition, sterile, fixed oils are conventionally employed as a solvent or suspending medium. For this purpose, any bland fixed oil can be used including synthetic mono- or di-glycerides. Fatty acids, such as oleic acid and its glyceride derivatives can be used in the preparation of injectables, as can natural pharmaceutically-acceptable oils, such as olive oil or castor oil, including those in their polyoxyethylated versions. These oil solutions or suspensions can contain a long-chain alcohol diluent or dispersant.

In some cases, a pharmaceutically acceptable composition including one or more sGC agonists and/or one or more PDE5A inhibitors can be administered locally or systemically. For example, a composition containing a sGC agonist can be administered systemically by injection to a mammal (e.g., a human). When two or more sGC agonists are to be administered, each sGC agonist can be administered by the same or different routes. For example, ataciguat can be administered orally, and YC-1 can be administered by injection. In some cases, one or more sGC agonists can be administered via one route, and one or more PDE5A inhibitors can be administered via the same or a different route.

Compositions containing one or more sGC agonists or a combination of one or more sGC agonists and one or more PDE5A inhibitors can be administered to a male mammal in any amount, at any frequency, and for any duration effective to achieve a desired outcome (e.g., to reduce calcification of heart valves and/or vessels or to slow progression of aortic sclerosis to calcific aortic valve stenosis). Compositions containing one or more anti-fibrotic agents can be administered to a female mammal in any amount, at any frequency, and for any duration effective to achieve a desired outcome (e.g., to reduce calcification of heart valves and/or vessels or to slow progression of aortic sclerosis to calcific aortic valve stenosis).

Effective doses can vary, as recognized by those skilled in the art, depending on the severity of the condition (e.g., calcific aortic valve stenosis), the route of administration, age and general health condition of the subject, excipient usage, the possibility of co-usage with other therapeutic treatments such as use of other agents and the judgment of the treating physician.

An effective amount of a composition containing one or more sGC agonists or a combination of one or more sGC agonists and one or more PDE5A inhibitors can be any amount that reduces the severity of a symptom of a condition being treated (e.g., calcific aortic valve stenosis) without producing significant toxicity to the male mammal. For example, an effective amount of a sGC agonist (e.g., YC-I) can be from about 0.5 mg/kg to about 80 mg/kg (e.g., from about 0.5 mg/kg to about 70 mg/kg, from about 0.5 mg/kg to about 60 mg/kg, from about 0.5 mg/kg to about 50 mg/kg, from about 0.5 mg/kg to about 40 mg/kg, from about 0.5 mg/kg to about 30 mg/kg, from about 0.5 mg/kg to about 20 mg/kg, from about 0.5 mg/kg to about 10 mg/kg, from about 0.5 mg/kg to about 5 mg/kg, from about 0.5 mg/kg to about 1 mg/kg, from about 0.75 mg/kg to about 10 mg/kg, from about 1 mg/kg to about 10 mg/kg, or from about 2 mg/kg to about 10 mg/kg). In some cases, between about 0.1 mg and about 500 mg (e.g., between about 0.1 mg and about 0.5 mg, between about 0.5 mg and about 1 mg, between about 1 mg and about 5 mg, between about 5 mg and about 10 mg, between about 10 mg and about 25 mg, between about 25 mg and about 50 mg, between about 50 mg and 200 mg, between about 50 mg and 180 mg, between about 50 mg and 150 mg, between about 50 mg and 125 mg, between about 60 mg and 200 mg, between about 75 mg and 200 mg, between about 100 mg and 200 mg, between about 75 mg and 150 mg, between about 100 mg and 150 mg, between about 100 mg and about 200 mg, between about 200 mg and about 300 mg, between about 300 mg and about 400 mg, or between about 400 mg and about 500 mg) of a sGC agonist such as ataciguat can be administered to a mammal (e.g., a male human) per day for a suitable length of time. If a particular mammal fails to respond to a particular amount, then the amount of sGC agonist or PDE5A inhibitor can be increased by, for example, two fold. After receiving this higher amount, the mammal can be monitored for both responsiveness to the treatment and toxicity symptoms, and adjustments made accordingly.

An effective amount of a composition containing one or more anti-fibrotic agents can be any amount that reduces the severity of a symptom of a condition being treated (e.g., calcific aortic valve stenosis) without producing significant toxicity to the female mammal. For example, an effective amount of an anti-fibrotic agent can be from about 0.01 mg/kg to about 80 mg/kg (e.g., from about 0.01 mg/kg to about 0.1 mg/kg, from about 0.1 mg/kg to about 0.5 mg/kg, from about 0.5 mg/kg to about 70 mg/kg, from about 0.5 mg/kg to about 60 mg/kg, from about 0.5 mg/kg to about 50 mg/kg, from about 0.5 mg/kg to about 40 mg/kg, from about 0.5 mg/kg to about 30 mg/kg, from about 0.5 mg/kg to about 20 mg/kg, from about 0.5 mg/kg to about 10 mg/kg, from about 0.5 mg/kg to about 5 mg/kg, from about 0.5 mg/kg to about 1 mg/kg, from about 0.75 mg/kg to about 10 mg/kg, from about 1 mg/kg to about 10 mg/kg, or from about 2 mg/kg to about 10 mg/kg). In some cases, between about 0.1 mg and about 500 mg (e.g., between about 0.1 mg and about 0.5 mg, between about 0.5 mg and about 1 mg, between about 1 mg and about 5 mg, between about 5 mg and about 10 mg, between about 10 mg and about 25 mg, between about 25 mg and about 50 mg, between about 50 mg and 200 mg, between about 50 mg and 180 mg, between about 50 mg and 150 mg, between about 50 mg and 125 mg, between about 60 mg and 200 mg, between about 75 mg and 200 mg, between about 100 mg and 200 mg, between about 75 mg and 150 mg, between about 100 mg and 150 mg, between about 100 mg and about 200 mg, between about 200 mg and about 300 mg, between about 300 mg and about 400 mg, or between about 400 mg and about 500 mg) of an anti-fibrotic agent can be administered to a mammal (e.g., a female human) per day for a suitable length of time. If a particular mammal fails to respond to a particular amount, then the amount of anti-fibrotic agent can be increased by, for example, two fold. After receiving this higher amount, the mammal can be monitored for both responsiveness to the treatment and toxicity symptoms, and adjustments made accordingly.

The effective amount can remain constant or can be adjusted as a sliding scale or variable dose depending on the mammal's response to treatment. Various factors can influence the actual effective amount used for a particular application. For example, the frequency of administration, duration of treatment, use of multiple treatment agents, route of administration, and severity of the condition (e.g., calcific aortic valve stenosis) may require an increase or decrease in the actual effective amount administered.

The frequency of administration can be any frequency that reduces the severity of a symptom of a condition to be treated (e.g., calcific aortic valve stenosis) without producing significant toxicity to the male mammal. For example, the frequency of administration can be from about once a week to about three times a day, or from about twice a month to about six times a day, or from about twice a week to about once a day. The frequency of administration can remain constant or can be variable during the duration of treatment. In some cases, a course of treatment of a male mammal with a composition containing one or more sGC agonists or a combination of one or more sGC agonists and one or more PDE5A inhibitors, or a course of treatment of a female mammal with a composition containing one or more anti-fibrotic agents, can include rest periods. For example, a composition containing one or more sGC agonists or a combination of one or more sGC agonists and one or more PDE5A inhibitors can be administered daily over a two week period followed by a two week rest period, and such a regimen can be repeated multiple times. As with the effective amount, various factors can influence the actual frequency of administration used for a particular application. For example, the effective amount, duration of treatment, use of multiple treatment agents, route of administration, and severity of the condition (e.g., calcific aortic valve stenosis) may require an increase or decrease in administration frequency. An effective duration for administering a composition containing one or more sGC agonists or a combination of one or more sGC agonists and one or more PDE5A inhibitors can be any duration that reduces the severity of a symptom of the condition to be treated (e.g., calcific aortic valve stenosis) without producing significant toxicity to the male mammal. Thus, the effective duration can vary from several days to several weeks, months, or years. In general, the effective duration for the treatment of calcific aortic valve stenosis can range in duration from several months to several years. In some cases, an effective duration can be for as long as an individual mammal is alive. Multiple factors can influence the actual effective duration used for a particular treatment. For example, an effective duration can vary with the frequency of administration, effective amount, use of multiple treatment agents, route of administration, and severity of the condition being treated.

In certain instances, a course of treatment and the severity of one or more symptoms related to the condition being treated can be monitored. Any appropriate method can be used to determine whether or not the severity of a symptom is reduced. For example, the severity of a symptom of calcific aortic valve stenosis can be assessed using imaging techniques at different time points.

This document also provides methods and materials to assist medical or research professionals in determining whether or not a mammal identified as having, or as being likely to have, a cardiovascular condition (e.g., heart valve calcification, vessel calcification, aortic sclerosis, arterial stiffness, or left ventricular systolic or diastolic dysfunction) is likely to benefit from treatment with a sGC agonist or a sGC agonist and a PDE5A inhibitor. Medical professionals can be, for example, doctors, nurses, medical laboratory technologists, and pharmacists. Research professionals can be, for example, principal investigators, research technicians, postdoctoral trainees, and graduate students. A professional can be assisted in determining whether or not a mammal has, or is likely to have, a cardiovascular condition, and/or whether a mammal having a cardiovascular condition is likely to respond to a sGC agonist (e.g., ataciguat) by (1) determining a blood LPA level, and (2) communicating information about that level to that professional.

Any method can be used to communicate information to another person (e.g., a professional). For example, information can be given directly or indirectly to a professional. In addition, any type of communication can be used to communicate the information. For example, mail, e-mail, telephone, and face-to-face interactions can be used. The information also can be communicated to a professional by making that information electronically available to the professional. For example, the information can be communicated to a professional by placing the information on a computer database such that the professional can access the information. In addition, the information can be communicated to a hospital, clinic, or research facility serving as an agent for the professional.

The invention will be further described in the following examples, which do not limit the scope of the invention described in the claims.

EXAMPLES

Example 1—Materials and Methods

Pre-clinical animal studies: ldlr$^{-/-}$/apoB$^{100/100}$ mice are low density lipoprotein receptor-deficient, apolipoprotein B100-only mice that consistently develop severe, hemodynamically significant calcific aortic valve stenosis. Thus, these mice develop stenosis in a manner suitable for studying the effects of pharmacological interventions on initiation and progression of calcific aortic valve stenosis.

Two groups of ldlr$^{-/-}$/apoB$^{100/100}$ mice were placed on Western Diet (WD) for six months, a time point that allowed the mice to develop mild-to-moderate valvular stenosis. At the six-month time point, mice were randomized into two groups:
(1) continued western diet (WD)/continued disease progression group, or
(2) continued western diet+ataciguat in food (WD+ATA)/ treatment group.

At the nine-month time point, mice underwent echocardiography (high resolution ultrasound) and blood pressure (tail cuff) measurement, and were sacrificed for tissue and molecular analyses of valvular tissue (histology, immunohistochemistry, quantitative real-time RT-PCR).

Phase I clinical trial design: Patients with mild-to-moderate calcific aortic valve stenosis (valve area between 1.0 cm$^2$ and 2.0 cm$^2$) with well-preserved left ventricular function (ejection fraction>50%) were recruited for participation in a randomized, double-blind, placebo-controlled trial. After screening, patients were randomized into two groups:
(1) placebo treatment for 14 days, or
(2) ataciguat treatment for 14 days.
Patients underwent a series of tests to assess baseline blood pressure (seated and supine body positions), orthostatic tolerance (transition to standing, tilt table testing), and blood tests to assess liver enzyme function.

Phase II clinical trial design: Patients with mild-to-moderate calcific aortic valve stenosis (valve area between 1.0 cm$^2$ and 2.0 cm$^2$) with well-preserved left ventricular function (ejection fraction>50%) and significant valve calcification (calcium levels>300 units by computed tomography scanning) were recruited for participation in a randomized, double-blind, placebo-controlled trial. After screening, patients were randomized into two groups:
(1) placebo treatment for a minimum of 6 months, or
(2) ataciguat treatment for a minimum of 6 months
Patients underwent computed tomography measurements of aortic valve calcification, echocardiographic assessments of ventricular and aortic valve function, and DEXA scanning for assessment of systemic bone mineral density at baseline and at six month intervals after initiation of treatment.

In vitro cell culture studies: Aortic valve interstitial cells were isolated using an outgrowth method, and were expanded in DMEM/F-10 medium with 10% FBS and studied in passages 2-10. Cells were treated for 24 hours under each experimental condition, at which point mRNA was harvested using lysis buffer. After mRNA isolation and reverse transcription, gene expression was measured using quantitative real-time RT-PCR and Taqman primers. Changes in gene expression were assessed by the ddCt method and expressed as fold-change normalized to control conditions.

LPA studies in humans with aortic valve calcification: Human plasma LPA levels were measured using a colorimetric, sandwich/quantitative ELISA assay (AB212165) after samples were diluted in diluent buffer. Computed tomography scanning was performed using clinical grade, high-resolution scanning methods that are well-established for assessment of aortic valve calcification. The calcium burden was measured from 3-dimensional, multi-slice images and expressed as arbitrary units (AU).

Example 2—Ataciguat Increases sGC Signaling and Attenuates BMP Signaling In Vitro To confirm that ataciguat effectively activated sGC in cells, mouse aortic valve interstitial cells (mVICs) were isolated from C57BL6/J mice treated with ataciguat or other sGC agonists as internal controls. In otherwise naïve cells, treatment with ataciguat significantly increased sGC-dependent signaling (indicated by phospho-VASP$^{239}$ levels) over vehicle-treated cells. Importantly, both sodium nitroprusside and DEA-NONOATE increased phospho-VASP$^{239}$ levels to a similar extent, suggesting that sGC resides in both reduced and heme-free states in mVICs. To determine whether ataciguat could attenuate signaling cascades central to the initiation and progression of valve calcification in vitro, cells were treated with BMP2 with or without ataciguat. In these studies, ataciguat reduced phospho-SMAD1/5/8 signaling (e.g., canonical BMP signaling) as well as expression of osteogenic genes induced by BMP2 (e.g., osterix).

Example 3—Ataciguat Slows Progression of Established FCAVS In Vivo

Figure 1B:
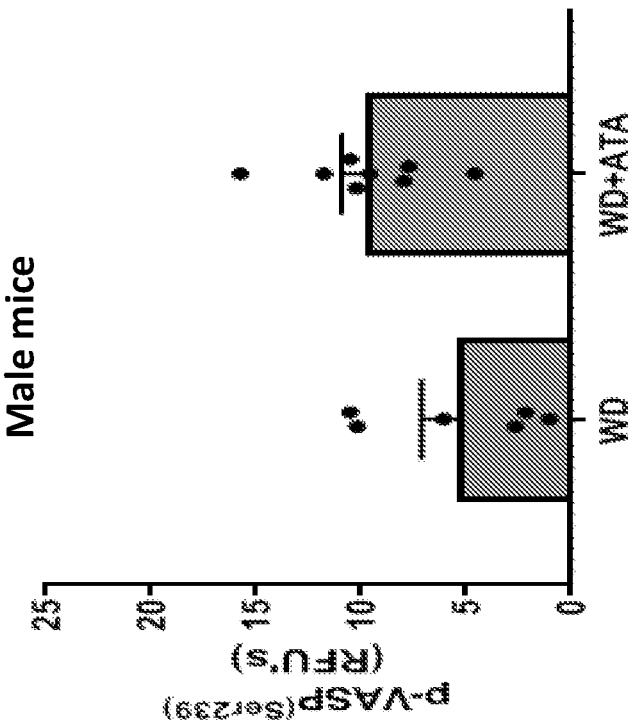

A therapeutically-relevant treatment strategy in which ldlr-deficient, apoB100-only mice were fed a western diet for six months (to develop mild/moderate FCAVS) followed by western diet plus ataciguat (150 ppm mixed in food). To confirm that ataciguat effectively binds oxidized sGC in aortic valve tissue in vivo, immunohistochemistry was used to demonstrate that pVASP$^{239}$ was significantly increased in mice of both genders (FIGS. 1A and 1B). Consistent with other reports in mouse models of hyperlipidemia, treatment with ataciguat did not alter blood pressure in mice of either gender.

Figure 4B:
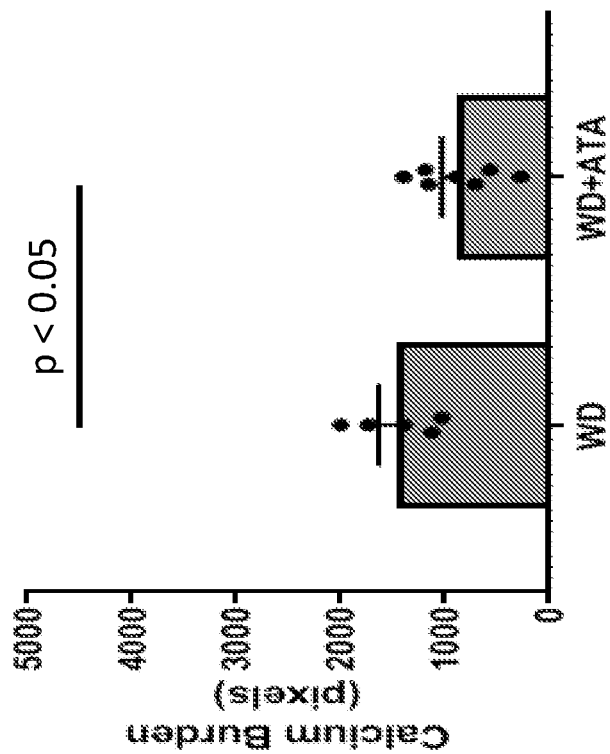
FIGS. 4A and 4B are graphs plotting levels of calcification of aortic valve tissue in male (FIG. 4A) and female (FIG. 4B) mice with established aortic valve disease after treatment with ataciguat/HMR1766 (WD+ATA) or control (WD). Calcification was assessed histologically using Alizarin red staining followed by brightfield microscopic imaging.
Figure 4A:
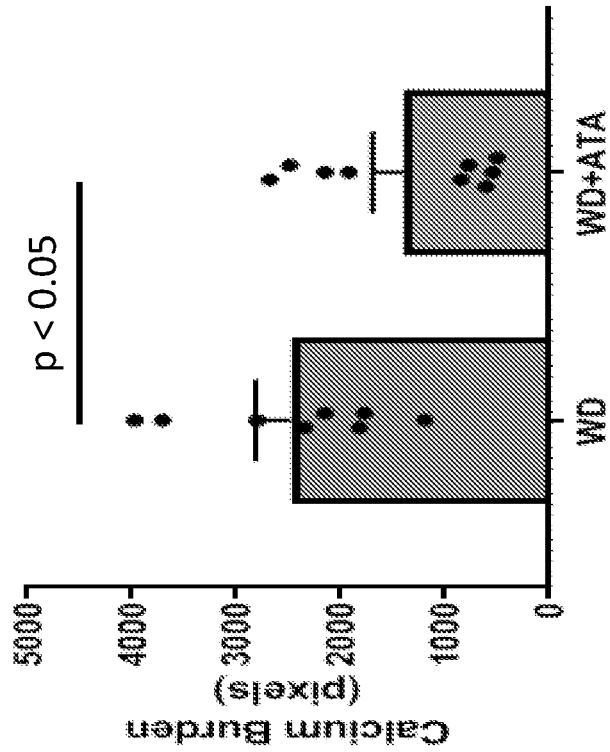
Figure 5B:
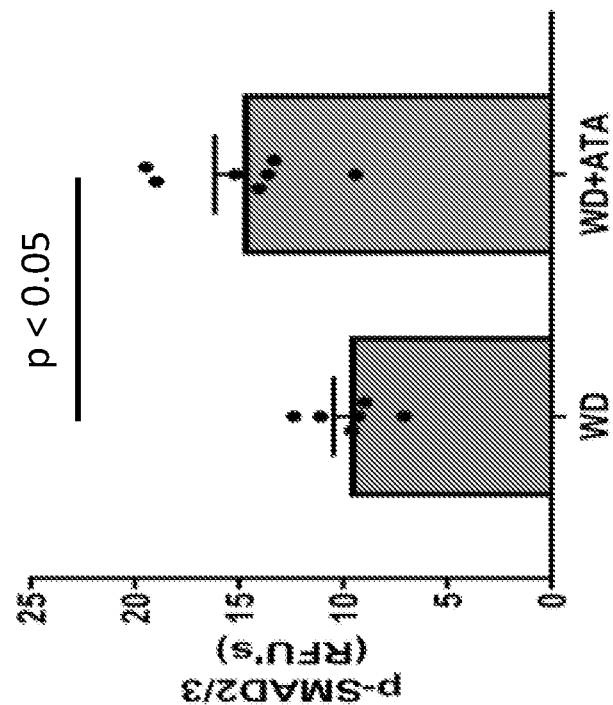
FIGS. 5A and 5B are graphs plotting levels of canonical transforming factor beta (TGFβ) signaling in aortic valve tissue of male (FIG. 5A) and female (FIG. 5B) mice with established aortic valve disease, after treatment with ataciguat/HMR1766 (WD+ATA) or control (WD). TGFβ signaling was assessed based on levels of SMAD2/3 phosphorylation, which was measured using immunohistochemical techniques and confocal microscopy.
Figure 5A:
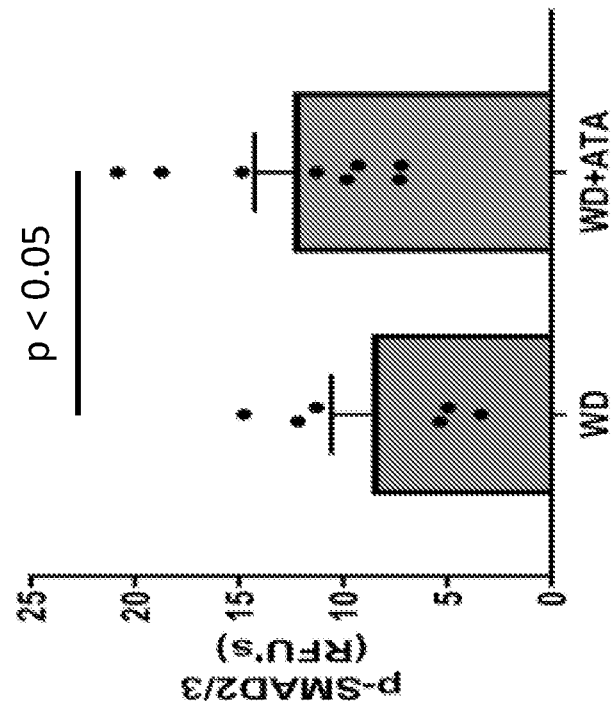
Figure 6B:
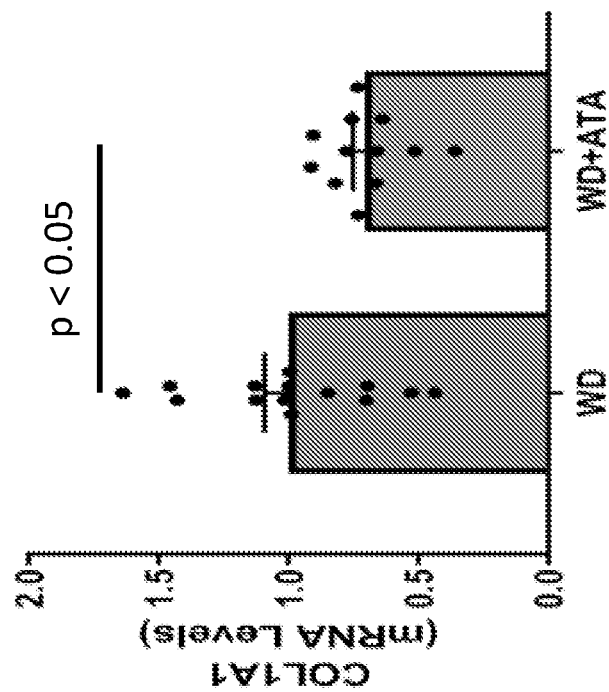
Figure 6A:
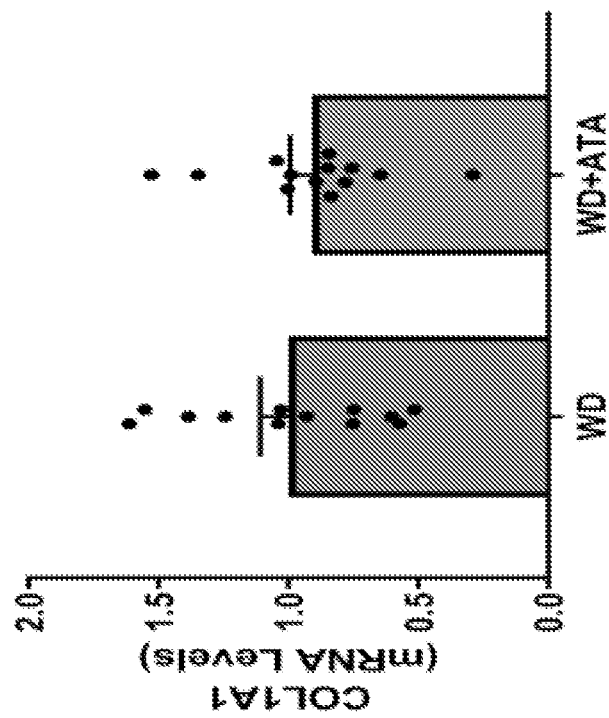
Figure 10A:
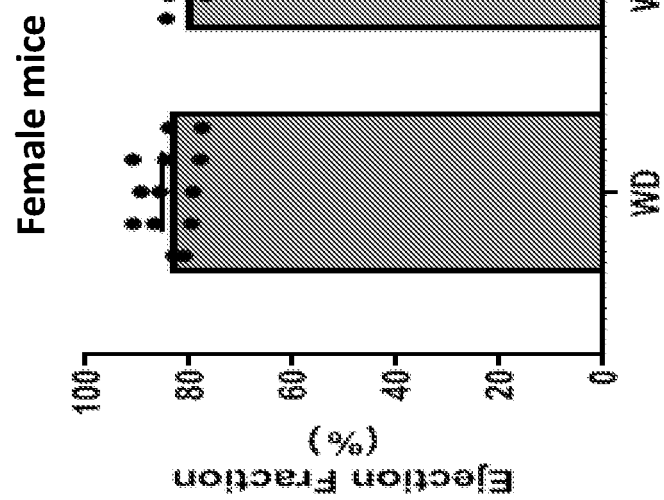
Figure 10B:
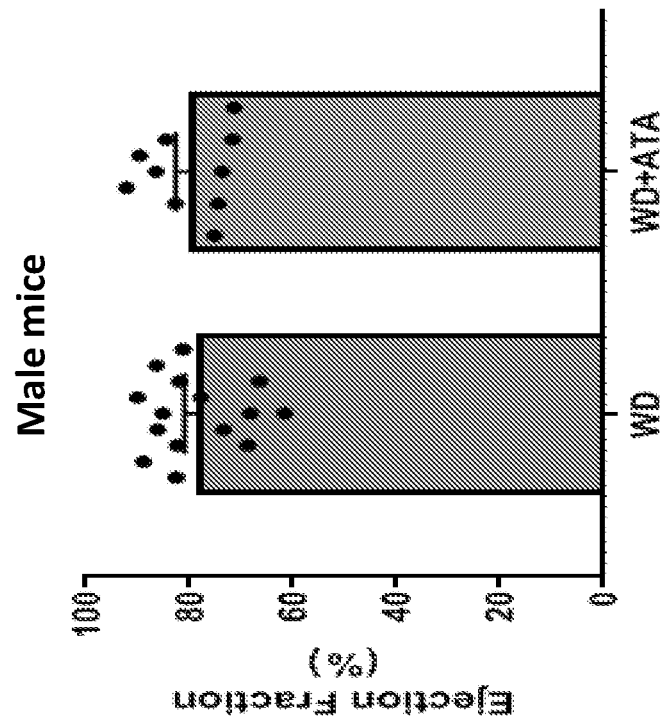
Figure 11A:
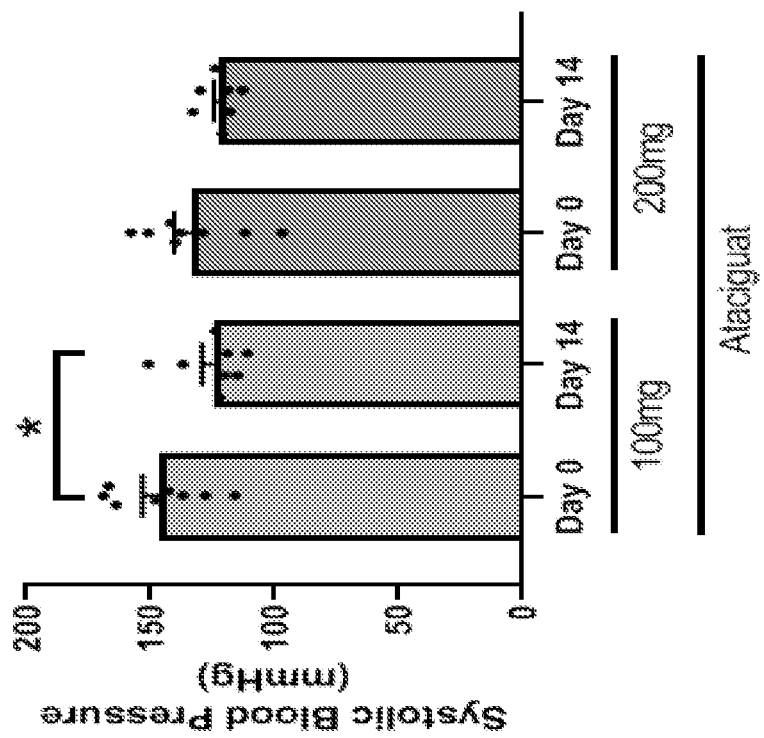
FIGS. 11A-11D are graphs plotting seated systolic (FIGS. 11A and 11B) and diastolic (FIGS. 11C and 11D) blood pressure in humans with mild-to-moderate aortic valve stenosis before and after treatment with placebo (FIGS. 11A and 11C) or ataciguat/HMR1766 (FIGS. 11B and 11D) for 14 days (randomized, double-blind study design, doses as indicated). As indicated in FIGS. 11B and 11D, 100 mg/day of ataciguat significantly reduced blood pressure while in a seated position, but 200 mg/day did not have a significant effect on blood pressure. This suggested that the higher dose of ataciguat would not put patients at risk for side effects of hypotension (light headedness, etc.).
Figure 11B:
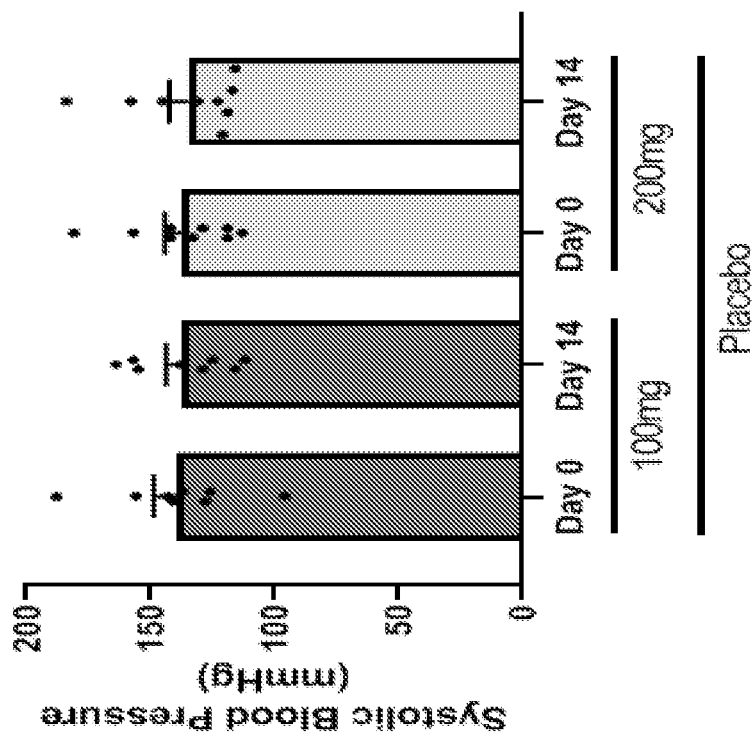
Figure 11D:
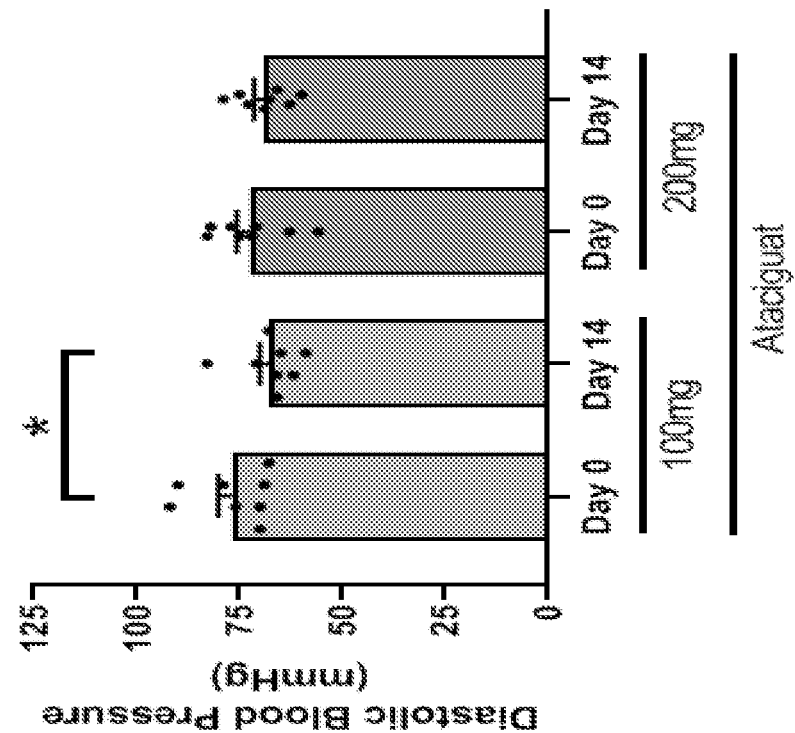
Figure 11C:
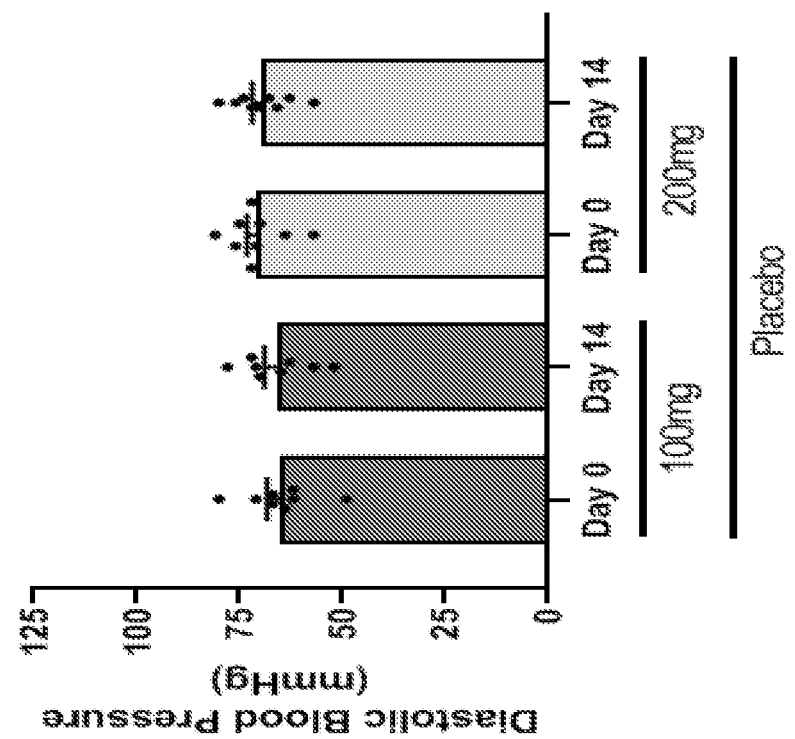
Figure 12B:
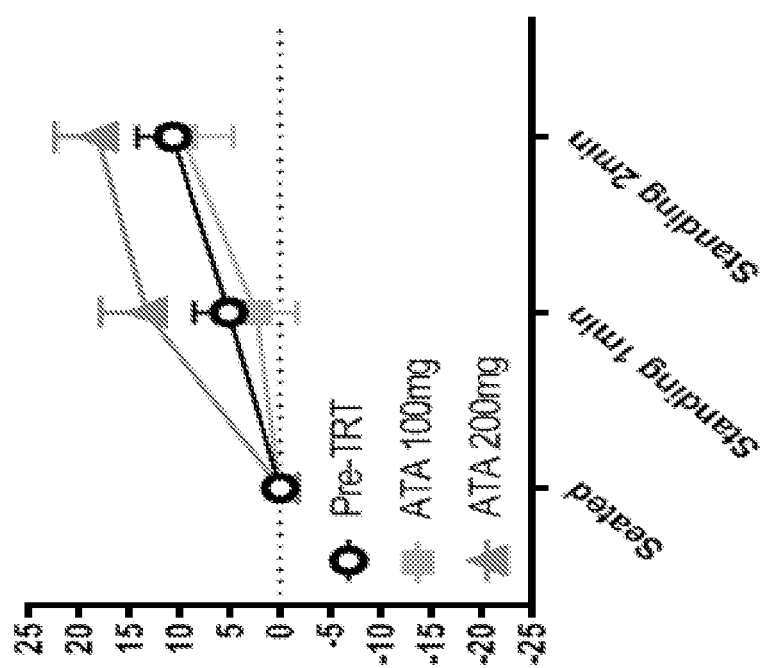
FIGS. 12A-12D are graphs plotting changes in systolic (FIGS. 12A and 12B) and diastolic (FIGS. 12C and 12D) blood pressure upon standing in humans with mild-to-moderate aortic valve stenosis, before and after treatment with placebo (FIGS. 12A and 12C) or ataciguat (FIGS. 12B and 12D) for 14 days (randomized, double-blind study design, doses as indicated). Treatment with ataciguat did not significantly or consistently alter blood pressure responses to the orthostatic stress of transitioning from a seated to a standing position. This again suggested that ataciguat would not put patients at risk for side effects of hypotension.
Figure 12A:
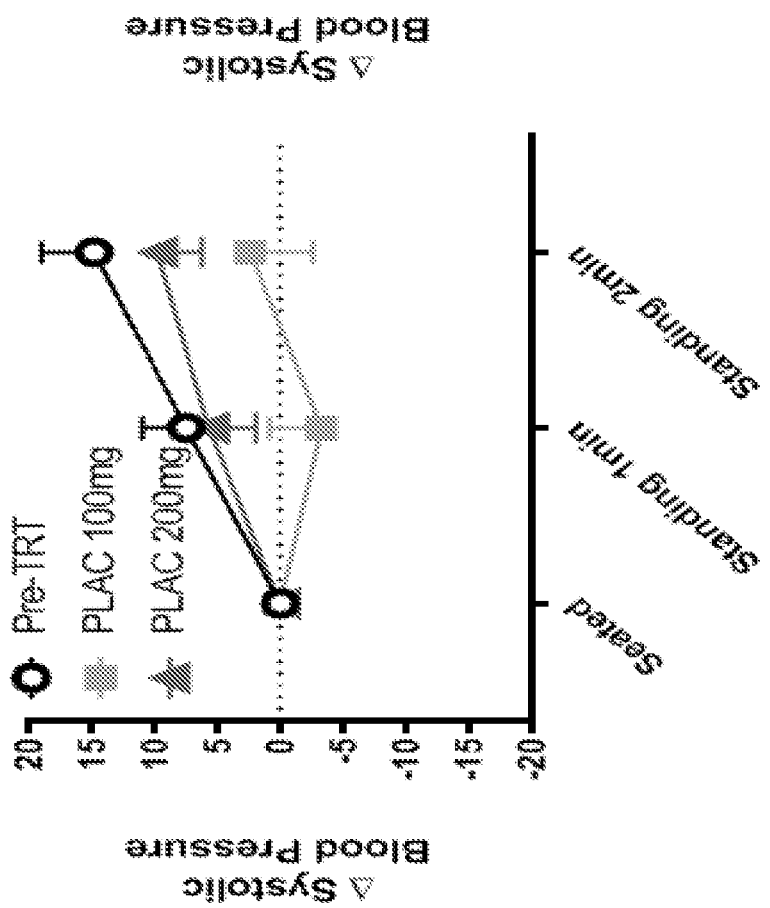
Figure 12D:
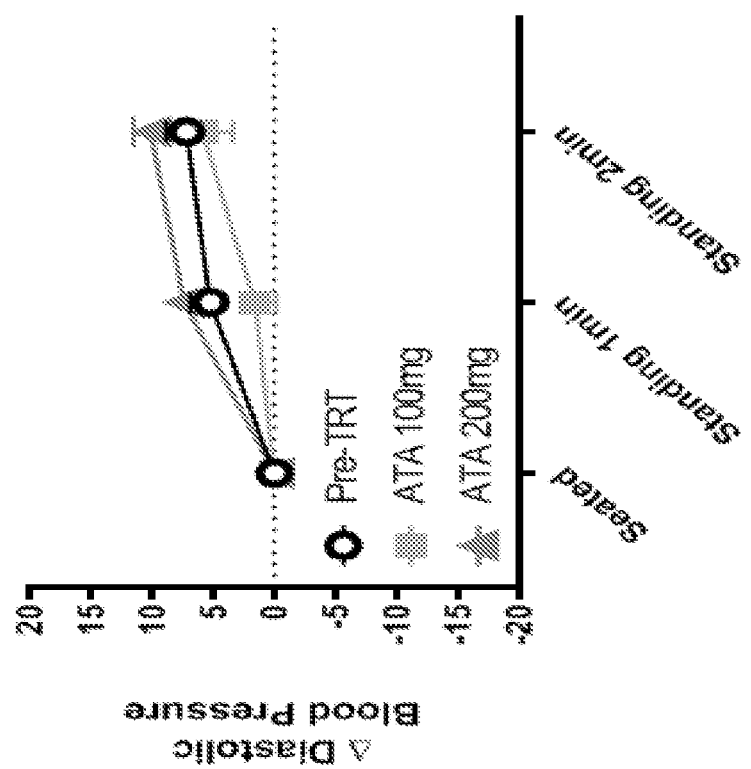
Figure 12C:
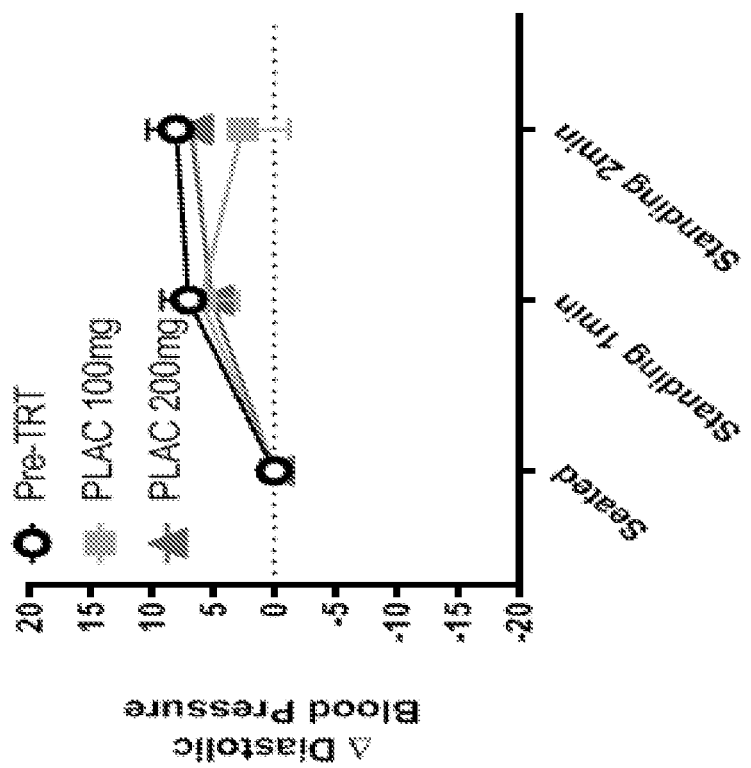
Figure 13B:
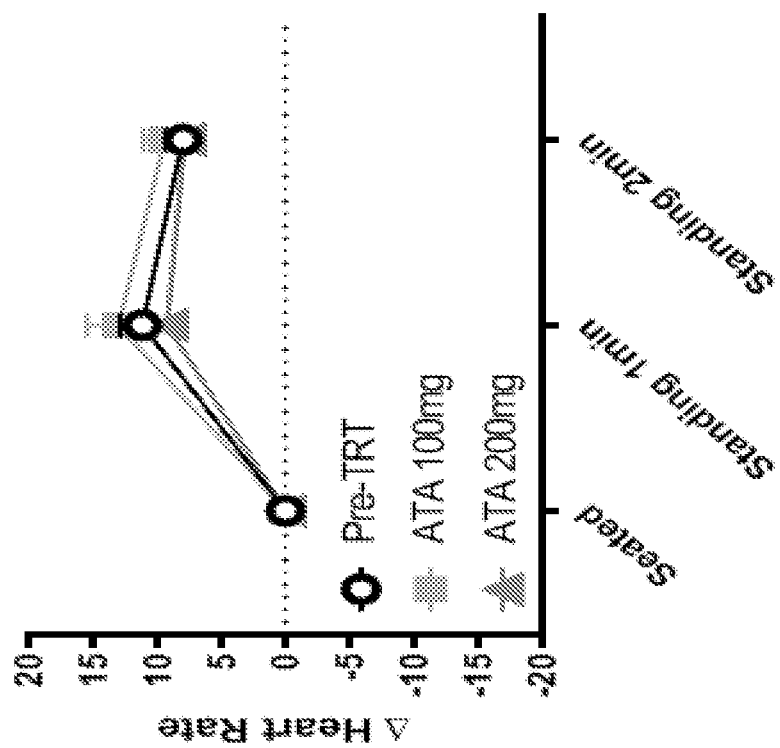
FIGS. 13A and 13B are graphs plotting changes in heart rate upon standing in humans with mild-to-moderate aortic valve stenosis, before and after treatment with placebo (FIG. 13A) or ataciguat/HMR1766 (FIG. 13B) for 14 days (randomized, double-blind study design, doses as indicated). Consistent with the observed changes in blood pressure, treatment with ataciguat did not significantly or consistently alter heart rate responses to the orthostatic stress of transitioning from a seated to a standing position. This again suggested that ataciguat would not put patients at risk for side effects of hypotension, and also that excessive tachycardia is not a compensatory mechanism masking unwanted effects of ataciguat on vascular tone/vasomotor regulation.
Figure 13A:
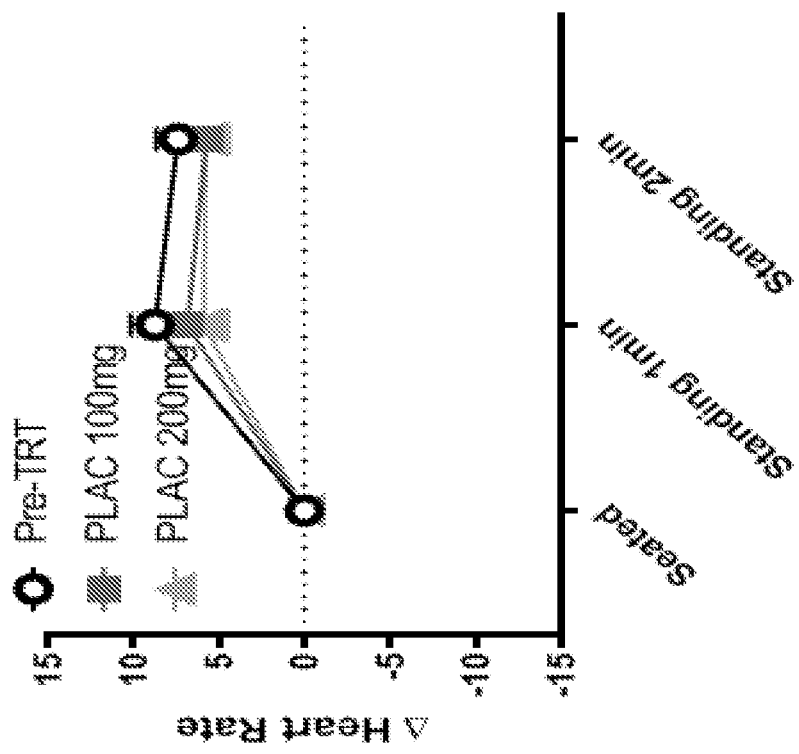
Figure 14B:
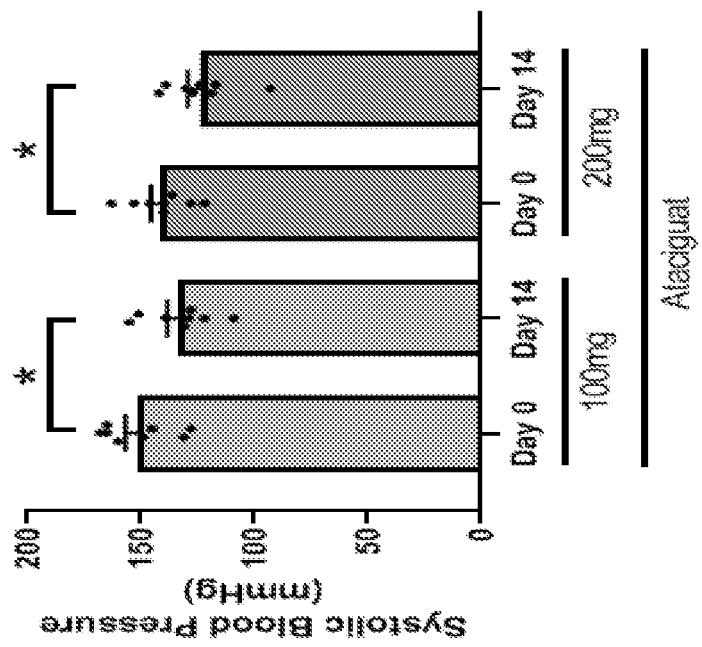
FIGS. 14A-14D are graphs plotting supine systolic (FIGS. 14A and 14B) and diastolic (FIGS. 14C and 14D) blood pressure in humans with mild-to-moderate aortic valve stenosis, before and after treatment with placebo (FIGS. 14A and 14C) or ataciguat/HMR1766 (FIGS. 14B and 14D) for 14 days (randomized, double-blind study design, doses as indicated). Treatment with ataciguat significantly reduced both systolic and diastolic blood pressure, suggesting that ataciguat is a viable strategy to mitigate vascular stiffness and reduce nocturnal hypertension without putting patients at risk for symptoms related to reduced blood pressure while upright.
Figure 14A:
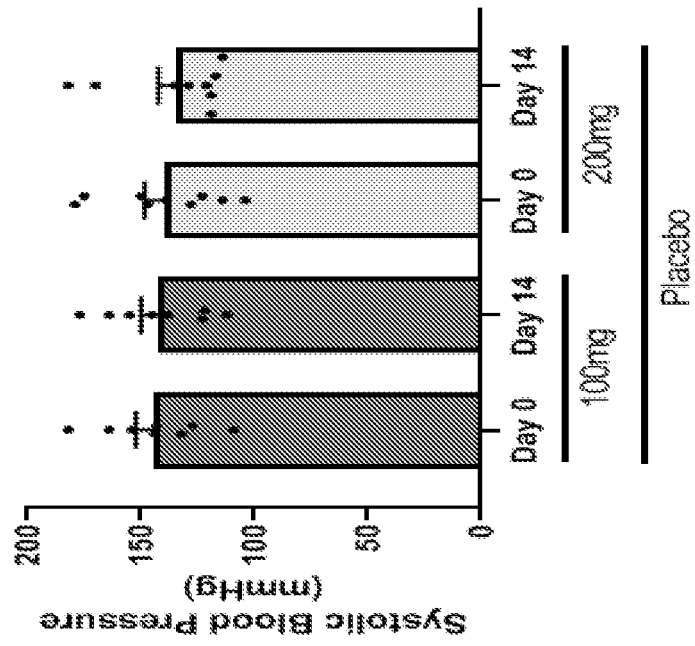
Figure 14D:
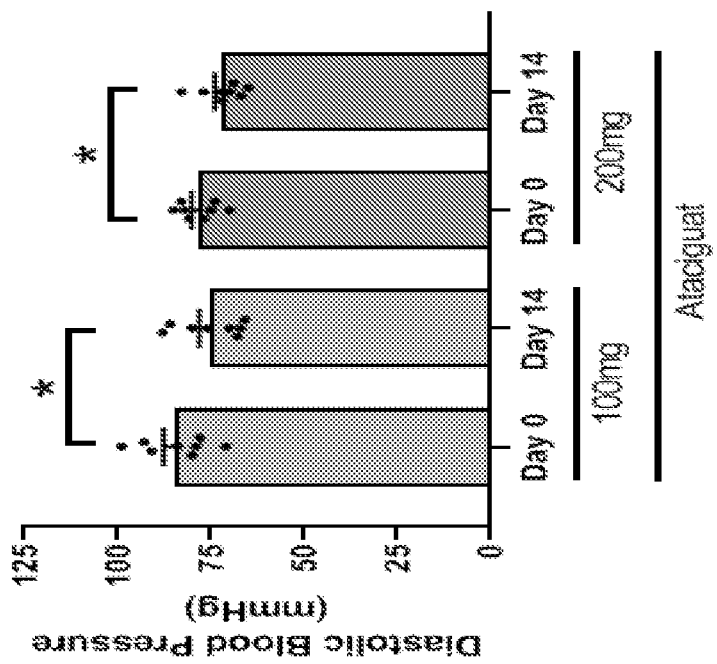
Figure 14C:
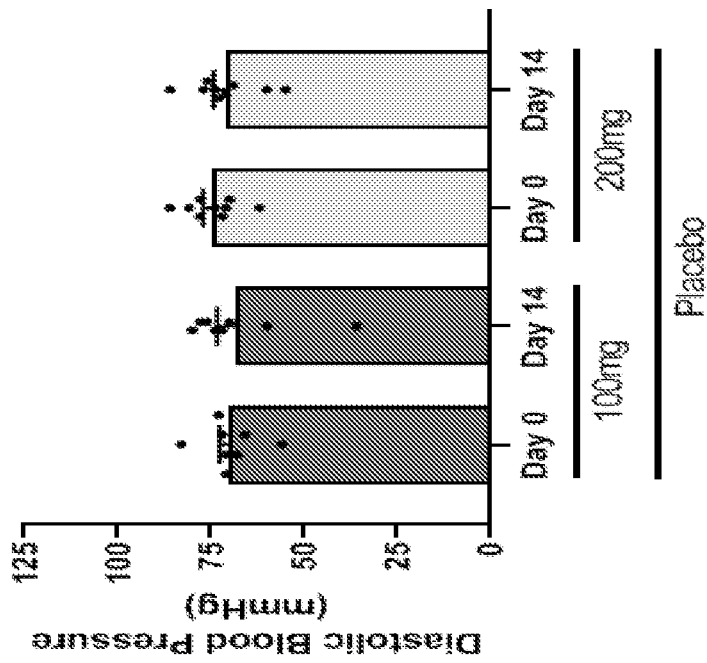
Figure 15B:
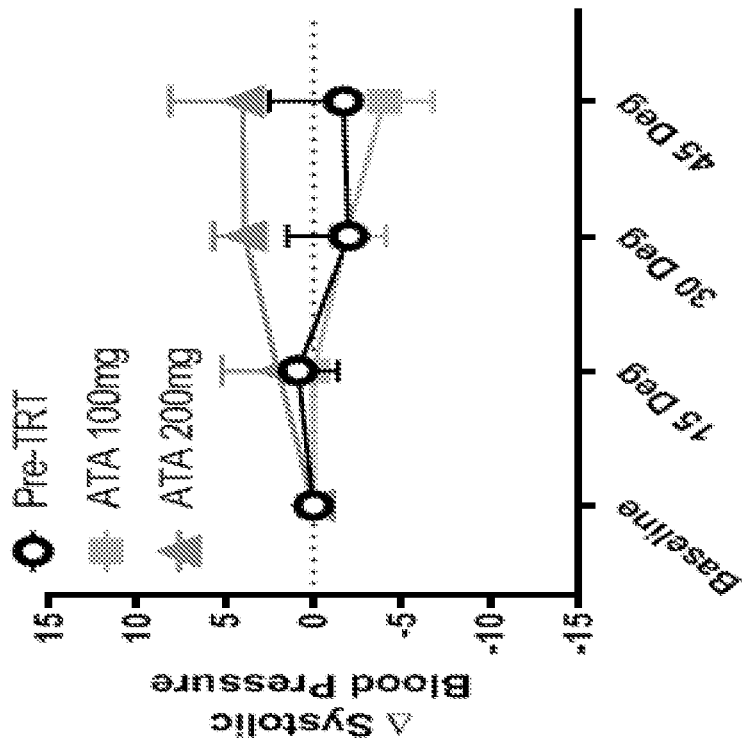
FIGS. 15A-15D are graphs plotting changes in systolic (FIGS. 15A and 15B) and diastolic (FIGS. 15C and 15D) blood pressure upon progressive head-up tilting in humans with mild-to-moderate aortic valve stenosis, before and after treatment with placebo (FIGS. 15A and 15C) or ataciguat/HMR1766 (FIGS. 15B and 15D) for 14 days (randomized, double-blind study design, doses as indicated). Treatment with ataciguat did not consistently or significantly alter blood pressure responses to head-up tilt compared to pre-treatment or placebo-treated subjects. These observations were consistent with the more functional "standing test" data (FIGS. 12A-12D and 13A-13B), and were conducted as a more sensitive and controlled measure of orthostatic tolerance.
Figure 15A:
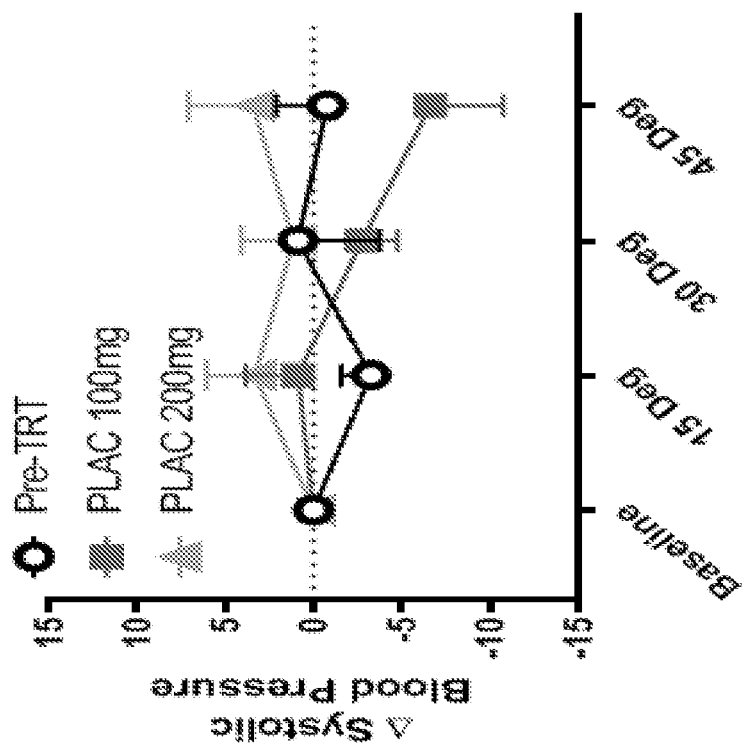
Figure 15D:
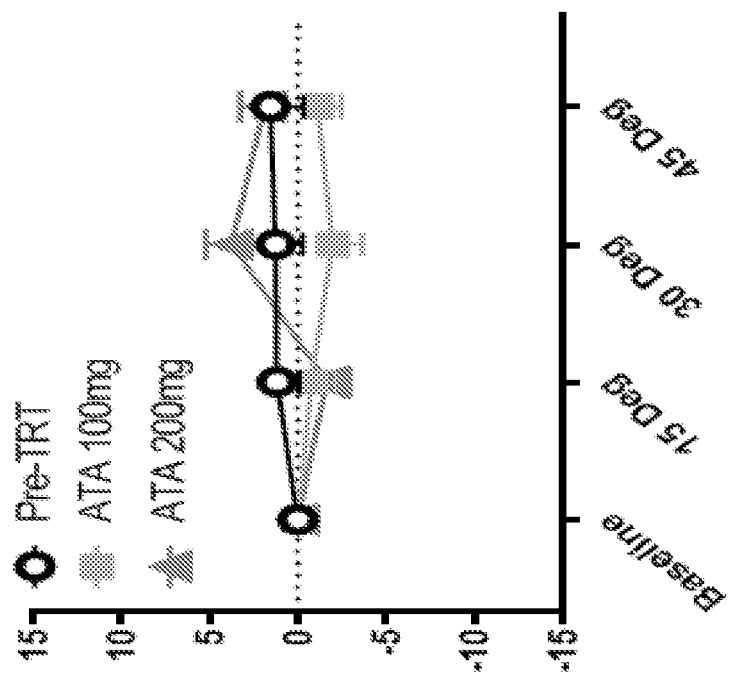
Figure 15C:
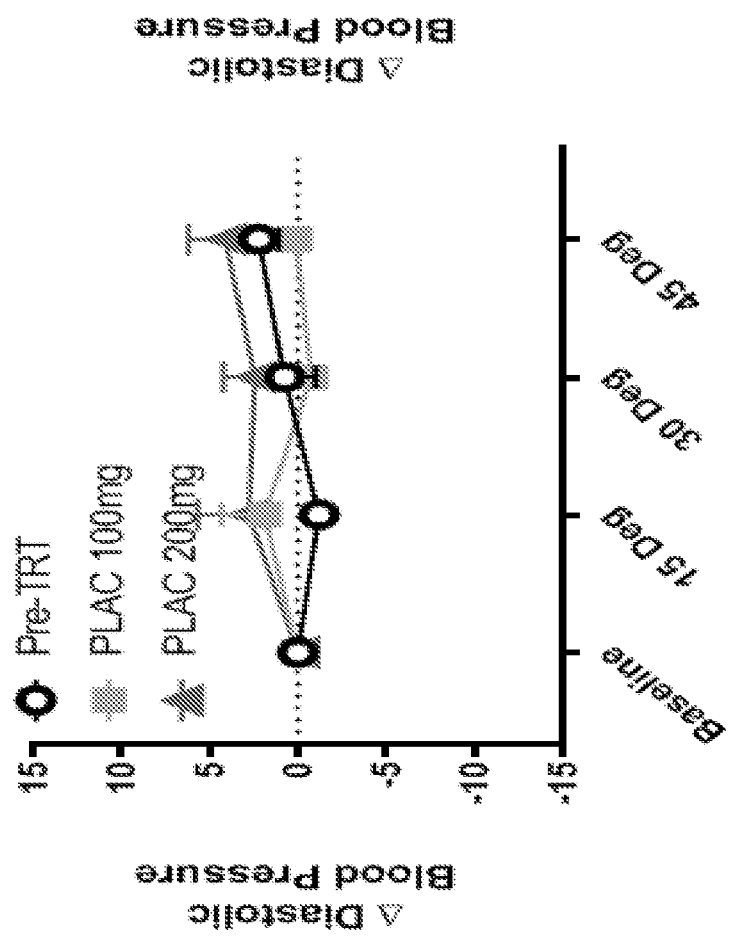
Figure 16B:
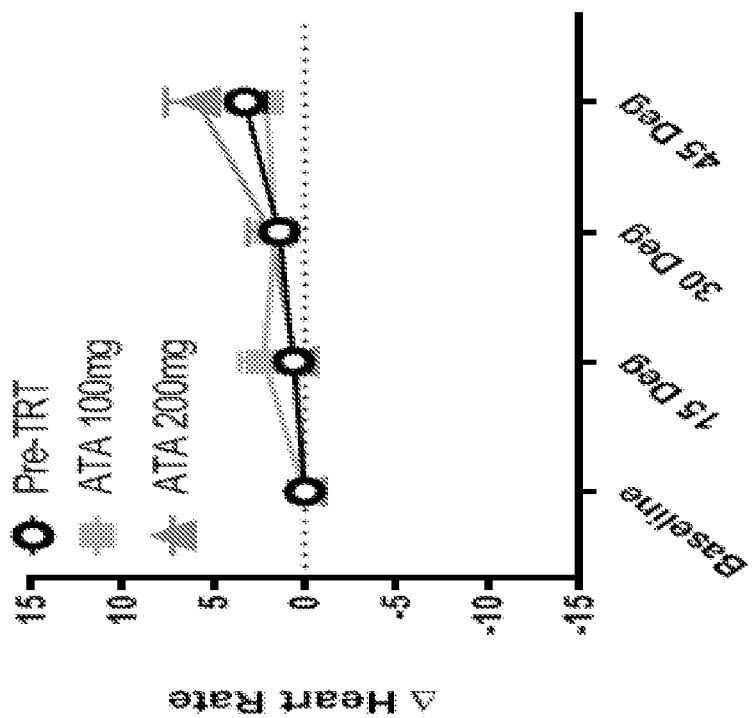
FIGS. 16A and 16B are graphs plotting changes in heart rate upon progressive head-up tilting in humans with mild-to-moderate aortic valve stenosis, before and after treatment with placebo (FIG. 16A) or ataciguat/HMR1766 (FIG. 16B) for 14 days (randomized, double-blind study design, doses as indicated). Treatment with ataciguat did not consistently or significantly alter heart rate responses to head-up tilt compared to pre-treatment or placebo-treated subjects, again suggesting that ataciguat would not put patients at risk for side effects of hypotension, and that excessive tachycardia is not compensatory mechanism masking unwanted effects of ataciguat on vascular tone/vasomotor regulation.
Figure 16A:
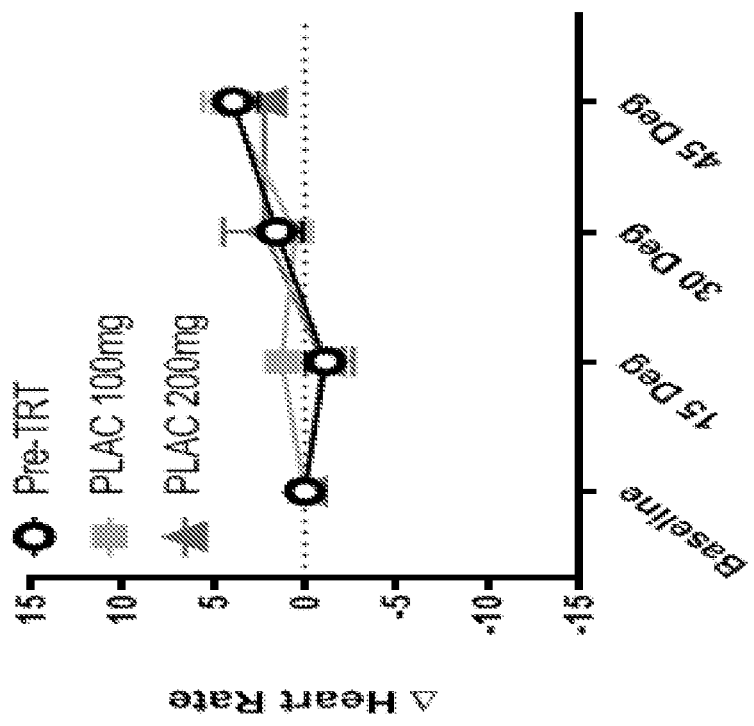

To subsequently evaluate the effects of ataciguat on signaling pathways that drive progression of FCAVS in vivo, immunohistochemistry and quantitative real-time RT-PCR were used to assess changes in canonical BMP and TGFβ signaling in aortic valve tissue. Similar to observations in valve interstitial cells in vitro, treatment with ataciguat for three months significantly attenuated SMAD1/5/8 phosphorylation in valve tissue from male and female mice (FIGS. 2A and 2B), and reduced markers of osteogenesis such as Runx2 and SPP1 (FIGS. 3A-3D). Greater reductions in valvular calcium also were observed in male mice (FIG. 4). Interestingly, treatment with ataciguat increased canonical TGFβ signaling (SMAD2/3 phosphorylation) in valve tissue from both male and female mice (FIGS. 5A and 5B), but paradoxically reduced the expression of the SMAD2/3 target genes CTGF and COL1A1 only in female mice (FIGS. 6A-6D). MMP2 expression was not altered by ataciguat in either male or female mice, but was markedly higher in female mice than in male mice (FIGS. 7A and 7B). Consistent with these molecular changes in matrix metalloproteinase and collagen isoform expression, changes in relative collagen fiber thickness were only evident in female mice (FIGS. 8A and 8B). In addition, consistent with observed changes in valvular calcification, long-term treatment with ataciguat significantly attenuated progression of valvular dysfunction and associated reductions in left ventricular diastolic function in male mice only (FIGS. 9A-9B and 10A-10D).

Example 4—Ataciguat is Well-Tolerated in Patients with Mild/Moderate FCAVS In Vivo Combining ataciguat's role as an activator of heme-free sGC with reports of increased systemic oxidative stress in patients with FCAVS (Mourino-Alvarez et al., *Int. J Cardiol.*, 225:99-106 (2016)), it was conceivable that administration of ataciguat could elicit acute hypotension or increase propensity to experience orthostatic hypotension. To investigate this possibility, a randomized, double-blind, placebo-controlled, dose-escalation study was conducted to assess the effects of ataciguat on orthostatic tolerance using both a standing test (highly functional) and a tilt table test (highly sensitive). These studies revealed that 14 days of treatment with placebo or either dose of ataciguat did not significantly alter resting blood pressure (FIGS. 11A-11D) or augment any reductions in blood pressure or heart rate in response to standing (FIGS. 12A-12D and 13A-13B) or head-up tilt (FIGS. 14A-14D, 15A-15D, and 16A-16D).

Example 5—Ataciguat Slows Progression of Valve Disease in Patients with Mild/Moderate FCAVS To determine whether ataciguat could slow progression of FCAVS, a randomized, double-blind, placebo-controlled study was conducted in patients with mild/moderate valvular disease. Key eligibility criteria for the study included valvular calcium levels above 300 AU, a valve area between 1.0 and 2.0 cm$^2$, an ejection fraction greater than 50%, and absence of congenital heart valve disease (full inclusion/exclusion criteria is shown in TABLE 1). Patients were randomized to placebo or ataciguat treatment for six months, and a subset of patients received treatment for 12 months. Subject characteristics at baseline are shown in TABLE 2. Importantly, there was no difference in measured hemodynamic, blood biochemistry, drug treatment, or comorbidity indices between treatment groups at baseline. Given the relatively short duration of follow-up, the primary outcome variable was the change in valvular calcium over time. Secondary and tertiary outcomes were aortic valve and left ventricular function, respectively.

After six months of treatment, it was found that treatment with ataciguat attenuated progression of aortic valve calcification by ~70% compared to placebo-treated patients (FIGS. 17A-17C). Interestingly, and consistent with the observations in mice, subgroup analyses suggested that ataciguat conferred a greater benefit to men with FCAVS than women with FCAVS. While placebo-treated patients displayed progressive worsening of aortic valve function during the six month follow-up period (p<0.01 vs baseline), aortic valve function did not worsen significantly in patients treated with ataciguat (p=0.24 vs baseline) (FIGS. 18A-18F). Similar to observed changes in aortic valve calcium levels, treatment with ataciguat tended to confer a greater therapeutic benefit to men with FCAVS compared to women.

Studies were then conducted to assess whether ataciguat had any impact on cardiac function and adaptations to chronic ventricular overload presented by aortic valve dysfunction. After six months of treatment, it was observed that treatment with ataciguat could prevent decline in left ventricular systolic function (assessed by either ejection fraction or stroke volume), compared to placebo-treated subjects (FIGS. 19A-19F). Interestingly, ataciguat also tended to improve left ventricular diastolic function (assessed by either E/e' or the E/A ratio) compared to placebo-treated patients (FIGS. 20A-20F). A reduction in pulse pressure also was observed in males treated with ataciguat as compared to placebo; such a reduction was not apparent in females (FIGS. 21A-21C). Strikingly, and similar to the observed changes in aortic valve function, these data suggested that men received a greater and more consistent therapeutic benefit from ataciguat in both systolic and diastolic function when compared to women.

TABLE 1

| Inclusion/Exclusion Criteria |
|---|
| Criteria for Inclusion |
| Age >50 years |
| Male or female gender |
| Aortic valve area greater than 1.0 cm$_2$ but less than 2.0 cm$_2$ |
| Aortic valve calcium levels greater than 150 AU from chest CT |
| Ejection fraction >50% |
| Criteria for Exclusion |
| Orthostatic intolerance or symptomatic hypotension prior to study or during study visits |

TABLE 1-continued

Inclusion/Exclusion Criteria

Positive pregnancy test during screening visit
Nitrate use within 24 hours
Systolic blood pressure <110 mm Hg
Mean systemic arterial pressure <75 mm Hg
Severe mitral or aortic regurgitation
Retinal or optic nerve problems
Recent (≤30 days) acute coronary syndrome
Oxygen saturation <90% on room air
Congenital valve disease
Hepatic dysfunction/elevated liver enzymes
Prescription of drugs known to alter NO-sGC-cGMP signaling (sildenafil, nitrates, etc.)
Prescription of Warfarin (Coumadin) for chronic anticoagulation
Concomitant participation in other trials at Mayo Clinic or elsewhere
Use of phenytoin or related compounds for any indication
Chronic midazolam treatment for any indication
Use of monoamine oxidase inhibitors for any indication
Use of anti-diabetic drugs in the sulfonylurea family
Use of fluvastatin (predominantly degraded by CYP2C9)

TABLE 2

Patient Characteristics at Baseline (mean ± SD).

| Characteristic | PLACEBO (n = 11) | ATACIGUAT (n = 12) | p-value |
|---|---|---|---|
| Median age (yr) | 72 ± 8 | 74 ± 4 | |
| Male sex (no.) | 8 | 7 | |
| Body habitus | | | |
| Height (cm) | 172 ± 10 | 168 ± 8 | |
| Weight (kg) | 99 ± 18 | 88 ± 11 | |
| Body mass index (AU) | 34 ± 7 | 31 ± 3 | |
| Blood pressure (mm Hg) | | | |
| Systolic | 129 ± 12 | 131 ± 14 | |
| Diastolic | 74 ± 9 | 68 ± 12 | |
| Cardiac function | | | |
| Left ventricular ejection fraction (%) | 65 ± 5 | 65 ± 6 | 0.99 |
| Heart rate | 62 ± 14 | 62 ± 15 | 0.52 |
| Aortic valve function/disease severity | | | |
| Valve calcium levels (AU) | 1208 ± 776 | 1055 ± 594 | 0.85 |
| Valve area (cm$^2$) | 1.33 ± 0.15 | 1.36 ± 0.24 | 0.51 |
| Peak transvalvular velocity (m/sec) | 3.3 ± 0.4 | 3.2 ± 0.4 | 0.64 |
| Peak transvalvular gradient (mm Hg) | 26 ± 7 | 2 ± 7 | 0.86 |
| Biochemistry | | | |
| Total cholesterol (mg/dl) | 164 ± 28 | 197 ± 53 | 0.12 |
| LDL cholesterol (mg/dl) | 82 ± 24 | 110 ± 50 | 0.15 |
| HDL Cholesterol (mg/dl) | 52 ± 18 | 65 ± 15 | 0.07 |
| Triglycerides (mg/dl) | 151 ± 70 | 118 ± 50 | 0.11 |
| Glucose (mg/dl) | 115 ± 35 | 105 ± 17 | 0.37 |
| Creatinine | 1.0 ± 0.2 | 0.9 ± 0.2 | 0.73 |
| Alanine aminotransferase (U/L) | 25 ± 13 | 25 ± 11 | 0.94 |
| Aspartate aminotransferase (U/L) | 25 ± 11 | 30 ± 25 | 0.59 |
| APTT (sec) | 33 ± 3 | 33 ± 3 | 0.98 |
| INR (Units) | 1.0 ± 0.1 | 1.0 ± 0.1 | 0.59 |
| Hematocrit (%) | 43 ± 3 | 41 ± 5 | 0.12 |
| Hemoglobin (g/dl) | 14.3 ± 1.4 | 13.7 ± 1.5 | 0.15 |
| Coexisting conditions (no.) | | | |
| Hypercholesterolemia | 8 | 8 | |
| Hypertension | 7 | 7 | |
| Diabetes | 2 | 1 | |
| Atrial fibrillation | 0 | 0 | |
| Current smoker | | | |
| Coronary heart disease | 4 | 1 | |
| Cerebrovascular disease | 0 | 0 | |
| Peripheral vascular disease | 0 | 0 | |
| Charlson Comorbidity Index | | | |
| Not age-adjusted | 2.6 ± 3.1 | 0.8 ± 0.8 | 0.07 |
| Age-adjusted | 5.1 ± 2.8 | 3.8 ± 0.9 | 0.11 |
| Medications | | | |
| Statins | 10 | 10 | |
| ACE inhibitor or ARB | 6 | 6 | |
| Beta blocker | 7 | 4 | |
| Other | | | |

Example 6—Utility of Baseline Variables in Predicting Progression of Aortic Valve Dysfunction Further analyses used a neural network algorithm trained on baseline variables to determine whether there were readily available phenotypic characteristics that would predict changes in aortic valve area over time. Following 10-fold cross validation, the algorithm performed reasonably well at predicting the change in aortic valve function in data from all subjects. Critically—and consistent with the data presented above, the model identified both treatment group (placebo vs. ataciguat) and sex (male vs. female) as the most informative variables predicting the change in valve area over time (FIG. 22).

In summary, the studies described above demonstrated the following:

In mice, ataciguat activated sGC in valve tissue, reduced osteogenic signaling and calcification in valve tissue from male and female animals, and did not consistently impact collagen expression in males but reduced collagen expression in females which, combined with higher MMP2 expression, caused a shift toward a phenotype of thinner collagen fibers in females. This work suggested that ataciguat preferentially slows valvular and cardiac diastolic dysfunction in male mice.

In humans, ataciguat was well tolerated with regard to side effects and blood pressure regulation. Ataciguat effectively reduced blood pressure at low doses and was more effective when subjects were supine. It also tended to slow progression of valve calcification by about 70%, slow progression of valve dysfunction, and preserve or prevent decline in left ventricular systolic and diastolic function, although these benefits were predominantly observed in men.

Finally, a non-biased neural network model revealed that treatment group (ataciguat vs. placebo) and gender (male vs. female) were the strongest predictors of therapeutic effectiveness when predicting changes in aortic valve area.

Example 7—Effects of sGC Agonists on Expression of Osterix

In vitro studies were conducted in aortic valve interstitial cells to determine the effects of several sGC agonists on mRNA levels of Osterix, a BMP target gene. Cells were treated with nelociguat, vericiguat, lificiguat, or BAY41-

8543, and Osterix mRNA levels were determined. Nelociguat and BAY41-8543 were used at concentrations ranging from 1 nM to 10 µM, while vericiguat and lificiguat were used at concentrations ranging from 1 nM to 1 µM.

Nelociguat effectively reduced BMP signaling at concentrations from 1 nM to 1 µM (FIG. 23, arrows). This finding suggested that a concentration 10 µM or higher may be cytotoxic, as has been observed with some other compounds. Vericiguat was effective to reduce Osterix expression only at the highest dose tested (FIG. 24, arrow). Similar to nelociguat, lificiguat appeared to lose efficacy at higher concentrations in vitro (FIG. 25; effective concentrations indicated by arrows). BAY41-8543 tended to drive dose-dependent reductions in Osterix expression, and was highly efficacious at 10 µM (FIG. 26, arrow).

Example 8—Effects of Ataciguat on LPA-Induced BMP Signaling

Additional studies were conducted in aortic valve interstitial cells to examine the effects of ataciguat on LPA-induced BMP signaling and BMP target gene expression. Cells were treated with 18:0 lyso-PA, with or without ataciguat, and Osterix mRNA levels were determined. These studies showed that treatment with 18:0 lyso-PA increased expression of Osterix and that ataciguat dramatically suppressed the LPA effect (FIG. 27, "LPA" vs. "LPA+ATA"), suggesting that ataciguat would be efficacious in the treatment of valve disease in patients with high LPA levels.

The relationship between plasma LPA levels and levels of valvular calcium was evaluated in patients with mild to moderate aortic valve stenosis. Plasma LPA was measured at baseline, and valvular calcium levels were assessed by CT scanning at baseline or after sGC agonist treatment. At baseline, higher plasma LPA levels were associated with greater valvular calcium levels in this patient cohort (FIG. 28). After treatment with ataciguat for six months, patients who had higher baseline levels of plasma LPA tended to receive greater therapeutic benefit (greater attenuation of excess BMP signaling) than patients with lower levels of plasma LPA (FIG. 29).

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for treating a mammal on a basis of the mammal's gender, said method comprising:
   (a) identifying a mammal as having, or as being at risk of developing, heart valve calcification or vessel calcification,
   (b) identifying said mammal as a male mammal or a female mammal, and
   (c) when said mammal is a male mammal, administering a sGC agonist to said male mammal, thereby slowing progression of calcification of a heart valve or vessel within said male mammal, and when said mammal is a female mammal, not administering said sGC agonist to said female mammal, wherein said sGC agonist is ataciguat (5-chloro-2-[[(5-chloro-2-thienyl)sulfonyl] amino]-N-[4-(4-morpholinylsulfonyl) phenyl]-benzamide; HMR1766).

2. The method of claim 1, wherein said mammal is a human.

3. The method of claim 1, wherein said mammal is identified as said male mammal.

4. The method of claim 3, wherein said method further comprises administering a PDE5A inhibitor to said male mammal.

5. The method of claim 3, wherein said method further comprises identifying said male mammal as having an elevated plasma level of lysophosphatidic acid (LPA).

6. The method of claim 4, wherein said PDE5A inhibitor is selected from the group consisting of sildenafil; vardenafil; tadalafil; UK-357903 ([1-ethyl-4-{3-[3-ethyl-6,7-dihydro-7-oxo-2-(2-pyridylmethyl)-2H-pyrazolo[4,3-d]pyrimidin-5-yl]-2-(2-methoxyethoxy)-5-pyridylsulphonyl}piperazine]); exisulind; EMD82639 ((4-(4-[2-ethyl-5 phenylamino)-methylene]-3-methyl-5-oxo-4,5-di-hydro-pyrazol-1-yl)-benzoic acid); EMD360527 ([7-(3-Chloro-4-methoxybenzylamino)-1-methyl-3-propyl-1H-pyrazolo[4,3-d]pyrimidin-5-ylmethoxy]-acetic acid); EMD221829 (4-[4-(3-Chloro-4-methoxy-benzylamino)-benzo[4,5] thieno[2,3-d] pyrimidin-2-yl]-cyclohexanecarboxylic acid, ethanolamine salt); EMD171827 (5-[4-(3-Chloro-4-methoxy-benzylamino)-5,6,7,8-tetrahydro-benzo [4,5] thieno[2,3-d]pyrimidin-2-yl]-pentanoic acid); and DA-8259 (3-(1-Methyl-7-oxo-3-propyl-6,7-dihydro-1H-pyrazolo-[4,3-d] pyrimidin-5-yl)-N [2-(1-methylpyrrolidin-2-yl) ethyl]-4-propoxybenzenesulfonamide).

7. The method of claim 1, wherein said mammal is identified as said female mammal, wherein said method further comprises administering an antifibrotic agent to said female mammal to slow progression of calcification of a heart valve or vessel within said female mammal, and wherein said antifibrotic agent is selected from the group consisting of hydronidone, disitertide, fresolimumab, imatinib, nilotinib, dasatinib, nintedanib, sorafenib, thalidomide, pomalidomide, etanercept, belimumab, refanalin (BB-3), dectrekumab (QAX-576), tralokinumab, anakinra, rilonacept, carlumab, bindarit, maraviroc, batimastat (BB-49), marimastat, macitentan, bosentan, ambrisentan, sparsentan (RE-021), atrasentan, losartan, curcumin, silymarin, β-caryophyllene, beraprost, iloprost, treprostinil, aviptadil, sivelestat, serelaxin, dioscin, rapamycin, ruxolitinib, baricitinib, omipalisib (GSK2126458), tanzisertib (CC-930), bardoxolone methyl (CDDO-Me), baicalein, sulfasalazine, bortezomib, emricasan, paquinimod, rosiglitazone, elafibranor (GFT-505), saroglitazar, pioglitazone, docosahexaenoic acid, obeticholic acid, turofexorate isopropyl (WAY-362450), triamcinolone, genistein, pirfenidone, pentoxifylline, glycyrrhizin, ademetionine (SAM), β-aminopropionitrile (BAPN), simtuzumab (GS-6624), N-acetylcysteine, mitoquinone, salvianolic acid B, resveratrol, pyridoxamine, and α-tocopherol.

8. A method for treating a mammal on the basis of the mammal's gender, said method comprising:
   (a) identifying a mammal as having, or as being at risk of developing, heart valve calcification or vessel calcification,
   (b) identifying said mammal as a male mammal or a female mammal, and
   (c) when said mammal is a male mammal, administering about 50 mg to about 200 mg of a sGC agonist to said male mammal at least once per week, thereby slowing progression of calcification of a heart valve or vessel within said male mammal, and when said mammal is a female mammal, not administering said sGC agonist to said female mammal, wherein said sGC agonist is ataciguat (5-chloro-2-[[(5-chloro-2-thienyl) sulfonyl] amino]-N-[4-(4-morpholinylsulfonyl) phenyl]-benzamide; HMR1766).

9. The method of claim 8, wherein said mammal is a human.

10. The method of claim 8, wherein said mammal is identified as said male mammal.

11. The method of claim 10, wherein said method further comprises administering a PDE5A inhibitor to said male mammal.

12. The method of claim 11, wherein said PDE5A inhibitor is selected from the group consisting of sildenafil; vardenafil; tadalafil; UK-357903 ([1-ethyl-4-{3-[3-ethyl-6, 7-dihydro-7-oxo-2-(2-pyridylmethyl)-2H-pyrazolo[4,3-d] pyrimidin-5-yl]-2-(2-methoxyethoxy)-5-pyridylsulphonyl}piperazine]); exisulind; EMD82639 ((4-(4-[2-ethyl-5 phenylamino)-methylene]-3-methyl-5-oxo-4, 5-di-hydro-pyrazol-1-yl)-benzoic acid); EMD360527 ([7-(3-Chloro-4-methoxybenzylamino)-1-methyl-3-propyl-1H-pyrazolo[4,3-d]pyrimidin-5-ylmethoxy]-acetic acid); EMD221829 (4-[4-(3-Chloro-4-methoxy-benzylamino)-benzo[4,5] thieno[2,3-d] pyrimidin-2-yl]-cyclohexanecarboxylic acid, ethanolamine salt); EMD171827 (5-[4-(3-Chloro-4-methoxy-benzylamino)-5,6,7,8-tetrahydro-benzo [4,5] thieno[2,3-d]pyrimidin-2-yl]-pentanoic acid); and DA-8259 (3-(1-Methyl-7-oxo-3-propyl-6,7-dihydro-1H-pyrazolo-[4,3-d] pyrimidin-5-yl)-N [2-(1-methylpyrrolidin-2-yl) ethyl]-4-propoxybenzenesulfonamide).

13. The method of claim 10, wherein said method further comprises identifying said male mammal as having an elevated plasma level of lysophosphatidic acid (LPA).

14. The method of claim 10, wherein said sGC agonist is administered to said male mammal from twice a week to once a day.

15. The method of claim 10, wherein said sGC agonist is administered to said male mammal at least once a day.

16. The method of claim 10, wherein about 100 mg to about 200 mg of said sGC agonist is administered to said male mammal at least once per week.

17. The method of claim 16, wherein said sGC agonist is administered to said male mammal from twice a week to once a day.

18. The method of claim 16, wherein said sGC agonist is administered to said male mammal at least once a day.

19. The method of claim 8, wherein said mammal is identified as said female mammal, wherein said method further comprises administering an antifibrotic agent to said female mammal to slow progression of calcification of a heart valve or vessel within said female mammal, and wherein said antifibrotic agent is selected from the group consisting of hydronidone, disitertide, fresolimumab, imatinib, nilotinib, dasatinib, nintedanib, sorafenib, thalidomide, pomalidomide, etanercept, belimumab, refanalin (BB-3), dectrekumab (QAX-576), tralokinumab, anakinra, rilonacept, carlumab, bindarit, maraviroc, batimastat (BB-49), marimastat, macitentan, bosentan, ambrisentan, sparsentan (RE-021), atrasentan, losartan, curcumin, silymarin, β-caryophyllene, beraprost, iloprost, treprostinil, aviptadil, sivelestat, serelaxin, dioscin, rapamycin, ruxolitinib, baricitinib, omipalisib (GSK2126458), tanzisertib (CC-930), bardoxolone methyl (CDDO-Me), baicalein, sulfasalazine, bortezomib, emricasan, paquinimod, rosiglitazone, elafibranor (GFT-505), saroglitazar, pioglitazone, docosahexaenoic acid, obeticholic acid, turofexorate isopropyl (WAY-362450), triamcinolone, genistein, pirfenidone, pentoxifylline, glycyrrhizin, ademetionine (SAM), β-aminopropionitrile (BAPN), simtuzumab (GS-6624), N-acetylcysteine, mitoquinone, salvianolic acid B, resveratrol, pyridoxamine, and α-tocopherol.

* * * * *